SWITCHING SYSTEM

Filed Nov. 17, 1960 11 Sheets-Sheet 1

| | | |
|---|---|---|
| FIG. 3 PRI. FR 0 | FIG. 4 SEC. FR 0 | FIG. 5 TERT. FR 0 |
| FIG. 6 PRI. FRS 3, 6 & 9 | FIG. 7 SEC. FRS 3, 6 & 9 | FIG. 8 TERT. FRS 3, 6 & 9 |
| FIG. 9 COINCIDENCE & CONTROL | FIG. 10 IDLE HOR. LK. / FRM MTCH / VERT LK SEL. | |

INVENTOR
A. ZAROUNI
BY [signature]
ATTORNEY

INVENTOR
A. ZAROUNI
BY [signature]
ATTORNEY

INVENTOR
A. ZAROUNI
BY [signature]
ATTORNEY

June 26, 1962 A. ZAROUNI 3,041,409

SWITCHING SYSTEM

Filed Nov. 17, 1960 11 Sheets-Sheet 4

INVENTOR
A. ZAROUNI
BY [signature]
ATTORNEY

INVENTOR
A. ZAROUNI
BY [signature]
ATTORNEY

INVENTOR
A. ZAROUNI
BY S. Turner
ATTORNEY

INVENTOR
A. ZAROUNI
[signature]
ATTORNEY

INVENTOR
A. ZAROUNI
BY
[signature]
ATTORNEY

INVENTOR
A. ZAROUNI
BY [signature]
ATTORNEY

June 26, 1962 A. ZAROUNI 3,041,409

SWITCHING SYSTEM

Filed Nov. 17, 1960 11 Sheets-Sheet 10

INVENTOR
A. ZAROUNI
BY [signature]
ATTORNEY

June 26, 1962 A. ZAROUNI 3,041,409
SWITCHING SYSTEM
Filed Nov. 17, 1960 11 Sheets-Sheet 11

INVENTOR
A. ZAROUNI
BY [signature]
ATTORNEY 3,041,409

SWITCHING SYSTEM

Alfred Zarouni, Brooklyn, N.Y., assignor to Bell Telephone Laboratories, Incorporated, New York, N.Y., a corporation of New York Filed Nov. 17, 1960, Ser. No. 69,852
58 Claims. (Cl. 179—22)

This invention relates generally to switching systems and particularly to a multistage switching system having nonblocking attributes.

More particularly, this invention relates to such multistage switching systems wherein each calling line and each called line appears in a plurality of such switching stages, and wherein are provided interstage links and controls therefor which seek to interconnect a calling and called line via a link corresponding to any permutative pairing of the respective switching stage terminations of such lines and which perform that seeking operation in a predetermined order of preference among said permutative pairings. By permutative pairing is meant all of the possible combinations in which any one of the terminations of a calling line may be interconnected by an interstage link to any one of the terminations of a called line.

Specifically, this invention relates to such multistage switching systems wherein each calling line and each called line appears in a plurality of such switching stages, and wherein are provided interstage links and controls therefor which, in a predetermined sequence, seek as a preferred choice to interconnect the calling line appearance in one stage to the called line appearance in another stage, and seek as other or different or alternate or less-preferred choices to connect different stage appearances of the calling line to different stage apperances of the called line. That is to say, such other choices are the above-referred-to permutative pairings of these terminations.

A multistage switching system having nonblocking attributes is, fundamentally, a plurality of switching stages having lines terminated therein and having interstage links by means of which it is always possible to establish a connection from a calling line to a called line regardless of the volume of traffic being handled.

The main object of the present invention is to improve such switching systems by making more effective and more flexible use of the interstage links.

One feature of the present invention whereby the main object is attained is the provision of a plurality of switching stages, a plurality of lines each of which is terminated in at least two of such stages, and a plurality of selectable interstage links with common control means therefor having the capability of connecting any termination of any calling line with any termination of any called line.

The concept of having a line terminated at more than one switching stage is well known in the prior art. For example, in manual switching systems a subscriber line is connected to an answering jack and also is multipled to one or more calling jacks. This arrangement permits any operator, by means of a cord circuit, to answer, via the answering jack field, an incoming call from any of the lines assigned to her position, and also permits any operator, by means of a cord circuit, to complete, via the multiple jack field, an outgoing call to any line terminating in the central office. Another example of the appearance of a line before more than one switching stage is found in step-by-step central offices. Here each line appears in the bank of a line switch which affords answering access, and each line is also multipled to the banks of one or more final connector switches which afford calling access to the lines. A further example of the appearance of a line before more than one switching stage is found in panel system offices. Here, much the same as in the above step-by-step example, each line appears before the bank of a line finder switch which affords answering access, and each line is also multiplied to the banks of one or more final selector switches which afford calling access to the lines. A still further example of the above general access scheme is found in crossbar trunking systems wherein each incoming trunk may appear before two switches. One of these switches is used to afford answering access to incoming calls which are to be completed locally; the other of these switches is used to afford answering access to incoming calls which are to be completed via an outgoing trunk using the crossbar office as an intertoll switching center.

In the several systems briefly described above, there is, in each instance, the functional equivalent of a plurality of selectable interstage links. In the manual system each operator is provided with a plurality of manually selectable cord circuits which are employed, for example, to link the answering jack of the calling line to one of the appearances of the called line in the multiple jack field. Since each operator may have, for example, 100 or more answering jacks assigned to her position, it is obviously impracticable to provide as many cord circuits as there are answering jacks. If this were done, it would fall within the purview of 100 percent trunking. This procedure, fortunately, is unnecessary because advantage is taken of the theory of trunking probability which is based on traffic studies and which, in brief, recognizes that, it is seldom that more than ten percent of a group of subscribers will be calling simultaneously. This is called ten percent trunking, and thus each operator's position is provided with cords on a percentage-trunking basis. Likewise, in step-by-step switching systems that portion of the circuitry intervening between the calling and the called line terminations, and which in common serves a plurality of calling lines, is, in effect, an interstage link. Here, again, the theory of trunking probability is applied, and the ratio of links to lines may be predicated, for instance, on a percentage-trunking basis. With respect to panel and to crossbar switching systems the same general analogy can be applied. The ratio of lines to interstage links, again, may be predicated on a percentage-trunking basis.

In all of the above-recited examples of plurally-terminated lines served by selectable interstage links, the incoming call is answered as a switching stage whose peculiar function is that of answering, and the call is completed at the switching stage whose peculiar function is that of completing; in this type of prior art there is never any end-to-end reversal of the answering and completing functions as regards interstage link selection.

Another object of the present invention is to overcome the limitations inherent in the prior art types of switching systems by making all switching stage terminations of all lines available for both answering and completing functions, and by controlling the interstage links accordingly.

Another feature of the present invention is the provision of circuitry for effecting the permutative pairing of calling and called line switching stage terminations, and the provision of control circuitry for selecting one of a plurality of interstage links in accordance with a prescribed order of preference among the various permutative pairs.

A further object of this invention is to control the selection and use of the interstage links so that any switching stage termination of a calling line may be connected to any other switching stage termination of the called line.

A still further object of this invention is to control the selection and use of the interstage links so that an idle link is sought which is capable of connecting a preferred stage termination of a calling line with a preferred stage termination of a called line, and when no such idle link is available, so that an idle link is sought which is capable of interconnecting less-preferred stage terminations of the calling and called lines.

Still another object of the present invention is to register a first set and a second set of indicia, respectively indicative of the preferred termination of the calling line in one switching stage and of the preferred termination of the called line in another switching stage, and defining a preferred permutative pair of stage terminations, to seek an idle interstage link to interconnect such preferred pair of terminations and, in the absence of an idle link therebetween, to change, alter, or modify one or both of the sets of indicia, thereby indicating a less-preferred pair of terminations, and then to seek an idle link to interconnect such less-preferred pair of stage terminations.

A still further feature of the present invention is the provision of a common control circuit including memory devices for registering a first set of indicia indicative of the preferred stage termination of the calling line in one switching stage and for registering a second set of indicia indicative of the preferred termination of the called line in another switching stage, the two sets of indicia conjointly defining or designating a preferred permutative pair of stage terminations, circuitry resident in the common control circuit for searching among a plurality of links for an idle interstage link capable of interconnecting such preferred permutative pair, circuitry resident in the common control circuit, and controlled when no such idle link is available, for translating at least one of the first and second sets of indicia into a different set or sets of indicia indicative of or designating a less-preferred pair of switching stage terminations (that is, the latter is derived from the former), and circuitry resident in the common control circuit for searching among a different plurality of links for an idle link capable of interconnecting such less-preferred pair of stage terminations.

Still another feature of the present invention is the provision, with regard to any pair of switching stages, of a plurality of lines each having only one termination per switching stage, a common control circuit including memory devices for registering a first set of indicia and a second set of indicia, respectively indicative of the preferred termination of the calling line in one switching stage and of the preferred termination of the called line in the other switching stage, and defining or designating a preferred pair of stage terminations, a first plurality of selectable interstage links capable of interconnecting the preferred pair of terminations, taking one termination from each stage, circuitry resident in the common control circuit for searching among such first plurality of links for an idle link, and controlled when no such idle link is available, for translating the first and second sets of indicia into the alternate sets of indicia indicative of or designating the less-preferred pair of terminations, a second plurality of selectable interstage links capable of interconnecting the less-preferred pair of terminations, taking the other termination from each stage, circuitry resident in the common control circuit for searching among such second plurality of links for an idle link, and circuitry resident in the common control circuit and effective to inhibit the said translation whenever the calling and the called lines are so terminated in the said two stages such that the preferred pair of terminations and the less-preferred pair of terminations are interconnectable only by means of the same plurality of links.

Still another feature of the present invention, and closely allied to the immediately preceding feature, is the provision of a plurality of frames per switching stage, a plurality of lines each having a termination in only a single frame of each stage, a first plurality of selectable interstage links capable of serving only those pairs of frames wherein appear the preferred pairs of terminations, a second plurality of selectable interstage links capable of serving only those pairs of frames wherein appear the less-preferred pairs of terminations, etc., a common control circuit embodying circuitry for selecting an idle link from among either the first or the second plurality of links, and circuitry also embodied in the common control circuit for taking cognizance of the condition whenever the calling and the called lines are terminated in the same frame per stage such that the preferred pairs of terminations and the less-preferred pairs of terminations are interconnectable only by means of the same plurality of links, and effective incident to the recognition of said condition to restrict the link searching operation to a single search among the said same plurality of links, thereby precluding an obviously unnecessary second search among the links of the same group.

A still further feature of the present invention is the provision, with regard to any pair of switching stages, of a plurality of line terminating frames per stage, a plurality of lines each having a termination in at least one frame of each stage, a plurality of groups of selectable interstage links each group serving a different pair of frames taking one frame from each stage, means for registering or designating two sets of indicia, one set indicative of a higher-preferred frame termination of a calling line and the other set indicative of a higher-preferred frame termination of a called line, a common control circuit embodying a link-scanning device for selecting a link group serving the pair of higher-preference frames defined by the two sets of indicia and for successively seeking in a predetermined order among the links of the selected group for an idle link therein, circuitry resident in the common control circuit, and effective only when no such idle link is found to serve a pair of terminations of higher preference, to translate one or both of the said two sets of indicia indicative of a pair of frame terminations of a higher preference to a different pair of sets of indicia indicative of a pair of frame terminations of a lower preference, and circuitry also resident in the common control circuit and effective upon the said translation to cause the link-scanning device to select another link group serving the said lower-preferred frames and to repeat the link-seeking operation within the latter link group.

A still further feature of the present invention is the provision, with regard to any pair of switching stages, of a plurality of line terminating frames per stage, a plurality of lines each having a termination in only one frame of each stage, a plurality of equal sized groups of selectable interstage links, each group serving a different pair of frames taking one frame from each stage, means for registering two sets of indicia, one set indicative of the preferred frame termination of a calling line and the other set indicative of a preferred frame termination of a called line, a common control circuit embodying a link-scanning device for selecting the link group serving the pair of preferred frames defined by the two sets of indicia and for successively seeking in a predetermined order among the links of the selected group for an idle link therein, circuitry resident in the common control circuit and effective only when no such idle link is found to serve the preferred pair of terminations to translate both of the said two sets of indicia into a different pair of sets of indicia indicative of a less-preferred pair of frame terminations, and circuitry also resident in the common control circuit and effective upon the said translation to cause the link-scanning device to select the other link group serving the said less-preferred frames and to repeat the link-seeking operation within the latter link group.

These and other objects and features of the present invention will be apparent from the description to follow of an exemplary embodiment of the invention.

To facilitate an understanding of the invention, reference is made to the drawings wherein:

FIG. 1 diagrammatically illustrates, in greatly simplified form, a switching system comprising two switching stages (primary frames and tertiary frames), an interstage linkage (secondary frames and interframe multiples), lines terminating in both switching stages, the interstage link-selecting circuitry, and the common control circuitry associated therewith;

Figure 9:
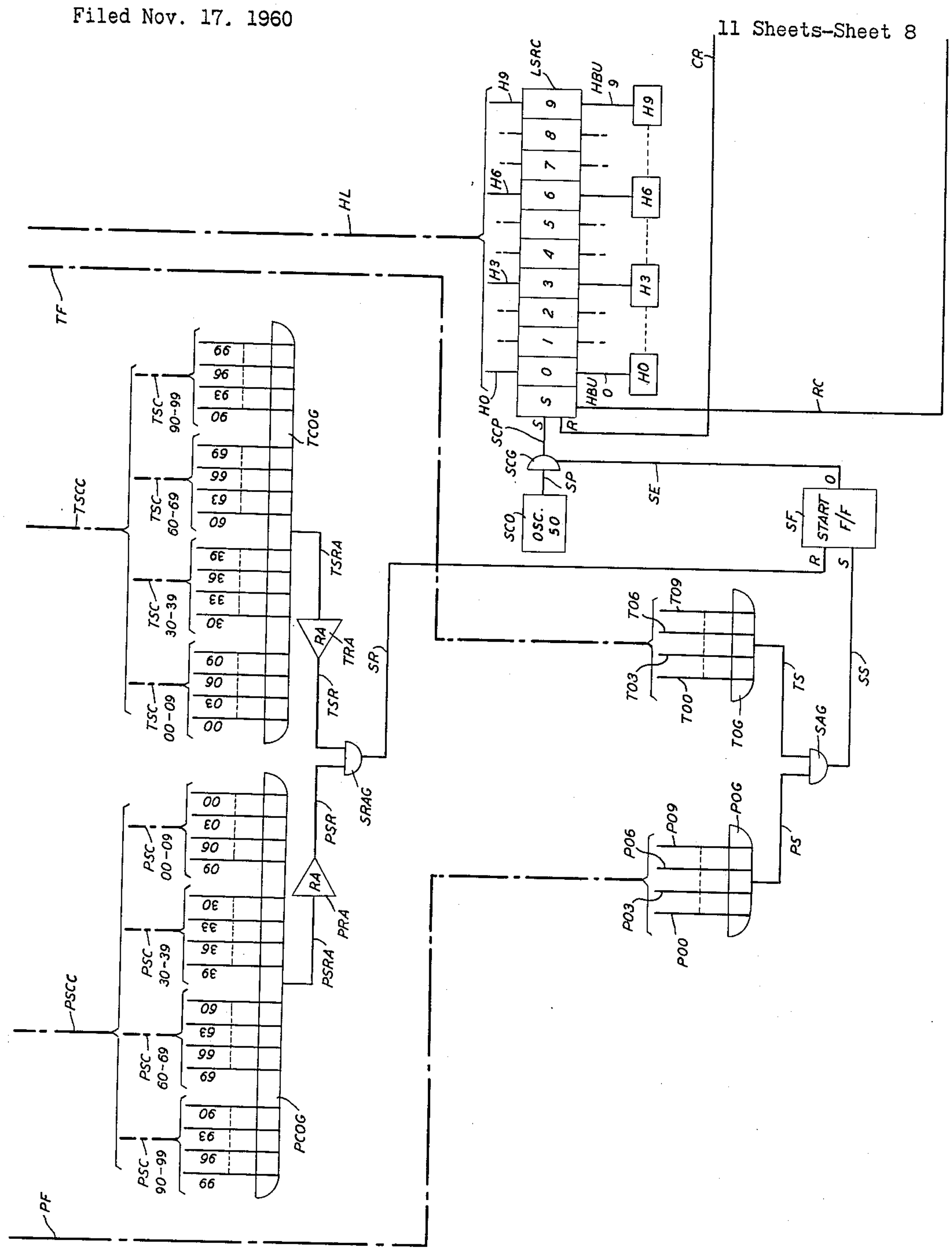
FIG. 9 shows part of the common control circuitry, including the ring counter which effectuates interstage link selection.
Figure 10:
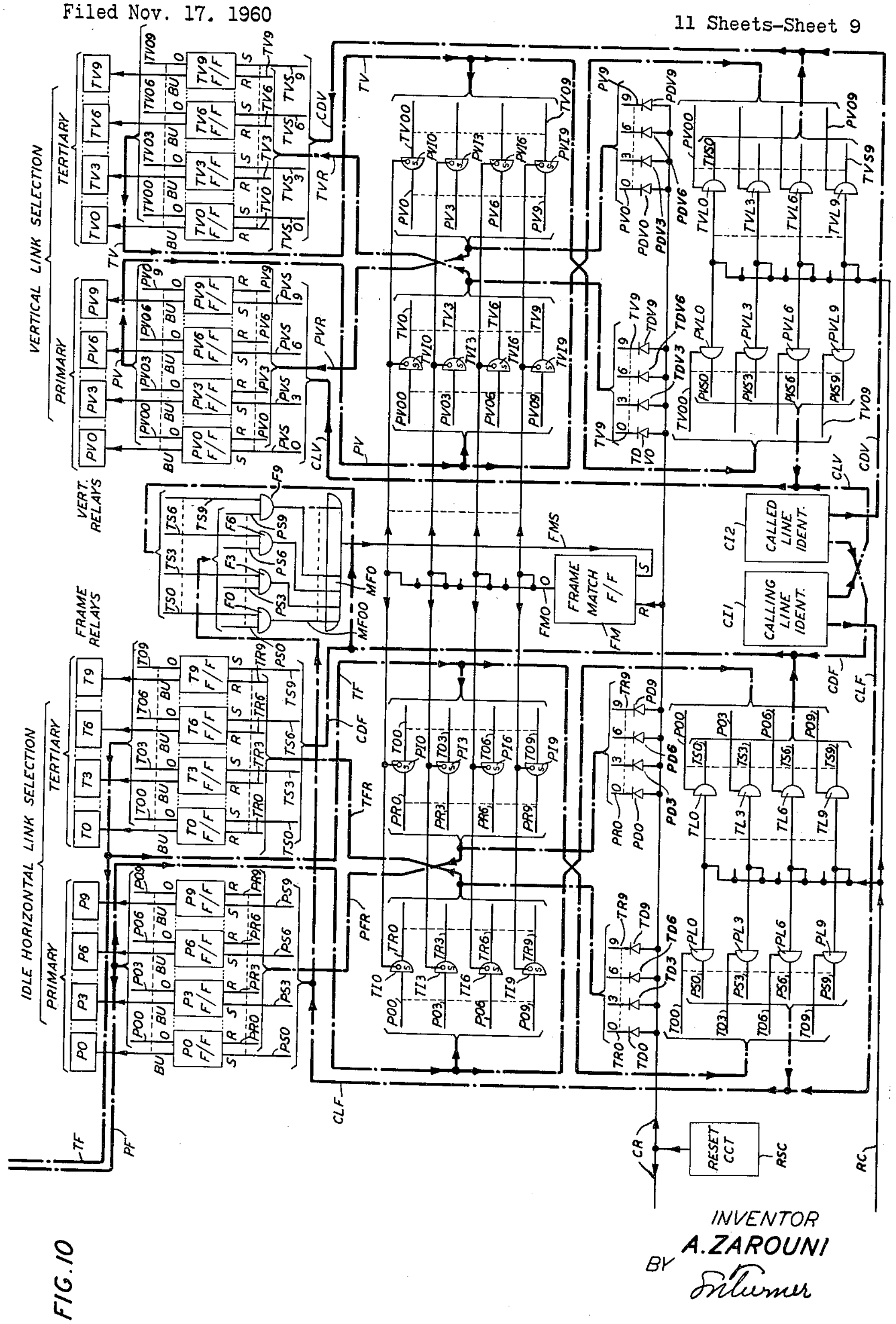
Figures 11A, 11B, 11C, 12A, 12B, 12C, 13A, 13B, 14A, 14B, 15A, 15B, 15C, 15D:
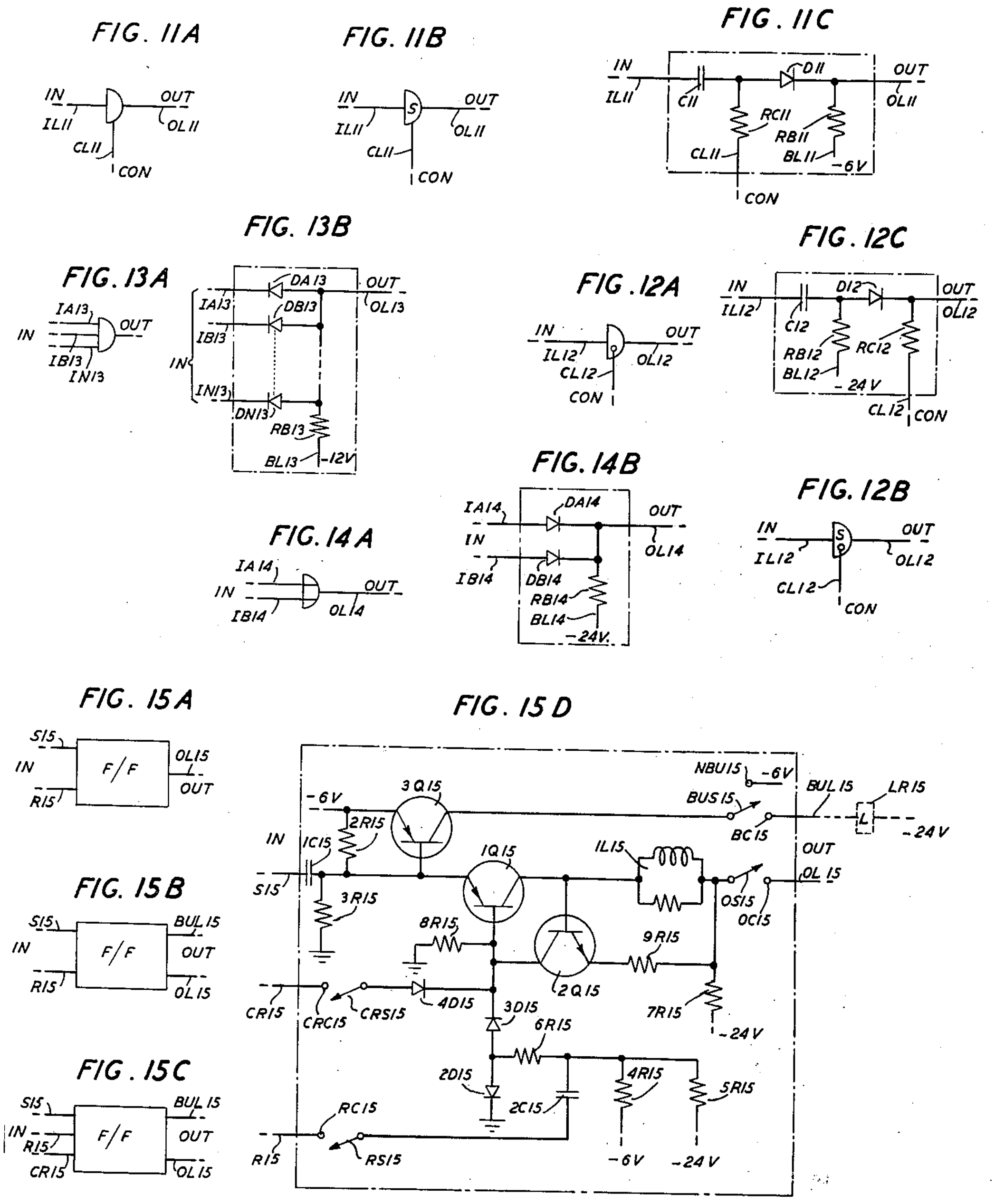
Figure 16A:
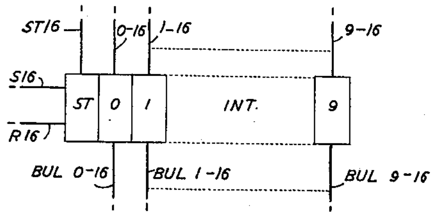
Figure 16B:
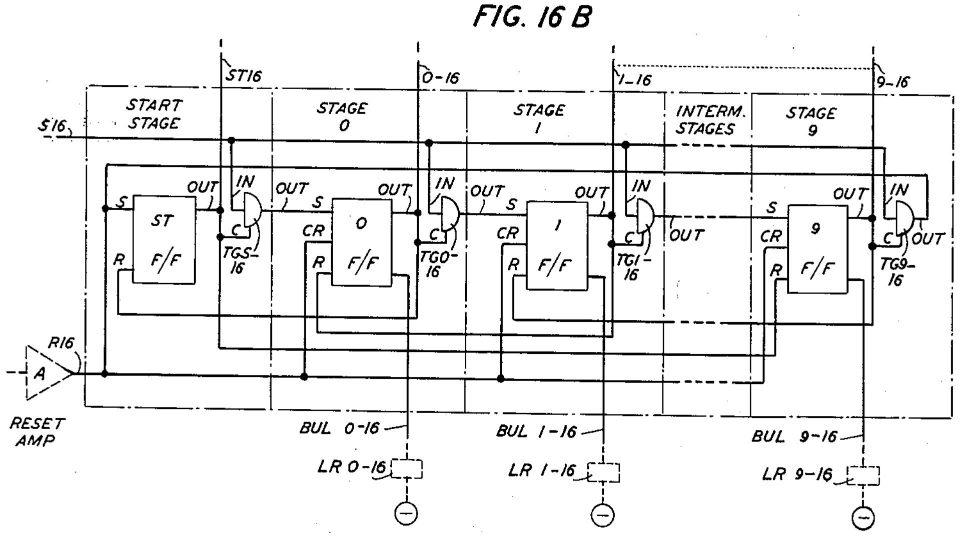
Figure 17A:
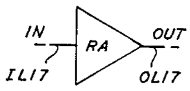
Figure 17B:
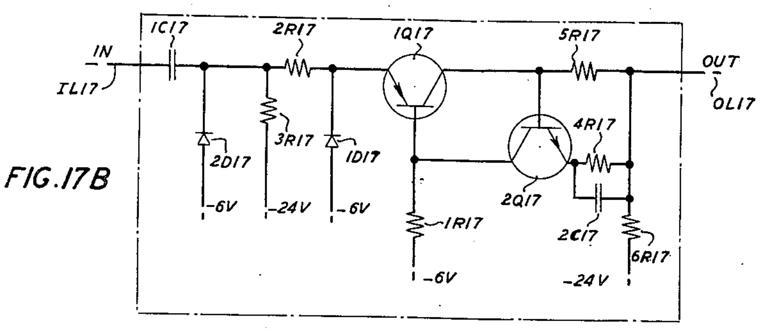

FIG. 10 shows part of the common control circuitry, including devices for registering data representing or designating the frame terminations of the calling and the called lines and means for cooperating with the ring counter of FIG. 9 to effectuate the selection of an interstage link circuit; and FIGS. 11A through 17B show symbols used in the detailed disclosure and illustrate suitable equivalent circuits for these symbols, and specifically, FIG. 11A shows the symbol for a transmission gate, that is to say a normally closed, or normally nonconductive gate;

FIG. 11B shows the symbol for a gate similar to that shown in FIG. 11A, but which transmission gate is slow-acting;

FIG. 11C shows an equivalent circuit for either of the above transmission gates; the circuit configuration for both gates is the same, but for the slow-acting gate the value of capacitor C11 will be larger;

FIG. 12A shows the symbol for an inhibiting gate, that is to say a normally open or normally conductive gate;

FIG. 12B shows the symbol for an inhibiting gate similar to that shown in FIG. 12A, but which inhibiting gate is slow-acting;

FIG. 12C shows the equivalent circuit for either of the inhibiting gates as shown in FIGS. 12A and 12B; the circuit configuration for both gates is the same, but for the slow-acting gate the value of capacitor C12 will be larger;

FIG. 13A shows the symbol for an "AND" gate;

FIG. 13B shows the equivalent circuit for an "AND" gate;

FIG. 14A shows the symbol for an "OR" gate;

FIG. 14B shows the equivalent circuit for an "OR" gate;

FIG. 15A shows the symbol for a flip-flop circuit having a "set" lead, a "reset" lead, and an "output" lead;

FIG. 15B shows the symbol for a flip-flop circuit having a "set" lead, a "reset" lead, an "output" lead, and a "buffer" output lead;

FIG. 15C shows the symbol for a flip-flop circuit having a "set" lead, a "reset" lead, a "common reset" lead, an "output" lead, and a "buffer" output lead;

FIG. 15D shows the equivalent circuitry for any one of the above flip-flop circuits, the particular setting of the switch or switches in FIG. 15D adapating the flip-flop circuit to afford the connections specified in FIG. 15A, 15B, or 15C;

FIG. 16A shows the symbol for a ring counter circuit;

FIG. 16B shows the equivalent circuitry for the ring counter symbolically shown in FIG. 16A, and using previously mentioned flip-flop and gate symbols, the portions of FIG. 16B enclosed by broken rectangular outlines respectively corresponding to the several stages of FIG. 16A represented by rectangles defined by solid lines;

FIG. 17A shows the symbol for a regenerative amplifier; and,

FIG. 17B shows the equivalent circuitry for a regenerative amplifier.

The description, to follow, is resolved into four general sections. The first section, designated "General Description," describes the over-all operation of the exemplary system as diagrammatically illustrated in FIG. 1. The second section, designated "Symbols and Equivalent Circuitry," describes the respective functions of the several symbols, and the equivalent circuitry respectively corresponding to the symbols as shown in FIGS. 11A through 17B. The third section, designated "Detailed Description—Introductory Matter" discusses, with respect to the detailed circuit disclosure of FIGS. 3 to 10, inclusive, a few particular aspects thereof which are deemed worthy of some emphasis in order to facilitate a full understanding of the detailed circuit description of the exemplary system, to follow. The fourth section, designated "Detailed Circuit Description," describes in detail the operation of the circuits as shown in FIGS. 3 to 10, inclusive, incident to the interconnection of a calling line with a called line.

GENERAL DESCRIPTION

Figures 1, 2:
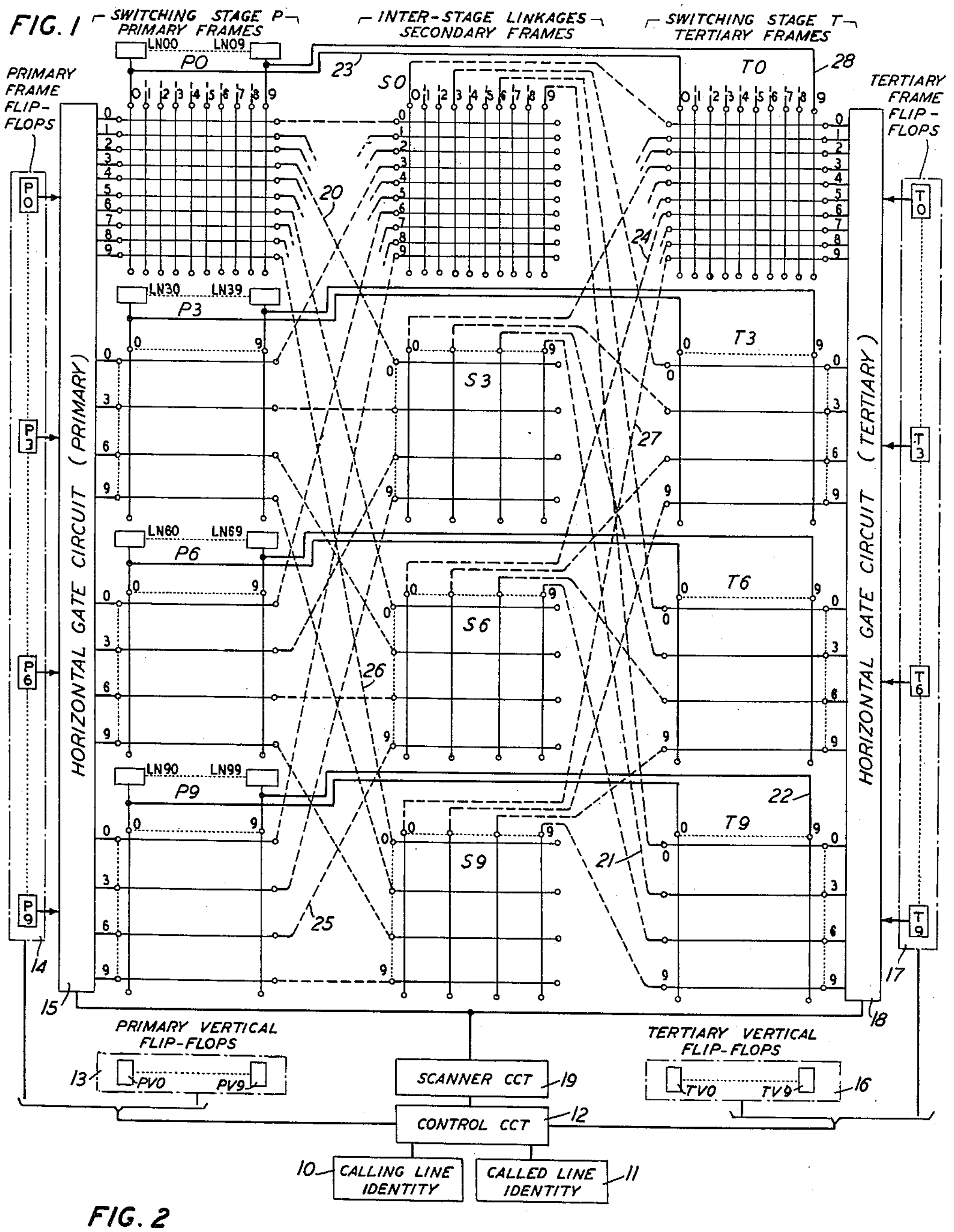
FIG. 2 shows the manner in which the more detailed circuits shown in FIGS. 3 to 10, inclusive, should be arranged to disclose the details of the embodiment symbolized in FIG. 1.

This general description is confined to FIG. 1 which illustrates, in diagrammatical form, the basic components of the exemplary embodiment described in detail hereinafter. This general descriptin is divided into two portions. The first portion is devoted to a general résumé of the major circuit groups and their respective functions; the second portion is devoted to a simplified description of the diagrammatically-illustrated exemplary system and wherein are discussed the circuit operations involved in completing connections between certain hypothetical combinations of calling and called lines, and wherein, at a suitable place, is provided a rationale of the nonblocking attributes of the switching system.

*System—in Brief*

In brief, the exemplary disclosure envisages two switching stages, respectively identified as P and T, an interstage linkage S, lines terminating in both switching stages, the interstage link-selecting circuitry, and the common control circuitry associated therewith.

*Switching Network*

Each of the switching stages P and T and the interstage linkage arrangement S is made up of a plurality of frames. The switching stage P comprises a plurality of primary frames, only four of which are shown, respectively identified as P0, P3, P6, and P9. The switching stage T comprises a plurality of tertiary frames, only four of which are shown, respectively identified as T0, T3, T6, and T9. The interstage linkage S comprises a plurality of secondary frames, only four of which are shown, respectively identified as S0, S3, S6, and S9. Whereas, in the drawing, as above described, are shown only four primary frames, four tertiary frames, and four secondary frames, the exemplary system hereinafter to be described in detail actually contemplates ten primary frames, ten tertiary frames, and ten secondary frames, those frames not shown having been omitted for the sake of clarity afforded by simplification.

The frames of the primary and the tertiary switching stages are inter-connectable with each other by means of "slip-multiple" connections and through the agency of the inter-stage linkage (or secondary frames). Each frame is represented by a plurality of vertical lines intersected by a plurality of horizontal lines. Each vertical line and each horizontal line is intended to symbolize a plurality of conductors. Each intersection of a vertical line with a horizontal line is intended to symbolize a plurality of circuit establishing devices (such, for instance, as relay contacts, etc.) whereby electrically conductive paths may be selectively set up between the corresponding conductors represented by any vertical line and any horizontal line. The conductors of the correspondingly located or numbered verticals of correspondingly numbered primary and tertiary frames are connected together via inter-termination multiple conductors, and each such pair of vertical terminations is connected to a line associated therewith. In each of the primary frames the horizontal conductors thereof are connected, in a slip-multiple pattern, to the horizontal conductors of the secondary frames in such a manner that for each primary frame each horizontal thereof is connected to a horizontal in a different secondary frame. Likewise, in each of the secondary frames the vertical conductors thereof are connected, in a slip-multiple pattern, to the horizontal conductors of the tertiary frames in such a manner that for each secondary frame each vertical thereof is connected to a horizontal in a different tertiary frame.

*Lines*

A plurality of lines is provided, each line being represented by a suitably numbered rectangle (such, for example, as LN00), and each such line is terminated in one of the primary frames and also (via inter-termination conductors) in one of the tertiary frames. Only eight lines are shown, respectively identified as LN00, LN09, LN30, LN39, LN60, LN69, LN 90, and LN99. Actually, in the exemplary system to be hereinafter described in detail, a switching frame arrangement accommodative of 100 lines is contemplated, those lines not shown having been omitted to simplify the drawing for the sake of clarity.

A typical line, such, for example, as represented by the rectangle designated LN00, is intended to symbolize suitable circuitry for terminating the conductor or conductors of a communication line, trunk, or channel (and hereinafter referred to as a line) serving or being served by a switching center, and terminating either locally or in a distant switching center or destination, and for coupling such a line to the frames of the switching stages. Such a line may, within the purview of the present invention, comprise one or more conductors, and may be employed for the transmission and/or reception (i.e. one-way or two-way lines) of telegraph, teletypewriter, facsimile, or other data, or telephone messages, and any necessary concomitant supervisory signals.

*Common Control Circuitry*

Common control circuitry is provided for registering electrical indicia indicative of the preferred frame and vertical locations of the calling and called lines, for automatically scanning or seeking among the links for an idle inter-stage link for inter-connecting the preferred pair of terminations defined by such preferred locations, and in the absence of an idle link therebetween, to change, alter, or modify said indicia, thereby indicating the less-preferred frame and vertical locations of the calling and the called line, and for automatically scanning or seeking among another group of links for an idle inter-stage link for interconnecting the less-preferred pair of terminations defined by such less-preferred locations.

The devices indicated by the rectangles 10 and 11 do not constitute an essential part of the present disclosure, but are ancillary thereto, and are shown merely to indicate a suitable source of calling and called line identifying indicia to be supplied to the control circuit. The rectangle 10, designated "calling line identity," represents any suitable device, well known in the communications art for providing calling line identifying indicia in a form suitable for registration. The rectangle 11, designated "called line identity," represents any suitable device, well known in the communication art providing called line identifying indicia in a form suitable for registration.

The other rectangles, respectively identified as 12, 13, 14, 15, 16, 17, 18 and 19, and bearing appropriate descriptive legends, are all to be considered as a part of the control circuit. The control circuit comprises suitable circuitry for controlling the operation of circuit-establishing devices, and means to be hereinafter described in the immediately succeeding paragraphs, whereby a calling line termination may be connected to a termination of a called line.

The rectangle 12, designated "control circuit," represents circuitry for directing the sequence and manner in which one of a plurality of calling line terminations may be inter-connected to one of a plurality of called line terminations. The controlling indicia, respectively indicative of the identity of the calling line and the called line, is supplied by the previously-described devices represented by rectangles 10 and 11.

*Primary Vertical Flip-Flops*

The rectangle 13, defined by broken lines, and enclosing other rectangles respectively designated "PV0" and "PV9," represents, in the exemplary disclosure, ten primary vertical flip-flops, the eight flip-flops not shown having been omitted to simplify the drawing. It is to be understood that for each plurality of line terminations having the same units digit in the line identification number in the primary switching stage, one primary vertical flip-flop is provided. For example, the primary stage terminations of lines LN00, LN10, LN20, LN30, LN40, LN50, LN60, LN70, LN80, and LN90 (of which only LN00, LN30, LN60, and LN90 are shown) are operatively associated with the primary vertical flip-flop PV0. In like manner, each of the other groups of line terminations in the primary switching stage will be similarly associated with its respective primary vertical flip-flop.

*Primary Frame Flip-Flops*

The rectangle 14, defined by broken lines, and enclosing other rectangles respectively designated "P0," "P3," "P6," and "P9," represents, in the exemplary disclosure, ten primary frame flip-flops, the six flip-flops not shown having been omitted for the sake of drawing simplicity. It is to be assumed that for each primary frame, one correspondingly numbered, and operatively associated, primary frame flip-flop is provided.

*Tertiary Vertical Flip-Flops*

The rectangle 16, defined by broken lines, and enclosing other rectangles respectively designated "TV0," and "TV9," represents, in the exemplary disclosure, ten tertiary vertical flip-flops, the eight flip-flops not shown having been omitted to simplify the drawing. It is to be understood that for each plurality of line terminations having the same units digit in the line identification number in the tertiary switching stage, one tertiary vertical flip-flop is provided. For example, the tertiary terminations of lines LN00, LN10, LN20, LN30, LN40, LN50, LN60, LN70, LN80, and LN90 (of which only LN00, LN30, LN60, and LN90 are shown) are operatively associated with the tertiary vertical flip-flop TV0. In like manner, each of the other groups of line terminations in the tertiary switching stage will be similarly associated with its respective tertiary vertical flip-flop.

*Tertiary Frame Flip-Flop*

The rectangle 17, defined by broken lines, and enclosing other rectangles respectively designated "T0," "T3," "T6," and "T9," represents, in the exemplary disclosure, ten tertiary frame flip-flops, the six flip-flops not shown having been omitted in order to simplify the drawing. It is to be understood that for each tertiary frame, one correspondingly numbered and operatively associated tertiary frame flip-flop is provided.

*Horizontal Gate Circuits*

The rectangles 15 and 18, respectively designated "horizontal gate circuit (primary)," and "horizontal gate circuit (tertiary)," represent arrangements of circuit-establishing devices, effective incident to the availability of the calling line termination and the called line termination frame location indicia, and controllable thereby, to cause the scanner circuit 19 to initiate the searching cycle among the interstage horizontal link terminations of both the primary and the tertiary frames.

*Scanner Circuit*

The rectangle 19, designated "scanner circuit," represents circuitry comprising suitable means, such, for example, as a ring counter, whereby electrical stimuli are applied in a predetermined esquential order, via the horizontal gate circuits 15 and 18 respectively associated with the primary and the tertiary frames, to cause the primary stage terminations and the tertiary stage terminations of a plurality of interstage links to be successively tested for an idle path between the pair of primary and tertiary frames determined by the gate circuits 15 and 18. Initially, the scanner 19 will search among the interstage link terminations associated with a pair of frames germane to the preferred pair of calling and called line terminations. In the absence of an idle path therebetween the control circuit 12 causes the frame and vertical line location indicia (flip-flops 13, 14, 16 and 17) to be suitably changed, altered, or modified to represent the less-preferred pair of terminations and causes the scanner 19 to repeat the link testing cycle among a different plurality of interstage links for an idle path to interconnect the less-preferred pair of calling and called line terminations. In the two-switching-stage embodiment where each line appears only once per switching stage, the changing of the frame and vertical location indicia involves merely substituting the alternate stage termination indicia (frame and vertical data); whereas, in systems according to the present invention involving more than two switching stages and the further possibility of having a line terminate more than once per switching stage, it will be apparent to those skilled in the art that there will be a plurality of alternate less-preferred pairs of terminations among which the control circuit 12 would prescribe a preference for link testing.

*Over-All Operation of System*

Having in mind the preceding descriptive matter relating to the major circuit groups and to the diagramatically-illustrated exemplary system, it is deemed appropriate, at this time, to describe, in general terms, the over-all operation of said exemplary system.

*Call From Line LN00 to Line LN99*

Now let it be assumed, for example, that the line conductors served by the line LN00 indicate that service is desired by said line and that a connection to LN99 is desired, whereupon the common control circuitry registers indicia representative of the respective identities of the calling line and the called line.

In each of the frames of the primary and tertiary switching stages all of the lines having terminations in the verticals of such frames have access to all of the interstage links having terminations in the respective horizontals thereof. The idle condition and the busy condition of each such horizontal link termination will be indicated by different electrical conditions.

*"Preferred" Line Termination*

Under control of the calling and called line identifying indicia, the corresponding combination of circuitry is operated, comprising one of the primary vertical flip-flops 13, one of the primary frame flip-flops 14, one of the tertiary vertical flip-flops 16, and one of the tertiary frame flip-flops 17. Since LN00 is the *calling* line, the primary vertical flip-flop PV0 and the primary frame flip-flop P0 are operated to designate that this primary frame location is the preferred termination for line LN00 *as a calling line*; and since LN99 is the *called* line, the tertiary vertical flip-flop TV9 and the tertiary frame flip-flop T9 are operated to likewise designate that this tertiary frame location is the preferred termination of line LN99 *as a called line.*

Under control of the scanner circuit 19, and by virtue of the operation of the primary and the tertiary frame flip-flops P0 and T9, respectively, a searching cycle is initiated to simultaneously seek among the horizontal terminations of the interstage links, in both the primary switching stage frame P0 and the tertiary switching stage frame T9, for an idle link to interconnect the preferred line termination of calling line LN00 in primary frame P0 with the preferred line termination of called line LN99 in tertiary frame T9. During the searching cycle, like-numbered horizontal terminations of the links are successively and simultaneously scanned; and now let it be assumed, for example, that the electrical conditions encountered on links numbered 0, 1 and 2 cause them to test "busy" on either end or on both ends. When the searching cycle has progressed to the links numbered 3, which it will be assumed are available for use on both frames, the electrical condition encountered thereon causes them to simultaneously test "idle" and, responsive to said simultaneous idle condition, the scanner circuit is arrested in its searching cycle. At this time, under control of the previously-operated primary frame and vertical flip-flops P0 and PV0, respectively, and the tertiary frame and vertical flip-flops T9 and TV9, respectively, the preferred termination of calling line LN00 in primary frame P0 is electrically connected to the preferred termination of called line LN99 in tertiary frame T9 by the operation of the previously-mentioned circuit-establishing devices severally represented by the intersecting horizontal and vertical lines of the frames. This connection may be traced over a path from calling line LN00, over the No. 0 vertical conductors and the No. 3 horizontal link terminations in primary frame P0, the interframe multiple conductors 20, the No. 0 horizontal conductors and the No. 9 vertical conductors of secondary frame S3, the interframe multiple conductors 21, the No. 3 horizontal link terminations and the No. 9 vertical conductors in tertiary frame T9, and thence via the inter-termination multiple conductors 22 to line LN99. As a result of the above-described operation, the preferred pair of terminations of lines LN00 and LN99 are now in a condition for electrical communication therebetween.

*"No Link Available" Condition—Line Indentity Indicia Modified*

As a further illustration of the operation of the exemplary system shown in the diagrammatical disclosure, the previously-stated hypothesis that the preferred switching stage termination of calling line LN00 is desirous of finding an idle link whereover to establish communication with the preferred switching stage termination of called line LN99 will be adhered to. It will be further assumed that during the previously-mentioned searching cycle, the electrical conditions on the horizontal terminations of the links in primary switching stage frame P0 and tertiary switching stage frame T9 cause them to test "busy" such that a "no link available" condition is found by the scanner circuit 19 to exist with respect to the interstage links serving the preferred pair of line terminations for calling line LN00 and called line LN99. The scanner circuit 19, as a result of its inability to find an idle link (i.e., "no link available"), returns to its normal or "start" condition. Incident to the occurrence of said "no link available" condition, as manifested by the scanner circuit 19 in returning to normal, circuitry resident in the common control circuit causes the previously-mentioned calling and called line identifying indicia to be suitably changed, altered, or modified into a new set of identifying indicia indicative of or designating a less-preferred pair of line terminations. The said new set of indicia causes the operation of a different combination of circuitry, comprising a different combination of primary frame and vertical flip-flops, and a different combination of tertiary frame and vertical flip-flops. Since, in the exemplary disclosure, the less-preferred line termination of calling line LN00 is in the No. 0 vertical of tertiary frame T0, the tertiary vertical flip-flop TV0 and the tertiary frame flip-flop T0 are operated; and since the less-preferred line termination of called line LN99 is in the No. 9 vertical of primary frame P9, the primary vertical flip-flop PV9 and the primary frame flip-flop P9 are operated. It is to be understood, of course, that the operation of these flip-flops to register the less-preferred indicia is accompanied by the release of the previously-operated flip-flops representative of the preferred calling and called line identifying indicia.

"Less-Preferred" Line Termination

Under control of the operation of the primary and tertiary frame flip-flops P9 and T0, respectively, the common control circuit causes scanner circuit 19 to initiate and perform a second searching cycle to simultaneously seek among the like-numbered horizontal terminations of the interstage links, in both the primary switching stage frame P9 and the tertiary switching stage frame T0, for an idle link to interconnect the less-preferred termination of calling line LN00 in tertiary frame T0 with the less-preferred line termination of called line LN99 in primary frame P9. During the said second searching cycle, the horizontal terminations of the links are successively scanned, and now let it be further assumed, for example, that the electrical conditions encountered on links numbered 0 through 5 cause them to test "busy" on one or both ends. When the searching cycle has progressed to the links numbered 6, which it will be further assumed are available for use on both frames, the electrical conditions encountered thereon cause them to simultaneously test "idle" and, responsive to said idle condition, the scanner circuit 19 is arrested in its searching cycle. For reasons which will be explained in a later section of this description, the failure of the link scanner to find an idle link capable of interconnecting the preferred terimnations of the calling and called lines during the first searching cycle will, by virtue of the inherent nature of the exemplary switching system herein disclosed, assure the availability of an idle link capable of interconnecting the less-preferred terminations of the calling and called lines during the second searching cycle. At this time, under control of the previously-operated primary frame and vertical flip-flops P9 and PV9, respectively, and the tertiary frame and vertical flip-flops T0 and TV0, respectively, the less-preferred termination of calling line LN00 in tertiary frame T0 is electrically connected to the less-preferred termination of called line LN99 in primary frame P9 by the operation of the previously-mentioned circuit-establishing devices severally represented by the intersecting horizontal and vertical lines of the frames. This connection may be traced over a path from calling line LN00, via the intertermination multiple conductors 23, over the No. 0 vertical conductors and the No. 6 horizontal link terminations in tertiary frame T0, the interframe multiple conductors 24, the No. 0 vertical conductors and the No. 9 horizontal conductors in secondary frame S6, the interframe multiple conductors 25, and the No. 6 horizontal link terminations and the No. 9 vertical conductors in primary frame P9 to called line LN99. As a result of the above-described operation, the less-preferred pair of terminations of calling line LN00 and called line LN99 are in a condition for electrical communication therebetween.

*Call From Line LN00 to Line LN09*

As a still further illustration of the operation of the exemplary system shown in the diagrammatical disclosure, consideration will now be given to the condition (chosen herein as part of the specific detailed embodiment) wherein both the calling line and the called line are terminated in the same frame of the primary switching stage, and the same calling and called lines are both also terminated in the same frame of the tertiary switching stage. Let it be assumed, for example, that the calling and called line identifying indicia indicate that the calling line LN00 is desirous of being connected to called line LN09. It will be apparent from the drawing that with respect to the *calling* line LN00, the preferred termination is in the No. 0 vertical of the primary switching stage frame P0, and the less-preferred termination thereof is in the No. 0 vertical of tertiary switching stage frame T0; and that with respect to the *called* line LN09, the preferred termination is in the No. 9 vertical of the tertiary switching stage frame T0, and the less-preferred termination thereof is in the No. 9 vertical of the primary switching stage frame P0.

The flip-flops associated with the primary and tertiary switching stage frames P0 and T0, respectively, together with the common control circuitry, will function in a manner similar to that previously described (relative to calling and called lines LN00 and LN99, respectively); and, assuming that the links numbered 9 "test idle" simultaneously, the searching cycle is terminated, and the preferred terminations of calling line LN00 and called line LN09 are electrically interconnected. This connection may be traced over a path from calling line LN00, over the No. 0 vertical conductors and the No. 9 horizontal link terminations in primary frame P0, the interframe multiple conductors 26, the No. 0 horizontal conductors and the No. 0 vertical conductors of secondary frame S9, the interframe multiple conductors 27, the No. 9 horizontal link terminations and the No. 9 vertical conductors in tertiary frame T0, and thence via the inter-termination multiple conductors 28 to called line LN09. As a result of the above-described operation, the preferred pair of terminations of lines LN00 and LN09 are now in a condition for electrical communication therebetween.

*Availability of Idle Link Assured—Modification of Line Identity Indicia Inhibited*

As shown in the diagrammatically disclosed exemplary system, in each of the frames of the primary and the tertiary switching stages, an equal number of verticals and horizontal link terminations are provided (e.g. ten of each). With an equal ratio of verticals to horizontals, and under the condition wherein both the calling line and the called line are terminated in the same frame of the primary switching stage (e.g. primary frame P0) and in the same frame of the tertiary switching stage (e.g. tertiary frame T0), such an arrangement, effectively, constitutes a 100 percent trunking scheme between the preferred terminations of a calling and a called line. With 100 percent trunking, it necessarily follows that for the vertical termination of any calling line there will always be a horizontal link termination available to serve said calling line; and from this conclusion it obviously follows, that under these conditions a "no link available" situation can ever arise under normal operating conditions. Therefore, means are provided to recognize the fact that both the calling line and the called line are terminated in the same frame of the primary switching stage and in the same frame of the tertiary switching stage, and under the control of said recognizing means to inhibit the common control circuit from altering, changing, or modifying the calling and called line identifying indicia into other indicia indicative of a less-preferred pair of line terminations. One reason for taking such inhibiting action is because, assuming that such a corresponding less-preferred pair of line terminations were designated, the second searching cycle concomitant thereto would be restricted to the same set of interstage linkages as were involved in the first searching cycle; and if the links test "busy" during the first searching cycle, the same set of links would probably also test "busy" during the assumed second searching cycle, which, it is obvious, would be quite pointless.

Another reason, which will be more apparent from the subsequent detailed description, is that the modifying or altering circuitry must be disabled under these special circumstances in order to prevent an undesirable circuit reaction between the equipment which registers the frame and vertical indicia.

*Nonblocking Aspect of Interstage Link Arrangement*

In the foregoing paragraphs, beginning with the heading "Over-all Operation of System," and in the intervening paragraphs, certain hypothetical combinations of calling and called lines and the operation of the diagrammatically-disclosed exemplary system relative thereto are described. Having this descriptive matter in mind, it is deemed appropriate, at this time, to discuss the reasons why the switching system has, in fact, "nonblocking" attributes.

In order that the operation of the nonblocking aspect of the invention (as embodied in the diagrammatical disclosure of FIG. 1) may be understood, a few structural characteristics precedent to such an understanding will be stated:

(1) The switching network is assumed to be a three-stage arrangement, comprising primary, secondary, and tertiary frames;
(2) An equal number of primary and tertiary frames are required;
(3) In each of the primary and tertiary frames an equal number of horizontal link terminations are required;
(4) The lines must be respectively dually terminated in like-numbered verticals of like-numbered primary and tertiary frames; and thus, an equal number of vertical line terminations must be provided in each pair of like-numbered primary and tertiary frames;
(5) In each of the primary and tertiary frames the number of lines having terminations in the verticals thereof must not exceed the number of link terminations in the horizontals thereof;
(6) The number of secondary frames must be equal to the total number of horizontal link terminations in any one primary or tertiary frame;
(7) Each secondary frame must be a square array wherein the number of horizontals or verticals must equal the number of primary or tertiary frames;
(8) The horizontal link terminations of the primary and tertiary frames are distributively connected to the horizontals and verticals, respectively, of the secondary frames; so that any particular potentially interconnectable pair of primary and tertiary horizontal link terminations must terminate in a respective pair of verticals and horizontals on the same secondary frame.

The results which will necessarily flow from a system having the above characteristics (for reasons which will hereinafter be explained in detail) are as follows:

(A) An idle available interstage link (idle-to-idle match) is *assured* during the first searching cycle when both of the lines between which interconnection is required are respectively terminated in like-numbered primary and tertiary frames;
(B) An idle available interstage link (idle-to-idle match) is *never assured* during the first searching cycle when the two lines between which interconnection is required are respectively terminated in differently-numbered primary and tertiary frames. In order to assure the finding of an idle interstage link, it is necessary that the sum of the idle primary link terminations and the idle tertiary link terminations on either the first or the second searching cycle must exceed by at least one, the total number of horizontal link terminations in any primary or tertiary frame.

With respect to the above-menitoned eight (8) structural characteristics, the exemplary disclosure, diagrammatically shown in FIG. 1, embodies these characteristics as follows:

(1) Three stages are provided, comprising primary, secondary and tertiary frames;
(2) Ten primary and ten tertiary frames are provided;
(3) Each of the primary and each of the tertiary frames is served by ten horizontal link terminations;
(4) Each line is respectively provided with two terminations, each such termination being respectively in like-numbered verticals of like-numbered primary and tertiary frames; and thus, an equal number of equipped vertical line terminations are provided in each frame of a pair of like-numbered primary and tertiary frames;
(5) In each of the primary and tertiary frames, provision is made for a maximum of ten verticals; therefore, the number of lines terminated therein cannot exceed the number of link terminations in the horizontals thereof;
(6) Ten secondary frames are provided and, since each primary and tertiary frame is served by its respective group of ten horizontal link terminations, the number of secondary frames is equal to the total number of horizontal link terminations in any one primary or tertiary frame;
(7) Each secondary frame is provided with ten horizontals and ten verticlas which in turn are equal to the number of horizontals in any primary or tertiary frame.
(8) Since there are ten primary and ten tertiary frames, each having ten horizontals, totals of 100 primary and 100 tertiary horizontal link terminations are provided; and since there are ten secondary frames, each having ten horizontals and ten verticals, totals of 100 secondary horizontals and 100 secondary verticals are provided. The horizontal link terminations of the primary and tertiary frames are respectively distributively connected to the horizontals and verticals of the secondary frames such that like-numbered primary and tertiary horizontal link terminations are interconnectable through the secondary frame having the respectively corresponding number.

In the immediately following discussion, certain matters will be adduced which will elucidate why the previously-mentioned results (i.e., A and B) will necessarily follow when a system (such as that in the exemplary embodiment) has incorporated therein the eight (8) necessary characteristics to ensure that the said system will be positively nonblocking.

When both of the lines between which interconnection is required are respectively terminated in like-numbered primary and tertiary frames (i.e., thte same-numbered pair of frames), an available idle interstage link (i.e., idle-to-idle match) is *assured* during the first searching cycle because, under any bona fide calling condition which may be encountered, the sum of the idle horizontal link terminations on the pair of like-numbered primary and tertiary frames will never be less than two in excess of the number of horizontal link terminations on either of said frames of said pair: in the present instance this sum will never be less than 12, it following from this that on a like-to-like test between the horizontal links of such a pair of frames there must always be found, among the ten tested on each frame, at least two idle ones which will match.

For example, if of the remaining eight (8) lines terminated in these two frames, four of the lines in a primary frame are respectively engaged in four co-existent connections to four other lines in the like-numbered tertiary frame, this will require the services of four horizontal link terminations in the like-numbered primary and tertiary frames, and hence, there will be six idle horizontal link terminations in each of the said like-numbered primary and tertiary frames, or a total of 12 idle horizontal link terminations for the pair of like-numbered primary and tertiary frames.

As another example, let it be assumed that of the remaining eight (8) lines terminated in these two frames, all of their primary frame terminations are respectively interconnected with eight (8) other lines on a differently-numbered tertiary frame (or frames). Since each line is dually terminated in like-numbered primary and tertiary frames, any line which is in use on either a primary or a tertiary frame will, perforce, free for use one of the horizotal link terminations on the other frame of the pair of like-numbered primary and tertiary frames. Therefore, at this time, there will be ten idle horizontal link terminations in the tertiary frame, and there will be two idle horizontal link terminations in the like-numbered primary frame, or a total of 12 idle horizontal link terminations in the pair of like-numbered primary and tertiary frames.

If, on the other hand, all of the lines having their dual terminations in a pair of like-numbered primary and tertiary frames are idle, at such time there will be ten idle horizontal link terminations in he primary frame, and there will also be ten idle horizontal link terminations in the like-numbered tertiary frame, or a total tof 20 idle horizontal link terminations in the pair of like-numbered primary and tertiary frames.

From the above examples, and others unnecessary to delineate, it is obvious that for any call involving the interconnection of any two lines having their respective terminations in like-numbered primary and tertiary frames, the sum of the idle horizontal link terminations in the said like-numbered primary and tertiary frames may be any number between 12 and 20, inclusive, and hence, under said conditions, an idle available interstage link is *assured* during the first searching cycle.

When the two lines between which interconnection is required are respelctively terminated in differently-numbered primary and tertiary frames, an available idle interstage link is *never* assured during the first searching cycle. To *assure* the finding af an idle interstage link during the first searching cycle, the sum of the idle horizontal link terminations on any such pair of differently-numbered primary and tertiary frames must never be less than one in excess of the total number of horizontal link terminations in either of said frames. In the present instance, since each primary frame and each tertiary frame is served by a total of ten horizontal link terminations, to *assure* an idle-to-idle match during the first searching cycle, the said sum of idle horizontal link terminations for any such pair of differently-numbered primary and tertiary frames must never be less than 11. If the sum of the idle horizontal link terminations for the pair of frames involved is 11 or more, it is obvious that, among the ten primary and the ten tertiary link terminations being tested during the first searching cycle, at least *one* idle-to-idle match will be *assured*. If the sum of the idle horizontal link terminations for the pair of differently-numbered primary and tertiary frames involved is *ten* or less, the finding of an idle interstage link during the first searching cycle is *possible* but is *never assured*. It will be appreciated, in this instance, that among the ten horizontal link terminations scanned in the respective primary and tertiary frames, the idle link terminations in the primary frame and the idle link terminations in the tertiary frame might not yield even *one* like-numbered pair of idle link terminations and, hence, the finding of an idle-to-idle match during the first searching cycle will be fortuitous.

Since each line, as previously stated, is dually terminated in a pair of like-numbered primary and tertiary frames, any line which is in use on either a primary or tertiary frame will, of necessity, free for use one of the horizontal link terminations of the other frame of the pair. Also, it must be borne in mind that in a communication system such as envisaged in the present invention, as in many prior art systems, the incidence of call origin and call completion is, in most instances, entirely subordinate to the will of the calling and called lines and, in all probability, will be on a chronologically random basis; and, on the other hand, each searching cycle is performed on a numerically sequential basis. Since the calls are randomly originated and randomly completed, and because of the wide variations which may occur in the volume of traffic on any line or group of lines, the groups of horizontal link terminations respectively serving the different primary and tertiary frames may encounter wide variations in the demand for the services of interstage links. Hence, at different times the horizontal link terminations of some frame or frames may be in heavy demand; and on another frame or frames the demand for the services of the horizontal link terminations may be very light. In other words, when the calling and called lines are respectively terminated in differently-numbered primary and tertiary frames, the preponderance of link-usage-distribution for implementing connections between any given pair of differently-numbered primary and tertiary frames, or, alternatively, for implementing connections between a *complementary* (or different) pair of differently-numbered primary and tertiary frames will vary from call to call. Obviously, there will be instances where the preponderance of link-usage-distribution is unfavorable during the *first* searching cycle and an idle interstage link cannot be found among the randomly distributed idle horizontal link terminations to interconnect the preferred terminations of the calling and called lines. In such an instance, if and when, during the *first* searching cycle, an idle interstage link is not available in a *first* pair of differently-numbered primary and tertiary frames, circuit means are operated incident to the recognition of such nonavailability to cause a *second* searching cycle to be initiated after the calling and called line identity indicia shall have been modified or changed to indicate a complementary (or different) pair of primary and tertiary frames; and, now the scanner will seek among the primary and tertiary horizontal link terminations respectively serving a complementary (or different) pair of differently-numbered primary and tertiary frames for an idle-to-idle match. Since, during the second searching cycle, the preponderance of link-usage-distribution will now be favorable, the sum of the idle horizontal link terminations in the complementary pair of primary and tertiary frames must be 11 or more; and, hence, the finding of an idle interstage link (idle-to-idle match) to interconnect the less-preferred terminations of the calling and called lines is *assured* during the *second* searching cycle. From the foregoing, it is thus apparent that regarding unlike-numbered frames, an idle-to-idle link match is assured in one or the other of the first and second searching cycles.

For example, let it be assumed that a preferred line termination in frame P0 is to be interconnected to a preferred line termination in frame T9. Also, let it be assumed that of the remaining nine (9) lines dually terminated in frames P0 and T0, five of the remaining lines in frame P0 are respectively engaged in five co-existent connections to lines having their preferred tertiary terminations in a differently-numbered frame or frames *other* than frame T9; and also let it be assumed that of the nine (9) remaining lines dually terminated in frames P9 and T9, five of the remaining lines in frame T9 are respectively engaged in five co-existent connections to lines having their preferred primary terminations in a differently-numbered frame or frames *other* than frame T0. This exemplary condition will require the services of five horizontal link terminations in each of the frames P0 and T9, and, hence, there will be five horizontal idle link terminations in each of the frames P0 and T9, or a sum of ten horizontal idle link terminations for the pair of frames P0 and T9. Bearing in mind the previously-described random nature of the incidence of call origin and call completion, it is obvious, for the reasons previously mentioned, that during the first searching cycle, the finding of an idle interstage link is *possible* but is *never* assured.

Let it now be assumed, for example, that the *first* searching cycle has been completed without having found an idle interstage link. At this time, as previously described, the line identifying indicia will be changed to specify the less-preferred line terminations, a new searching cycle will be initiated, and the horizontal link terminations respectively serving the pair of frames P9 and T0 will be scanned to seek an idle interstage link to interconnect the said pair of less-preferred terminations. Remembering that each line is dually terminated in like-primary and tertiary frames, it will be apparent that, at this time, there will be at *least* six idle horizontal link terminations on frame T0, and, also, there will be at *least* six idle horizontal link terminations on frame P9, or a sum of 12 idle horizontal link terminations for the pair of frames T0 and P9.

As another example, let it again be assumed that a preferred line termination in frame P0 is to be interconnected to a preferred line termination in frame T9. Now, let it be further assumed that of the remaining nine (9) lines dually terminated in the pair of frames P0 and T0 all, nine of the remaining lines in frame P0 are respectively engaged in nine co-existent connections to lines having their preferred tertiary terminations in a differently-numbered frame or frames other than frame T9; and, also, let it be assumed that of the remaining nine (9) lines dually terminated in frames P9 and T9 all nine of the remaining lines in frame T9 are respectively engaged in nine co-existent connections to lines having their preferred primary terminations in a differently-numbered frame or frames other than frame T0. This exemplary condition will require the services of nine horizontal link terminations in each of the frames P0 and T9, and, hence, there will be only one idle horizontal link termination in each of the frames P0 and T9, or a sum of two idle horizontal link terminations for the pair of frames P0 and T9. Under this condition, for the reasons previously stated, it is *possible* but not *probable* that an idle-to idle match will be encountered.

Let it again be assumed, for example, that the first searching cycle has been completed without having found an idle interstage link. Again, as previously described, the line identifying indicia will be changed to specify the less-preferred line terminations; a new searching cycle will be initiated; and the horizontal link terminations respectively serving the pair of frames P9 and T0 will be scanned to seek an idle interstage link to interconnect the said pair of less-preferred terminations. Remembering, again, that each line is dually terminated in like-numbered primary and tertiary frames, it will be apparent that, at this time, there will be ten idle horizontal link terminations on frame T0, and, also, there will be ten idle horizontal link terminations on frame P9 or a sum of 20 idle horizontal link terminations for the pair of frames T0 and P9.

If, on the other hand, all of the lines having their dual terminations in frames P0 and T0 are idle, and if all of the lines having their dual terminations in frames P9 and T9 are idle, there will be ten idle horizontal link terminations on each of the frames P0, T0, P9 and T9. Hence, there will be a sum of 20 idle horizontal link terminations for the pair of frames P0 and T9; and, conversely, there will also be a sum of 20 idle horizontal link terminations for the pair of frames P9 and T0, the said latter sum being of no immediate interest, because, obviously, in this instance, a second searching cycle will not be required to interconnect the preferred terminations of the calling and called lines.

*Alternative Arrangements*

Whereas in the diagrammatically disclosed exemplary system, in each of the frames of the primary and the tertiary switching stages, an equal number of verticals and horizontal link terminations are provided, it will be apparent that one skilled in the art could evolve a system having an unequal number of verticals and horizontal link terminations. For example, a system might be devised wherein each of the primary and tertiary switching stage frames employs ten verticals and only eight horizontal link terminations. In such an assumed system, under the conditions wherein both the calling line and the called line are terminated in the same frame of the primary switching stage and in the same frame of the tertiary switching stage, it is obvious that the first eight calling lines to demand service would exhaust the available horizontal link terminations. Under such an assumed condition, a "no link available" condition would be encountered. Here again, however, means would be provided to recognize the fact that both the calling line and the called line are terminated in the same frames of both switching stages, and under the control of said recognizing means to inhibit the common control circuit from attempting to alter, change or modify the calling and called line identifying indicia into other indicia indicative of a less-preferred pair of line terminations.

Whereas, in the diagrammatical exemplary disclosure, it is shown that for each group of lines the preferred and the less-preferred terminations thereof respectively appear in like-numbered frames of the primary and tertiary switching stages, it will also be apparent that one skilled in the art could readily devise a different pattern of inter-termination multiple connections. For example, a plan might be devised wherein the inter-termination multiple is "slipped." One possible variation might be such, for example, as having the preferred terminations of lines LN00 through LN09 in frame P0 of the primary switching stage, and having the less-preferred terminations of said lines in frame T1 (not shown) of the tertiary switching stage; in brief, the verticals of each of the primary switching stage frames would be inter-termination multipled to the verticals of the next higher numbered frame of the tertiary switching stage, etc. Further variations of this plan would readily occur to one skilled in the art.

Whereas, in the diagrammatical exemplary disclosure, it is shown that for each of the frames of the primary and tertiary switching stages, the vertical conductors thereof have access to only ten horizontal link terminations (i.e. the horizontal link terminations of one frame), it will also be apparent that one skilled in the art could readily devise an arrangement of intervertical multiple connections wherein lines could be terminated in the verticals of one or more frames of any switching stage. For example, the group of lines LN00 through LN09 (shown as having terminations in the verticals of frame P0 of the primary switching stage and in the verticals of frame T0 of the tertiary switching stage) could be intervertical multipled to the verticals of frame P3 of the primary switching stage and/or frame T3 of the tertiary switching stage.

Whereas, in the diagrammatical exemplary disclosure, there are shown ten frames per switching stage where each frame is a ten-by-ten arrangement of line terminations and link terminations, it will be obvious to those skilled in the art that any desired number of frames per switching stage could be employed and that each frame could involve more or less than a ten-by-ten arrangement of terminations. Where the aforementioned nonblocking attributes are desired in a three-stage system, it is necessary only to see that the network arrangement embodies the previously discussed characteristics which are required in order that these nonblocking attributes be inherent in the system.

SYMBOLS AND EQUIVALENT CIRCUITRY

This description is confined to FIGS. 11A through 17B in which are shown the several symbols employed throughout the detailed disclosure of FIGS. 3 to 10, inclusive, and the equivalent circuitry respectively corresponding to the symbols.

*The Transmission Gate*

With reference to the symbols shown in FIGS. 11A and 11B, and to the equivalent circuit therefor shown in FIG. 11C, transmission enabling gates are shown which are normally nonconductive (i.e. inhibited), and which will permit an input (IN lead) pulse of suitable polarity and amplitude to be transmitted therethrough to the output (OUT lead) only when a potential of suitable polarity and amplitude is applied to the control lead (CON lead) thereof. For example, let it be assumed that a steady biasing potential of −6 volts is applied to biasing lead BL11 and through resistor RB11, and that a potential of −24 volts (such, for example, as would be obtained from the output lead of a flip-flop in its "OFF" condition) is applied to control lead CL11 and through resistor RC11. Under this condition, the diode D11 is back-biased by 18 volts, and in order for an output pulse to be transmitted to output lead OL11 the amplitude of the input signal applied to lead IL11 would have to exceed +18 volts (in actual practice, would probably not exceed +16 volts). Therefore, in this description, it is assumed that the amplitude of an input pulse will not exceed +18 volts. Under the above conditions the gate is nonconductive (i.e. inhibited). Now let it be assumed, for example, that the flip-flop is "set" (i.e. turned on), and, as a result thereof, that the amplitude of the potential applied to control lead CL11 changes to −8 volts. At this time, the back-bias on diode D11 is changed to 2 volts. Therefore, under this condition, the gate becomes conductive for any positive-going input pulse having an amplitude in excess of 2 volts applied to lead IL11, and such a signal will be permitted to be transmitted therethrough to output lead OL11. The 2-volt margin is provided to prevent extraneous noise signals having an amplitude of less than 2 volts from being transmitted through the gate. The gate shown in FIG. 11B is of the slow-acting type and employs the same circuit configuration as for FIG. 11A; the slow-acting characteristic of the gate shown in FIG. 11B is obtained by suitably increasing the value of the capacitor C11 in FIG. 11C.

*The Inhibiting Gate*

With reference to the symbols shown in FIGS. 12A and 12B, and to the equivalent circuit therefor shown in FIG. 12C, a transmission inhibiting gate is shown which is normally conductive, but which will inhibit an input pulse (IN lead) from beng transmitted therethrough to the output (OUT lead) when a potential of suitable polarity and amplitude is applied to the control lead (CON lead). For example, let it be assumed that a steady biasing potential of −24 volts is applied to biasing lead BL12 and through resistor RB12, and that a potential of −24 volts (such, for example, as would be obtained from the output of a flip-flop in its "OFF" condition) is applied to the control lead CL12 and through resistor RC12, the diode D12 is not back-biased. In this condition, the gate is enabled; and if a positive-going potential (such, for example, as the previously mentioned 16 volt pulse) is applied to the input lead IL12, a positive-going pulse will appear on the output lead OL12. Now let it be assumed, for example, that the flip-flop is "set" (i.e. turned on), and, as a result thereof, that the amplitude of the potential applied to the control lead CL12 changes to −8 volts. At this time, the back-bias on the diode D12 is 16 volts. Therefore, under this condition, the gate becomes nonconductive (inhibiting) for any positive-going input potential having an amplitude of less than 16 volts applied to the lead IL12, and will inhibit such applied input pulse from being transmitted therethrough to output lead OL12. The gate shown in FIG. 12B is of the slow-acting type and employs the same circuit configuration as for FIG. 12A; the slow-acting characteristic of the gate shown in FIG. 12B is obtained by suitably increasing the value of the capacitor C12 in FIG. 12C.

*The "AND" Gate*

With reference to the symbol shown in FIG. 13A and to the equivalent circuit therefor shown in FIG. 13B, an "AND" gate, having a plurality of input leads IA13, IB13 and IN13, is shown, and which gate is normally nonconductive with respect to input potentials applied to any number *less than all* of such input leads, but which gate will permit an output potential to appear on its output (OUT lead) only when input potentials of suitable polarity and amplitude are concurrently applied to *all* of its input leads. For example, let it be assumed that a steady biasing potential of −12 volts is applied to biasing lead BL13 and through resistor RB13. Let it be further assumed, for example, that each of the input leads IA13, IB13, and IN13 is respectively connected to the output of a different flip-flop. With *all* of the flip-flops in the "OFF" condition, a potential of −24 volts will be applied to each of the input leads. Under this condition, *all* of the diodes DA13, DB13, and DN13 will be forwardly-biased, will afford almost zero impedance, and will be heavily conductive. At this time, due to the almost zero-voltage drop across the parallel-connected diodes, the potential available at the output lead OL13 will be substantially equal to the lowest negative potential applied to *any* of the input leads, in this case (assuming all inputs at −24 volts) −24 volts. Now let it be assumed, for example, that the flip-flop connected to input lead IA13 is "set" (i.e. turned on), and, as a result thereof, that the potential applied to input lead IA13 changes to −8 volts, thereby rendering diode DA13 nonconductive (by virtue of the 4-volt back-bias). Under this condition, since at least one of the other diodes is still heavily conductive (in this case, both diodes DA13 and DN13), the potential at the output lead OL13 remains unchanged. Now let it be further assumed, for example, that *all* of the flip-flops, respectively connected to input leads DA13, DB13, and DN13, are "set." Under this condition, each of the input leads will have −8 volts applied thereto, and, as a result thereof, each of the diodes will have a back-bias of 4 volts, causing each diode to present a very high impedance to its respective applied input potential. At this time, the potential available at the output lead OL13 will be substantially −12 volts (i.e. equal to the −12 volt biasing potential applied to lead BL13).

*The "OR" Gate*

With reference to the symbol shown in FIG. 14A, and to the equivalent circuit therefor shown in FIG. 14B, an "OR" gate, having a plurality of input leads IA14 and IB14, is shown, and which gate is normally (i.e., in the absence of an input signal) nonconductive, but which gate will permit an output potential to appear on its output (OUT lead) only when an input potential of suitable polarity and amplitude is applied *to one or more* of its input leads. For example, let it be assumed that a steady biasing potential of −24 volts is applied to biasing lead BL14 and through resistor RB14, and that each of the input leads IA14 and IB14 is respectively connected to the output of a different flip-flop. With *all* of the flip-flops in the "OFF" condition, a potential of −24 volts will be applied via input leads IA14 and IB14 to each of the diodes DA14 and DB14; and, as will be apparent, the potential available under these circumstances at the output lead OL14 will be substantially −24 volts. Now let it be assumed, for example, that the flip-flop connected to input lead IA14 is "set" (i.e. turned on), and, as a result thereof, that the flip-flop output potential applied to input lead IA14 changes from −24 volts to −8 volts, thereby rendering diode DA14 heavily conductive (by virtue of the 16-volt forward bias). At this time, since the diode DA14 will afford almost zero impedance, the voltage-drop across the diode DA14 will be practically zero, and, therefore, the potential available at the output lead OL14 will be substantially equal to the negative potential applied to the input lead, in this case (assuming an input of −8 volts) −8 volts. Let it be assumed, as a further example, that the flip-flop connected to input lead IB14 is also "set," causing a potential of −8 volts to be also applied to input lead IB14. This renders diode DB14 highly conductive, thereby causing it to present almost zero impedance. Under this condition, the potential appearing on the output lead OL14 will remain unchanged. However, if it be assumed, for example, that unequal potentials were to be applied to the input leads, for example −12 volts on one lead and −8 volts on the other lead, the voltage appearing at the output lead would be substantially equal to the higher positive (i.e., −8 volts) input potential. It is, of course, to be understood that "OR" gates having a greater number of input leads than the illustrated example will function in a similar manner to that above described.

*The Flip-Flop*

With reference to the symbols shown in FIGS. 15A, 15B, and 15C, and to the equivalent circuit therefor shown in FIG. 15D, flip-flops are shown wherein provisions are made for various input and output lead requirements; and wherein the setting of the switch or switches shown in FIG. 15D will adapt the flip-flop circuit to afford the connections specified in FIG. 15A, FIG. 15B, or FIG. 15C.

*Circuit Condition—Re: FIG. 15A*

With respect to FIG. 15A, which shows a "set" lead S15, a "reset" lead R15, and an "output" lead OL15, the circuit shown in FIG. 15D may be adapted to provide an equivalent circuit arrangement therefor by setting the wiper of reset switch RS15 on its contact RC15, by setting the wiper of output switch OS15 on its contact OC15, and by setting the wiper of buffer output switch BUS15 on its nonbuffer contact NBU15 to provide a potential of −6 volts for the collector of transistor 3Q15. Common reset switch CRS15 will be open.

*Circuit Condition—Re: FIG. 15B*

With respect to FIG. 15B, which is similar to FIG. 15A, but which shows in addition a "buffer output" lead BUL15, the circuit in FIG. 15D may be adapted to provide an equivalent circuit for FIG. 15B by using the same switch settings as for FIG. 15A, except that the wiper of buffer output switch BUS15 will be set on its buffer contact BC15 to connect a potential of −24 volts, through the winding of load relay LR15 to transistor 3Q15.

*Circuit Condition—Re: FIG. 15C*

With respect to FIG. 15C, which is similar to FIG. 15B but which shows in addition a "common reset" lead CR15, the circuit shown in FIG. 15D may be adapted to provide an equivalent circuit for FIG. 15C by using the same switch settings as for FIG. 15B, except that the wiper of common reset switch CRS15 will be set on its contact CRC15.

*Circuit Function—Re: FIG. 15A*

Let is be assumed that the requirements of the circuit are such that a flip-flop of the type symbolized by FIG. 15A is to be employed. The flip-flop is, essentially, a bistable circuit which in its "OFF" (i.e., not set) condition causes a potential of −24 volts to appear on its output lead OL15; and when the flip-flop is turned on (i.e., set), the potential on lead OL15 changes to −8 volts. Let it be assumed, for example, that the flip-flop is now in its "OFF" condition. Referring now to the equivalent circuit shown in FIG. 15D, the values of resistors 2R15 and 3R15 are such that, with a potential of −6 volts applied to resistor 2R15, and in the absence of an input signal (or "setting" pulse), the potential normally present at the junction of these two voltage-dividing resistors will be approximately −5 volts, by virtue of the isolating capacitor 1C15. Under this condition, with −6 volts applied to resistor 4R15 and with −24 volts applied to resistor 5R15, the junction of these two voltage-dividing resistors will be at approximately −9 volts, which voltage back-biases diode 2D15, and also back-biases diode 3D15 via a path through resistor 8R15 to ground. At this time, the base of p-n-p transistor 1Q15 is, effectively, at ground potential. Diode 2D15 in conjunction with resistors 4R15 and 5R15 prevent excessive voltages from being developed across p-n-p transistor 1Q15 and n-p-n transistor 2Q15. Under the above-described exemplary (normal) condition, the transistors 1Q15 and 2Q15, and p-n-p transistor 3Q15 are nonconductive; and the potential of the output lead OL15 through switch OS15 will be at substantially −24 volts (i.e., substantially equal to the −24 volt potential applied to resistor 7R15). Since, under the circuit condition equivalent to FIG. 15A, the buffer transistor 3Q15 is not used, the wiper of switch BUS15 is on its contact NBU15, thereby connecting the collector of transistor 3Q15 to −6 volts. Now let it be further assumed that, at this time, an input signal having a potential in excess of +6 volts (say +8 volts, for example) is applied to the input (or "set") lead S15, and through capacitor 1C15 to the junction of resistors 2R15 and 3R15, thereby overriding the −5 volt bias on transistor 1Q15, and turning the flip-flop on. Transistors 1Q15 and 2Q15 now become conductive. When the currents flowing through transistors 1Q15 and 2Q15 have reached saturation, the current flowing through the network 1L15 and the current flowing through resistor 9R15 are combined, and the combined currents flow through resistor 7R15. The increased current through resistor 7R15 increases its voltage-drop, thereby causing the voltage appearing on output lead OL15 to change to approximately −8 volts. When the flip-flop is turned on, the base of transistor 1Q15 assumes a potential of approximately −8 volts, and, therefore, diode 3D15 is back-biased by approximately 1 volt. With transistor 1Q15 saturated, its emitter is at a potential of approximately −8 volts, which potential causes the base of transistor 3Q15 to become more negative than the −6 volts available from the mid-point of the voltage-dividing resistors 2R15 and 3R15, thereby turning on transistor 3Q15. With transistor 3Q15 in its conductive condition, the current flowing in its collector circuit is limited to an extremely small value due to the low (−6 volts) potential applied through contact NBU15 of switch BUS15; and which small current flow is of no consequence under the circuit condition represented by FIG. 15A. Now let it be assumed that, at this moment, a "reset" signal having a potential in excess of +9 volts (say +10 volts, for example) is applied to "reset" lead R15, through reset switch RS15, isolating capacitor 2C15, and resistor 6R15 to the junction of resistors 4R15 and 5R15. The +10 volt positive-going reset pulse overrides the −9 volt potential at the junction of voltage-dividing resistors 4R15 and 5R15, thereby causing all of the transistors to become nonconductive, and thus resetting the flip-flop back to its previously-described normal condition.

*Circuit Function—Re: FIG. 15B*

Let it be assumed that the requirements of the circuit are such that a flip-flop of the type symbolized by FIG. 15B is to be employed. This flip-flop is of the same nature, and operates in substantially the same manner, as described with reference to FIG. 15A, with the exception, however, that in the circuit for FIG. 15B, the buffer output transistor 3Q15 is used to control a load device. Under this condition, the wiper of the buffer output switch BUS15 will be set on its contact BC15, thereby providing an additional or "buffer output" lead BUL15, terminated in −24 volts through the winding of a relay or other suitable load circuit. Now, let it be assumed that the transistors 1Q15 and 2Q15 have been operated and have reached saturation in the manner previously described with reference to FIG. 15A. With transistor 1Q15 saturated, its emitter is at a potential of approximately −8 volts, thereby turning transistor 3Q15 on, as described with reference to FIG. 15A. When transistor 3Q15 has become conductive, the potential at its collector changes from approximately −24 volts to −8 volts, due to the relatively heavy current flowing in the winding of the load relay LR15, which current will operate relay LR15.

*Circuit Function—Re: FIG. 15C*

Let it be assumed that the requirements of the circuit are such that a flip-flop of the type symbolized by FIG. 15C is to be employed. This flip-flop is of the same nature, and operates in substantially the same manner, as described with reference to FIG. 15B, with the exception, however, that in the circuit per FIG. 15C, in addition to the regular reset lead R15 a second, or "common reset," lead CR15 is used. Under this condition, the wiper of the common reset switch CRS15 will be set on its contact CRC15. Under this condition, a means is provided whereby, when a plurality of flip-flops are provided, a group comprising any desired number of such flip-flops may have their respective common reset leads connected together, and in turn connected to a suitable source of resetting potential, for simultaneously resetting the flip-flops of such group independently of their respective individual reset leads, such as R15. Now let it be assumed that, at this moment, assuming the flip-flop to be turned on as previously described, ground or a positive potential or a positive-going pulse of suitable amplitude is applied to common reset lead CR15. This potential is now extended via a path through contact CRC15, the wiper of common reset switch CRS15, and the isolating diode 4D15 to the base of transistor 1Q15, which base is now driven to ground potential. Under this condition, all of the transistors become nonconductive, thus resetting the flip-flop back to its previously-described normal condition.

*The Ring Counter*

With reference to the symbol shown in FIG. 16A, and to the symbolized circuitry shown in FIG. 16B, the interrelationship of a plurality of flip-flops coupled together by means of transmission gates to constitute a ring counter is shown. The flip-flops are of the type such as shown in FIGS. 15A and 15C, and described in the paragraphs pertinent thereto. The transmission gates are of the type such as shown in FIG. 11A, and described in the related paragraph.

Now having in mind the preceding descriptive matter relating to the flip-flop circuits and to the transmission gate circuits, the description immediately following will be confined to the operation of the ring counter, and with reference to FIGS. 16A and 16B.

*Ring Counter "Normal," Flip-Flop St "Set"*

First, let it be assumed that, at the conclusion of the immediately preceding operating cycle of the ring counter, and in a manner later to be described, the flip-flop ST (first, or "start," stage of the ring counter) has received a "set" pulse and, hence, is in its "set" or "ON" condition, and that all of the remaining flip-flops (stages "0" through "9") have been "reset" to their respective "OFF" conditions. Under this condition, the output lead ST16 will be at a potential of approximately −8 volts; each of the output leads 0–16 through 9–16 will be at a potential of approximately −24 volts; each of the buffer output leads BUL 0–16 through BUL 9–16 will be at a potential of approximately −24 volts; only the transmission gate TGS–16 will be in a "primed" condition (i.e., nearly enabled, by virtue of the −8 volt potential applied to its control lead "C" from the output of the flip-flop ST); and all of the remaining transmission gates TG0–16 through TG9–16 will be in an inhibiting condition, by virtue of the −24 volt potential applied to their respective control leads "C" from the outputs of flip-flops "0" through "9," respectively. Now let it be assumed that, at this moment, a positive-going input signal (in excess of 8 volts, but less than 24 volts, say 10 volts, for example) is applied via the "set" lead S16 to the "IN" leads of all of the transmission gates. Since, at this time, only gate TGS–16 is primed, the positive-going input signal applied to the "IN" lead thereof will cause an output signal in excess of positive 6 volts to appear on the "OUT" lead of gate TGS–16 only, which output signal will be applied to the "set" lead "S" of the flip-flop "0." Under this condition, flip-flop "0" is "set," or turned on; and the potential on the "OUT" lead of flip-flop "0" changes from −24 volts to −8 volts. The change in potential on the "OUT" lead from flip-flop "0" is evidenced on output lead 0–16 and on the control lead "C" of gate TGO–16, thereby causing this gate to assume a "primed" condition; and the potential change from −24 volts to −8 volts is also evidenced on the "reset" lead "R" of flip-flop ST, thereby causing the resetting of this flip-flop. The flip-flop ST, in assuming its reset, or turn-off condition, causes the potential on its output lead "OUT" to change from −8 volts to −24 volts. The change in potential on the "OUT" lead from flip-flop ST is evidenced on output lead ST16 and on the control lead "C" of gate TGS–16, thereby causing this gate to now change from a "primed" condition to an inhibiting condition; and the potential change from −8 volts to −24 volts (from the "OUT" lead of flip-flop ST) is also evidenced on the "reset" lead "R" of flip-flop 9, which potential change will, however, have no significant effect on the operation of flip-flop 9.

*Flip-Flop "0" "Set"*

At this point in the operating cycle of the ring counter only the second stage, or flip-flop "0," will be "set," or turned on. Under this condition, the output lead 0–16 will be at a potential of approximately −8 volts; each of the output leads ST16, and 1–16 through 9–16 will be at a potential of approximately −24 volts; the buffer output lead BUL 0–16 will be at a potential of approximately −8 volts; each of the buffer output leads BUL 1–16 through BUL 9–16 will be at a potential of approximately −24 volts; only the transmission gate TG0–16 will be in a primed condition, by virtue of the −8 volt potential applied to its control lead "C" from the output of flip-flop "0"; and all of the remaining transmission gates TGS–16, and TG1–16 through TG9–16 will be in an inhibiting condition, by virtue of the −24 volt potential applied to their respective control leads "C" from the outputs of their respective stage flip-flops. Now let it be assumed that, at this moment, a second positive-going signal is applied to "set" lead S16 and to the "IN" leads of all of the transmission gates. Since, at this time, only gate TG0–16 is "primed," the positive-going input signal applied to the "IN" lead thereof will cause an output signal to appear on the "OUT" lead of gate TG0–16 only, which output signal will be applied to the "set" lead "S" of flip-flop 1. Under this condition, flip-flop 1 will be "set"; and the potential on the "OUT" lead of flip-flop 1 will change from −24 volts to −8 volts. The change in potential on the "OUT" lead of flip-flop 1 is evidenced on output lead 1–16 and on the control lead "C" of gate TG1–16, thereby causing this gate to assume a "primed" condition; and the potential change from −24 volts to −8 volts is also evidenced on the "reset" lead "R" of flip-flop "0," thereby causing the resetting of this flip-flop. The flip-flop "0," in assuming its reset, or turned-off condition, causes the potential on its output lead "OUT" to change from −8 volts to −24 volts. The change in potential on the "OUT" lead from flip-flop "0" is evidenced on output lead 0–16 and on the control lead "C" of the gate TG0–16, thereby causing this gate to now change from a "primed" condition to an inhibiting condition; and the potential change from −8 volts to −24 volts (from the "OUT" lead of flip-flop "0") is also evidenced on the "reset" lead "R" of flip-flop ST, which potential change will have no significant effect on the operation of flip-flop ST. The flip-flop "0," in assuming its reset condition, also causes the potential on its output lead BUL 0–16 to change from −8 volts to −24 volts.

*Flip-Flop 1 "Set"*

At this point in the operating cycle of the ring counter, only the third stage, or flip-flop 1, will be "set," or turned on. Under this condition, the output lead 1–16 will be at a potential of approximately −8 volts; each of the output leads ST16, 0–16, (2–16 through 8–16, not shown), and 9–16 will be at a potential of approximately −24 volts; the buffer output lead BUL 1–16 will be at a potential of approximately −8 volts; each of the buffer output leads BUL 0–16, (BUL 2–16 through BUL 8–16, not shown), and BUL 9–16 will be at a potential of approximately −24 volts; only transmission gate TG1–16 will be in a "primed" condition, by virtue of the −8 volts applied to its control lead "C" from the output of flip-flop 1; and all of the remaining transmission gates TGS–16, TG0–16, (TG2–16 through TG8–16, not shown), and TG9–16 will be in an inhibiting condition, by virtue of the −24 volt potential applied to their respective control leads "C" from the outputs of their respective stage flip-flops. Now let it be assumed that, at this moment, a third positive-going signal is applied to "set" lead S16 and to the "IN" leads of all of the transmission gates. Since, at this time, only gate TG1–16 is "primed," the positive-going input signal applied to the "IN" lead thereof will cause an output signal to appear on the "OUT" lead of gate TG1–16 only, which output signal will be applied to the "set" lead "S" of the flip-flop of the next succeeding stage (not shown). Under this condition, the flip-flop of the next succeeding stage is "set"; and the potential on the output lead 2–16 related thereto (not shown) changes from −24 volts to −8 volts. In the manner described (with reference to flip-flop 1, for example), the setting of flip-flop 2 (not shown) will effect the resetting of flip-flop 1. The flip-flop 1, in assuming its reset, or turned-off condition, causes the potential on its output lead "OUT" to change from −8 volts to −24 volts. The change in potential on the "OUT" lead from flip-flop 1 is evidenced on output lead 1–16 and on the control lead "C" of gate TG1–16, thereby causing this gate to now change from a "primed" condition to an inhibiting condition; and the potential change from −8 volts to −24 volts (from the "OUT" lead of flip-flop 1) is also evidenced on the "reset" lead "R" of the flip-flop "0," which potential change will have no significant affect on the operation of flip-flop "0." The flip-flop 1, in assuming its reset condition, also causes the potential on its output lead BUL 1–16 to change from −8 volts to −24 volts.

*Flip-Flops 2 Through 8 (Not Shown) "Set"*

In a manner similar to that above described, the subsequent application of a series of positive-going input signals to the set lead S16 will cause the serial setting of flip-flops 2 through 8 (not shown), the resetting of the flip-flop of the preceding stage, and the "priming" of the transmission gate of the next succeeding stage, until the flip-flop 8 (not shown) of the ninth stage has been "set." The "setting," and the subsequent "resetting," of the flip-flops 2 through 8 (not shown) will also cause the potentials on their respecive related output leads 2–16 through 8–16 (not shown), and BUL 2–16 through BUL 8–16 (not shown) to assume a value of −8 volts for the "set" condition, and to assume a value of −24 volts for the "reset" condition. Now let it be assumed that, at this moment, a tenth positive-going signal is applied to the "set" lead S16 and to the "IN" leads of all of the transmission gates. Since, at this time, only gate TG8–16 (not shown) is "primed," the positive-going input signal applied to the "IN" lead thereof will cause an output signal to appear on the "OUT" lead of gate TG8–16 only, which output signal will be applied to the "set" lead "S" of the flip-flop 9. Under this condition, the flip-flop 9 will be "set"; and the potential on the "OUT" lead of flip-flop 9 will change from −24 volts to −8 volts. The change in potential on the "OUT" lead of flip-flop 9 is evidenced on output lead 9–16 and on the control lead "C" of gate TG9–16, thereby causing this gate to assume a "primed" condition; and the potential change from −24 volts to −8 volts is also evidenced on the "reset" lead "R" of flip-flop 8 (not shown) of the next preceding stage, causing it to be reset. The flip-flop 8 (not shown), in its reset condition, causes the potential on its output lead "OUT" to change from −8 volts to −24 volts. The change in potential on the "OUT" lead from flip-flop 8 is evidenced on its related output lead 8–16 (not shown) and on the control lead "C" of gate TG8–16 (not shown), thereby causing this gate to change from a "primed" condition to an inhibiting condition; and the potential change from −8 volts to −24 volts (from the "OUT" lead of flip-flop 8) is also evidenced on the "reset" lead "R" of the flip-flop 7 (not shown) of the next preceding stage, which potential change will produce no significant effect.

*Flip-Flop 9 "Set"*

At this point in the operating cycle of the ring counter, only the tenth (and last) stage, or flip-flop 9, will be "set," or turned on. Under this condition, the output lead 9–16 will be at a potential of approximately −8 volts; each of the output leads ST16, 0–16, 1–16 (and 2–16 through 8–16, not shown) will be at a potential of approximately −24 volts; the buffer output lead BUL 9–16 will be at a potential of approximately −8 volts; each of the buffer output leads BUL 0–16, BUL 1–16, and (BUL 2–16 through BUL 8–16, not shown) will be at a potential of approximately −24 volts; only the transmission gate TG9–16 will be in a "primed" condition, by virtue of the −8 volt potential applied to its control lead "C" from the output of flip-flop 9; and all of the remaining transmission gates TGS–16, TG0–16, TG1–16 (and TG2–16 through TG8–16, not shown) will be in an inhibiting condition, by virtue of the −24 volt potential applied to their resepective control leads "C" from the outputs of their respective stage flip-flops. Now let it be assumed that, at this moment, an eleventh positive-going signal is applied to the "set" lead S16 and to the "IN" leads of all of the transmission gates. Since, at this time, only gate TG9–16 is "primed," the positive-going input signal applied to the "IN" lead thereof will cause an output signal to appear on the "OUT" lead of gate TG9–16 only, which output signal will be applied to the "set" lead "S" of flip-flop ST (of the first stage) and to the "common reset" leads "CR" of all of the flip-flops "0" through "9" (of all of the remaining stages). Under this condition, the flip-flop ST (first stage) will resume its "set" or turned-on condition, and the flip-flop 9 will resume its "reset," or turned-off condition; and the output signal from the "OUT" lead of gate TG9–16 applied via conductor R16 to the "common reset" leads "CR" of flip-flops 0, 1 (and 2 through 8, not shown), will produce no significant effect. The flip-flop 9, in assuming its reset condition, causes the potential on its lead "OUT" to change from −8 volts to −24 volts. The change in potential on the "OUT" lead from flip-flop 9 is evidenced on output lead 9–16 and on the control lead "C" of gate TG9–16, thereby causing this gate to now change from a "primed" condition to an inhibiting condition; and the potential change from −8 volts to −24 volts (from the "OUT" lead of flip-flop 9) is also evidenced on the reset lead "R" of flip-flop 8 (not shown) of the next preceding stage, which potential change will have no significant effect on the operation of flip-flop 8. The flip-flop 9, in assuming its reset condition, also causes the potential on its output lead BUL 9–16 to change from −8 volts to −24 volts.

*"Common Reset" Operation*

If, at any point in the operating cycle of the ring counter, ground or a positive potential or a positive-going pulse of suitable amplitude is applied to the "common reset" lead R16, and thence to the "set" lead "S" of flip-flop ST, and to the "common reset" leads "CR" of all of the flip-flops 0 through 9, the flip-flop ST will be "set," or turned on, and the flip-flops 0 through 9 will be "reset" or turned off. Thus, the ring counter will be returned to its "normal" condition (i.e., the condition described under the caption "Ring Counter 'Normal,' Flip-flop ST 'Set' ").

*Operation of Load Relays*

The load relays, such for example as indicated by the dotted rectangles designated LR 0–16 through LR 9–16, respectively connected in series with output leads BUL 0–16 through BUL 9–16, will respectively be operated if the operation of the ring counter is arrested at that stage for an interval of sufficient duration to afford time for the relay to operate. Otherwise, if the ring counter advances rapidly from stage-to-stage, the current flow in the output leads (BUL 0–16, etc.) will be of insufficient duration to permit the operation of the load relays, respectively connected thereto.

*The Regenerative Amplifier*

With reference to the symbol shown in FIG. 17A, and to the equivalent circuit therefor shown in FIG. 17B, a regnerative amplifier is shown which is a monostable circuit, and which in its stable or nonexcited state causes a potential of approximately —24 volts, with respect to ground, to appear on its output lead OL17. When an exciting potential of suitable amplitude, polarity and duration is applied to its input lead IL17, this amplifier is capable of generating, and producing at its output lead OL17, a positive-going output pulse of substantially rectangular wave form, manifested by the output potential changing from —24 volts to —8 volts with respect to ground, the said output pulse having a duration determined by the resistance-capacity characteristics of the circuit, a typical duration being, for instance, in the order of a few milliseconds. This amplifier may be used when the amplitude of the available input pulse has become attenuated, and, hence, the pulse must be amplified to a value sufficient to effect the operation of a succeeding circuit, or where it is for some other reason desirable to interconnect components to assure reliable operation thereof. Let it be assumed, for example, that the amplifier is now in its stable or nonexcited state. Referring now to the equivalent circuit shown in FIG. 17B, a biasing potential of —6 volts with respect to ground is applied through resistor 1R17 to the base of the p-n-p transistor 1Q17 and to the collector of the n-p-n transistor 2Q17. At the same time, a biasing potential of —6 volts with respect to ground is applied to diode 1D17, and through series-connected resistors 2R17 and 3R17 to a biasing potential of —24 volts with respect to ground, thereby causing the junction between diode 1D17 and resistor 2R17, and the emitter-base junction of the p-n-p transistor 1Q17 connected thereto, to assume a potential of approximately —6.5 volts with respect to ground. Under this condition, both of the transistors 1Q17 and 2Q17 are turned off, or substantially nonconductive. Also, at this time, a biasing potential of —6 volts with respect to ground is applied to diode 2D17, and the current flow therethrough and through resistor 3R17 is used to establish a biasing current at the junction of diode 2D17, resistors 3R17 and 2R17, and isolating capacitor 1C17. The amplitude and duration of the input pulse applied to input lead IL17 must be sufficient to cause a large enough current to flow to overcome the biasing current at the junction of diode 2D17 and resistor 3R17, and also to provide sufficient current flow through limiting resistor 2R17 to the emitter of the p-n-p transistor 1Q17 to turn this stage on. This biasing arrangement is used to prevent false triggering of the amplifier. Series limiting resistor 2R17 effectively isolates the source of triggering or input potential from the amplifier input, and thereby prevents the amplitude of the output pulse from overshooting. The voltage drop across resistor 2R17 dissipates any excess in signal input voltage over the voltage required to turn the amplifier stage on. The diode 1D17 provides a low impedance path for the emitter-to-base saturation current of the amplifier after it has been turned on. Timing capacitor 2C17 determines the duration of the output pulse. When the amplifier is in its nonexcited state, capacitor 2C17 is discharged, both sides being at a potential of —24 volts with respect to ground. When the amplifier is excited or turned on, the saturation current will charge capacitor 2C17. As capacitor 2C17 is being charged, the charging current will decrease at an exponential rate until the current is insufficient to maintain saturation current through the transistors, at which point the transistors will again become substantially nonconductive. Resistor 4R17 provides a leakage discharge path for capacitor 2C17, and, thus, determines the duration of the output pulse. Resistor 5R17 provides a protective low resistance shunt around transistor 2Q17 to prevent excessive "ICO multiplication" during the time that the amplifier is in its off or nonexcited state. A potential of —24 volts with respect to ground, applied through resistor 6R17, maintains the output lead OL17 at a potential of approximately —24 volts with respect to ground when the amplifier is in its nonexcited state. Now let it be assumed that a positive-going input pulse having a minimum amplitude of 2 volts and a duration of at least two microseconds is applied to input lead IL17 and through capacitor 1C17 to the junction of diode 2D17 and resistors 2R17 and 3R17. This input pulse will overcome the normal biasing current, and will forward-bias the emitter-base junction of the p-n-p transistor 1Q17, thereby causing the emitter of transistor 1Q17 to assume and maintain a positive potential with respect to ground until the circuit is turned on, at which time the emitter of transistor 1Q17 returns to a potential of approximately —6.5 with respect to ground, due to the voltage drop across diode 1D17. The regenerative characteristics of the circuit will cause transistors 1Q17 and 2Q17 to go into a condition of saturation. During this time the capacitor 2C17 is charging. The large initial charging current will maintain transistors 1Q17 and 2Q17 in a condition of saturation after the input pulse to lead IL17 has ceased. During the interval that the transistors 1Q17 and 2Q17 are in a condition of saturation, the output lead OL17 will be at a potential of approximately —8 volts with respect to ground. As the capacitor 2C17 is being charged, the voltage across the capacitor increases, and the charging current decreases until, in approximately 35 milliseconds, for instance, it will have decreased to a value where transistor 2Q17 can no longer conduct at saturation value. At this time, transistors 1Q17 and 2Q17 cut of, the amplifier then returns to its stable or nonexcited state, and the potential on output lead OL17 returns to —24 volts with respect to ground. With transistor 2Q17 in its cut-off state, capacitor 2C17 continues to completely discharge through resistor 4R17.

DETAILED DESCRIPTION—INTRODUCTORY MATTER

*Detailed Contacts*

Having in mind the objects and features of the invention, the general or over-all operation of the diagrammatically-illustrated exemplary system, and the respective purposes and functions of the several circuit symbols with reference to their respective equivalent circuits, this detailed description will be directed to the detailed circuits of the exemplary system as illustrated in FIGS. 3 to 10, inclusive.

The detailed circuits include a plurality of multicontact relays. To simplify the drawings, the "detached contact" method of exposition has been employed for the multicontact relays. In the detached contact method the relay contacts generally are not shown adjacent to the magnetic core (or winding), but are separated therefrom. Each relay core (or winding) is given a functional designation such, for example, as "H0"; and each relay contact is given a designation such, for example, as "H0–1," thereby identifying each relay contact with the relay core by which its operation is controlled. The multicontact relays shown on the drawings, and their respective core and contact locations are as follows: the respective cores of relays H0, H3, H6, and H9 are shown on FIG. 9, and the contacts thereof are shown on FIGS. 3 and 5; the core of relay P0 is shown on FIG. 10, and the contacts thereof are shown on FIG. 3; the respective cores of relays P3, P6 and P9 are shown on FIG. 10, and the contacts thereof are shown on FIG. 6; the core of relay T0 is shown on FIG. 10, and the contacts thereof are shown on FIG. 5; the respective cores of relays T3, T6, and T9 are shown on FIG. 10, and the contacts thereof are shown on FIG. 8; the respective cores of relays PV0, PV3, PV6, and PV9 are shown on FIG. 10, and the contacts thereof are shown on FIG. 6; and the respective cores of relays TV0, TV3, TV6, and TV9 are shown on FIG. 10, and the contacts thereof are shown on FIG. 8.

*Frames, Organization and General Crosspoint Structure*

Figure 3:
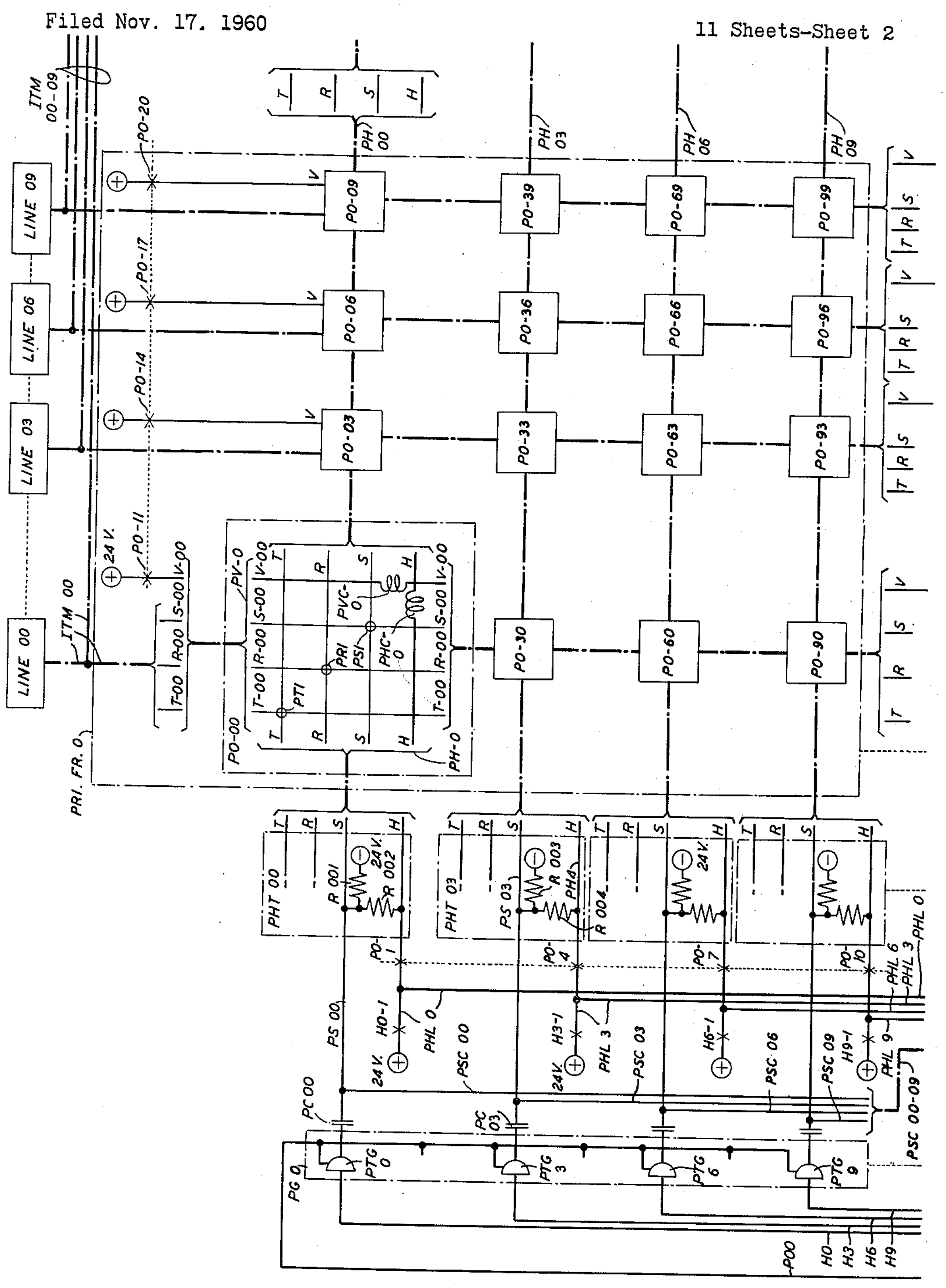
FIGS. 3 and 6 show the primary switching frame arrangement and circuitry, the line terminations therein, and the frame-selecting circuitry associated therewith.
Figure 4:
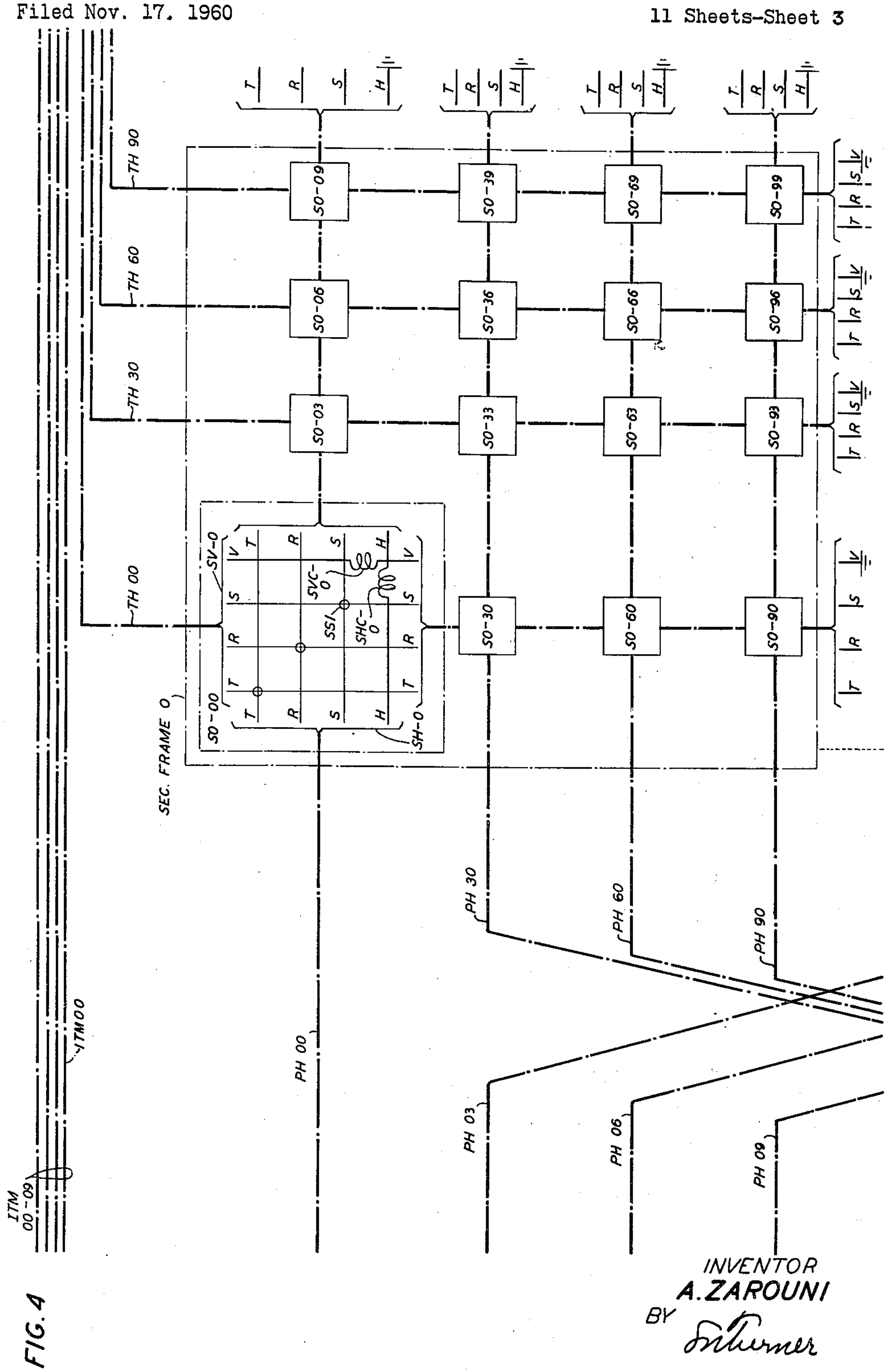
FIGS. 4 and 7 show the secondary frame arrangement and circuitry, and the primary frame-to-secondary frame multiples.
Figure 5:
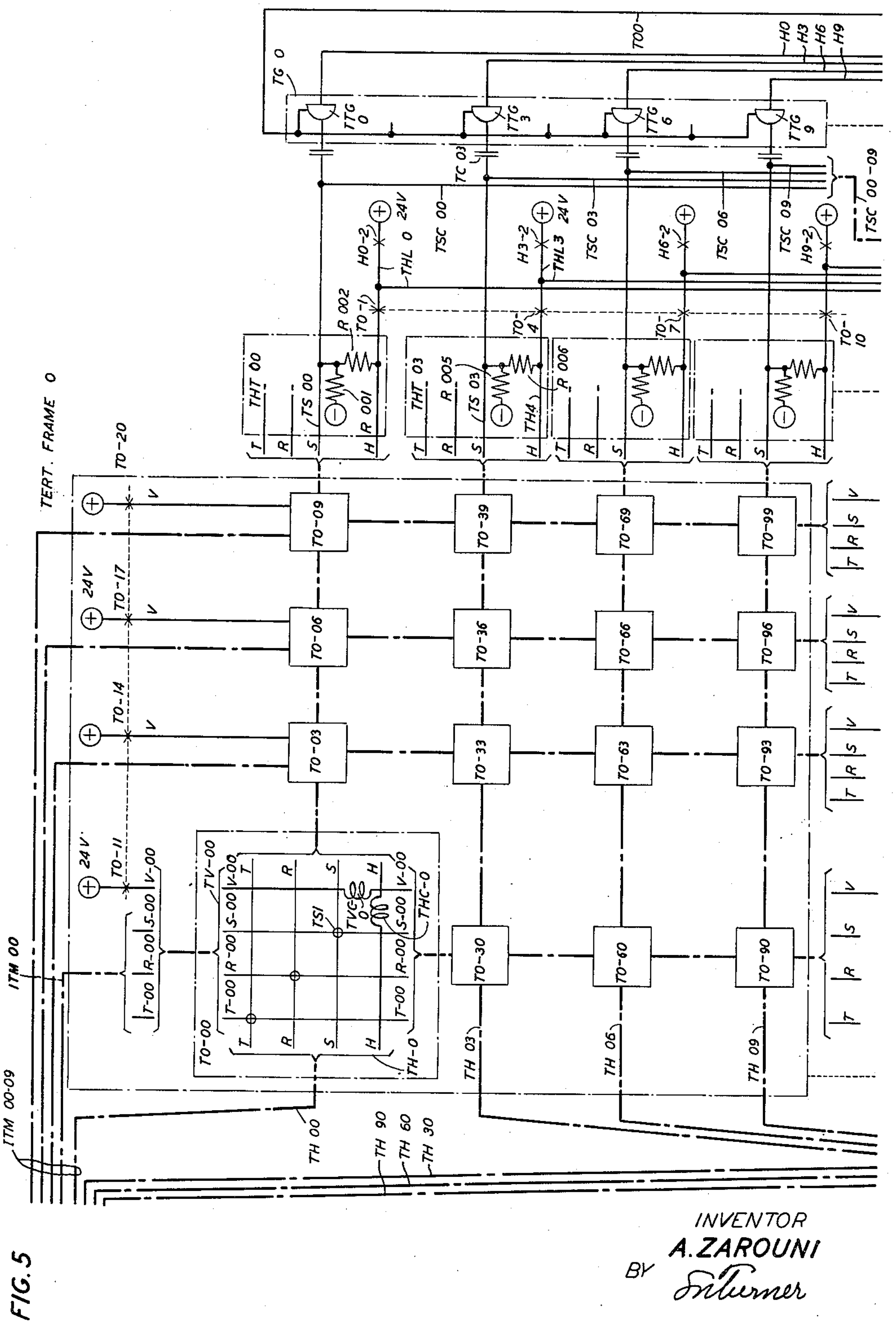
FIGS. 5 and 8 show the tertiary switching frame arrangement and circuitry, the line terminations therein, the frame-selecting circuitry associated therewith, and the secondary frame-to-tertiary frame multiples.
Figure 6:
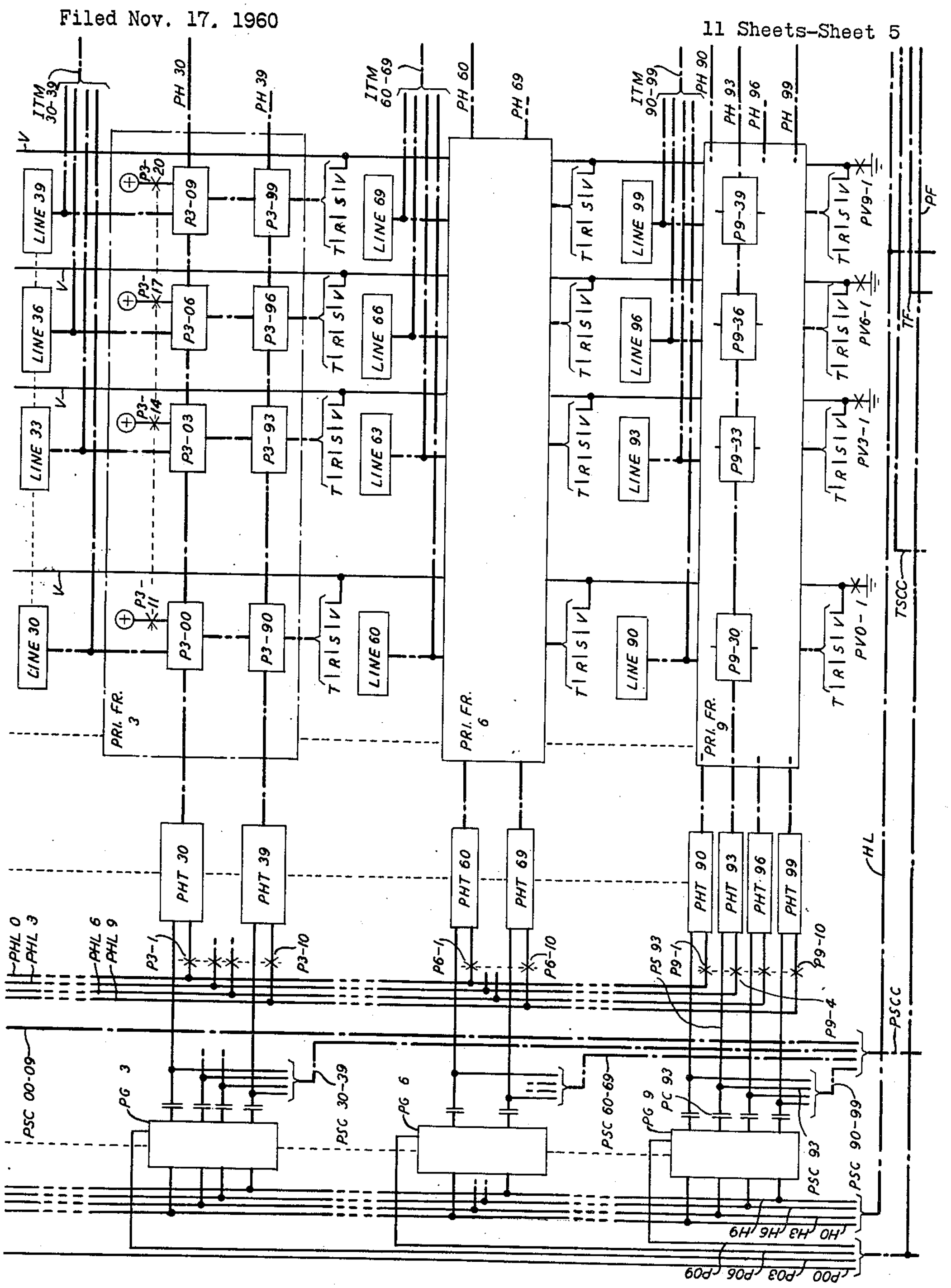
Figure 7:
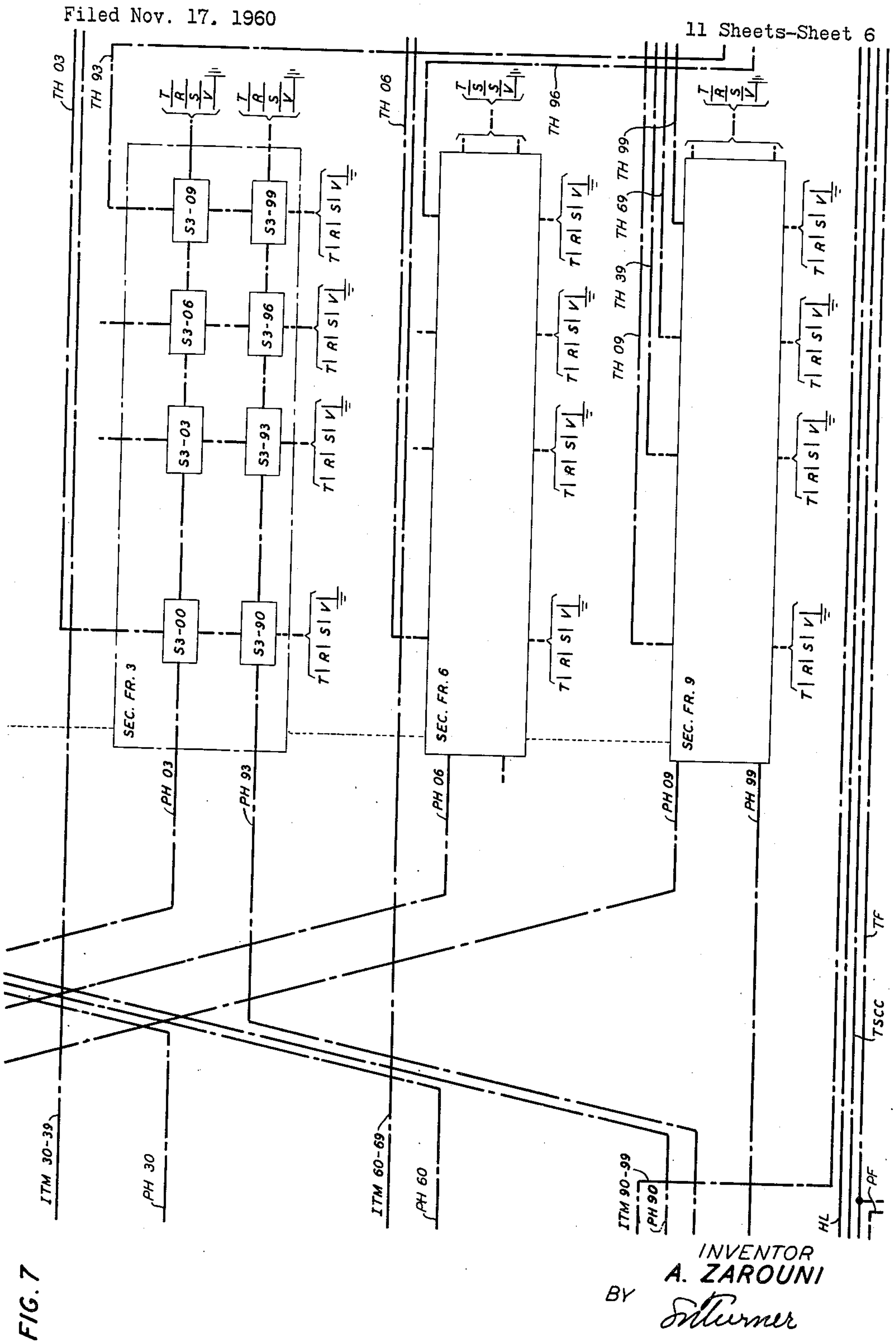
Figure 8:
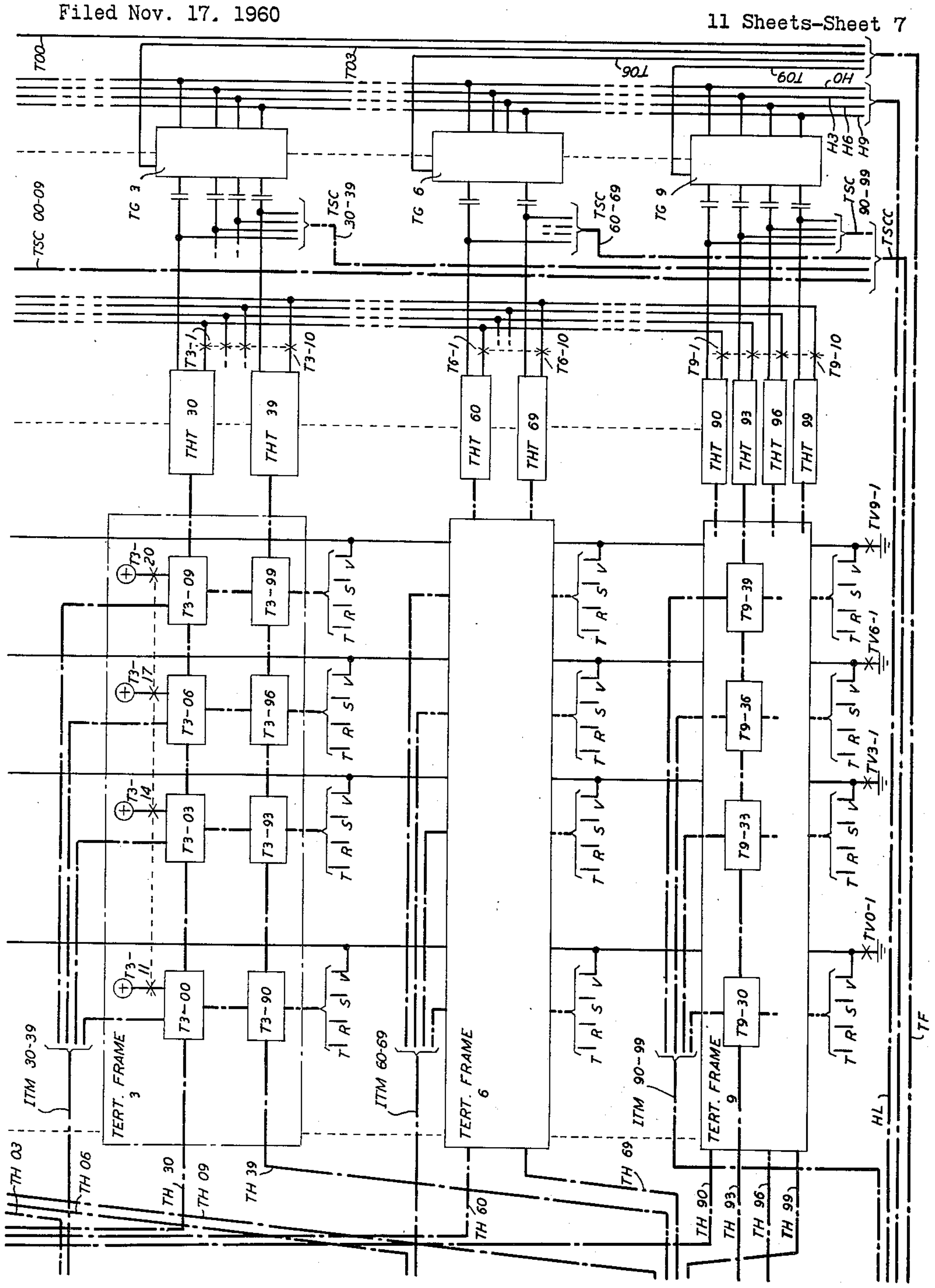

The primary switching stage frames shown in FIGS. 3 and 6, the secondary frames shown in FIGS. 4 and 7, and the tertiary switching stage frames shown in FIGS. 5 and 8 are, in general, similar in structure. Each frame, in the exemplary disclosure, provides connective means for ten sets of "vertical" conductors (such, for example, as PV–0, SV–0, and TV–0) and ten sets of "horizontal" conductors (such, for example, as PH–0, SH–0, and TH–0); each vertical set, in the exemplary disclosure, comprises four conductors T, R, S, and V, and each horizontal set, in the exemplary disclosure, comprises four conductors T, R, S, and H. The terms "vertical" and "horizontal" are adopted merely for convenience of nomenclature, with reference to the drawings, and are not to be construed as a limitation on the physical structure of the several frames. Each intersection of a set of vertical conductors with a set of horizontal conductors, and hereinafter to be referred to as a "crosspoint," is represented conventionally by a rectangle. One exemplary crosspoint in each stage has been shown in detail within a broken-line rectangle, such as P0–00, S0–00, and T0–00 for the respective primary, secondary and tertiary stages. To simplify the drawings, each of the remaining crosspoints of the several frames is symbolized by a smaller solid-line rectangle (such, for example, as P0–03, S0–03, T0–03, etc.). In the exemplary disclosure, each such crosspoint, in brief, comprises a vertical coil and a horizontal coil, a plurality of normally-open "dry-reed" contact-making devices, and a suitable magnetic circuit. When the vertical and horizontal coils are concurrently energized by currents of suitable amplitude and polarity, the plurality of contacts electromagnetically associated therewith will operate and, by virtue of the magnetic circuit, will remain locked up upon removal of either or both of the energizing currents until released by a reversal of the current flowing through either or both of the coils. An example of a structure wherein are incorporated such a combination of coils, contact-making devices and a magnetic circuit, and having the above-described mode of operation is disclosed in the copending application Serial No. 770,377, filed October 29, 1958, by R. L. Peek, Jr. Another example of such a structure, and having a similar mode of operation is disclosed in the copending application Serial No. 831,237, filed August 3, 1959, by O. D. Jacobson et al. Within the broken-line rectangles representing the circuitry of typical crosspoints (such, for example, as P0–00), the circles (such for example, as PT1, PR1, and PS1) at the intersections of the vertical and horizontal lines) are intended to represent the plurality of circuit-establishing devices; and the coils PVC–0 and PHC–0, respectively, represent the "vertical" and "horizontal" coils.

*Lines*

In the exemplary system disclosed in the detailed circuits, it is contemplated that ten primary frames, ten secondary frames, and ten tertiary frames will be provided. This arrangement will provide dual terminations in the primary and tertiary frames for one hundred lines; and, the crosspoints of the secondary frames will provide means whereby any pair of like-numbered primary and tertiary horizontal link terminations may be electrically joined. However, for the sake of drawing simplicity, certain of the frames and lines have been omitted; the omitted portions are indicated by broken lines. Each of the lines, represented by a solid-line rectangle (such, for example, as line 00), provides suitable circuitry for terminating the conductor or conductors of a communications line, trunk, or channel (not shown) serving or being served by a switching center, and terminating either locally or in a distant switching center of destination, and for coupling such a line to the frames of the switching stages. Each of the lines (such, for example, as line 00) is assumed to be of a type of circuit well known in the art wherein "on-hook" (idle) and "off-hook" (busy) conditions of the associated line conductors are manifested by suitable corresponding signals on its sleeve lead (S–00, for example).

*Horizontal Links*

A plurality of interstage links is provided, each end of a link being respectively terminated in a horizontal link termination (such, for example, as PHT 00 and THT 00), each end of such link termination respectively comprising a group of conductors (such, for example, as PH 00 and TH 00). Each link is accessible at one end via its horizontal link termination (e.g., PHT 00) to the plurality of lines terminated in a particular primary switching stage frame (e.g., primary frame 0), and each link is accessible at its other end via its other horizontal link termination (e.g., THT 00) to the plurality of lines terminated in a particular tertiary switching stage frame (e.g., tertiary frame 0). Access between the lines and the horizontal link conductors is afforded by the crosspoints (e.g., P0–00 and T0–00).

*Horizontal Link Terminations, and Testing Thereof*

Each horizontal link termination (such, for example, as PHT 00) comprises suitable potentiometry (i.e., resistors R 001 and R 002) for producing potential conditions to respectively indicate whether the link is idle or busy.

*Link Idle*

When an interstage link (PH 00, for example) is not in use, the −24 volt potential (with respect to ground) applied through its series-connected resistors (i.e., R 001 and R 002), through its series-connected switching stage horizontal coils (i.e., BHC–0, etc.), and through its series connected secondary coils (i.e., SHC–0, etc.) to ground will cause its sleeve conductor (i.e., PS 00) of its horizontal link termination (i.e., PHT 00) to be at a suitable negative potential (of, say approximately −12 volts), thereby causing the link to test "idle" when an idle link is being sought.

When seeking for an idle link, the like-numbered horizontal link terminations in the primary and tertiary frames will be successively and simultaneously scanned. A link is available for use only when the like-numbered link terminations in both frames simultaneously test "idle."

*Link Busy*

When an interstage link is serving a connection, the line (line 00, for example) being served by that horizontal link termination, since it is in a "busy" condition, will have ground to its sleeve lead (i.e., S–00), which ground will extend through a contact (i.e., PS1) of the crosspoint (i.e., P0–00) to the sleeve lead (i.e., PS 00) of the horizontal link termination (i.e., PHT 00), and to the junction of its voltage-dividing resistors (i.e., R 001 and R 002), thereby overriding the negative potential at said junction, and causing the link sleeve lead (i.e., PS 00) to assume ground potential. Under this condition, the link termination will test "busy" when an idle link is being sought.

When the like-numbered horizontal link terminations in either the primary frame or the tertiary frame, or in both the primary and the tertiary frames, test busy, a "no link available" signal will be given.

*Link Seizure*

When, in accordance with line identity data, an idle link is being sought to serve a particular line (line 00, for example), a particular switching stage frame (primary or tertiary) will have been designated, corresponding to the location of the termination of the line (e.g., line 00), by the operation of a particular frame relay (P0, for example); and a particular horizontal link termination will have been designated by the finding of a link which tests "idle," and the concomitant operation of the "horizontal" relay (H0, for example) corresponding thereto. With the relays P0 and H0 operated, the +24 volt potential (with respect to ground) is extended through contacts H0–1 and P0–1 (FIG. 3), the series-connected switching stage horizontal coils (i.e., PHC–0, etc.), and through its series-connected secondary horizontal coils (i.e., SHC–0, etc.) to ground. Further, the +24 volt potential extended through contacts H0–1 and P0–1 is also applied to series-connected resistors R 002 and R 001, and is opposed by the −24 volt potential applied to resistor R 001. Since resistors R 001 and R 002 are substantially equal, the potential at the junction thereof and on the sleeve lead PS 00 will transiently assume a null or substantially zero value (with respect to ground). This transient condition is of very short duration and will persist only until the crosspoint (i.e., P0–00) shall have operated to close its contacts. When the crosspoint (i.e., P0–00) operates, the "off-hook" ground on vertical (line) sleeve lead (i.e., S–00) is extends through a contact (i.e., PS1) to the junction of resistors R 001 and R 002, thereby causing the link sleeve lead PS 00 to assume a ground potential. Whereas this portion of the description is particularly directed to the details of the operation of only one horizontal link termination (i.e., PHT 00) it is obvious from the preceding descriptive matter that a complete interstage link comprises two like-numbered horizontal link terminations, each of said link terminations being respectively connectable to the verticals of a particular primary frame and to the verticals of a particular tertiary frame. It is, therefore, equally obvious that this portion of the description applies with equal force to any horizontal link termination appearing in any primary frame or in any tertiary frame.

*Line Identity Registration—Preferred Terminations*

When a connection between a calling and an idle called line is to be made, the electrical indicia indicative of the preferred frame and vertical locations of the calling and called line are respectively provided by devices CI1 and CI2 (FIG. 10). The devices CI1 and CI2 do not constitute an essential part of the present disclosure, but are ancillary thereto, and are merely shown to indicate a suitable source of calling and called line electrical indicia to facilitate the operation of the devices employed for effecting the selection of horizontal and vertical links. Under control of the electrical stimuli corresponding to a given set of calling line (line 00, for example) and called line (line 99, for example) identity indicia, and representing the preferred fame and vertical locations of the calling and called lines, a unique combination of four selecting relays (FIG. 10) will be operated comprising: a primary vertical relay (PV0, for example), a primary frame relay (P0, for example), a tertiary vertical relay (TV9, for example), and a tertiary frame relay (T9, for example).

*Line Identity Registration—Modified*

When a connection between a calling and an idle called line is to be made, such as the above example of line 00 calling line 99, and when during the ensuing search for an idle interstage link to interconnect the preferred pair of line terminations of the calling line (primary frame 0, primary vertical 0) and called line (tertiary frame 9, tertiary vertical 9), no idle link is available, a "no link available" signal will be given. Incident to the occurrence of the "no link available" condition, control circuit means (shown on FIG. 10) will operate to suitably alter, change, or modify the registrations of the preferred frame and vertical locations of the calling and called lines to the registrations of the less-preferred frame and vertical locations of the calling and called lines, such as relays T0 and TV0 for calling line 00, and relays P9 and PV9 for the called line 99, and institute a search for an idle interstage link to interconnect the less-preferred pair of line terminations.

*Line Identity Registration Modification Inhibited*

Under the condition where the calling line (line 00, for example) and the called line (line 09, for example) are both terminated in the same primary frame and in the same tertiary frame, as in the exemplary embodiment, circuit means are provided for recognizing such condition, for inhibiting the operation of the means for altering, changing, or modifying the calling and called line location indicia, and commensurate therewith, for restricting the selection of a link to a single scanning of the single plurality of links serving these frames, thereby precluding an obviously unnecessary second scanning of the links of the same group.

*Nonlocking Aspects of System—Résumé*

From the previous description it will be remembered that:

(A) An idle available interstage link (idle-to-idle match) is *assured* during the *first* searching cycle when both of the lines between which interconnection is required are respectively terminated in like-numbered primary and tertiary frames;

(B) An idle available interstage link (idle-to-idle match) is *never assured* during the *first* searching cycle when the two lines between which interconnection is required are respectively terminated in differently-numbered primary and tertiary frames. In order to *assure* the finding of an idle interstage link, it is necessary that the sum of the idle primary link terminations and the idle tertiary link terminations on *either* the first or the second searching cycle must exceed by at least one, the total number of horizontal link terminations in any primary or tertiary frame.

DETAILED CIRCUIT DESCRIPTION

*Tracing Call*

Having in mind the foregoing "Introductory Matter," this detailed circuit description is directed to the operation of the detailed circuits of the exemplary system as illustrated in FIGS. 3 to 10, inclusive. With respect to the nonblocking aspects of the system, the details of the operation of the circuits will be influenced by whether or not the calling and called lines are respectively terminated in like-numbered primary and tertiary frames; and when the calling and called lines are respectively terminated in like-numbered primary and tertiary frames, the operation of the circuits will be further influenced by whether an idle interstage link is found during the first searching cycle or whether a second searching cycle is required to find an idle interstage link. There are, in general, three typical situations (identified as A, B and C) encounterable in establishing an interconnection between a calling and a called line. This description, therefore, is resolved into three subsections; and each such subsection is respectively directed to one of these three situations, which are as follows:

*Situation A.*—Where the calling line (line 00 of FIG. 3, for example) and the idle called line (line 09 of FIG. 3, for example) are respectively terminated in like-numbered primary and tertiary frames (FIGS. 3, 4 and 5); where, during the first searching cycle, the finding of an idle link for interconnecting the preferred terminations of such a combination of calling and called lines is a necessary concomitant; and where link searching is limited to a single searching cycle.

*Situation B.*—Where the calling line (line 00, for example) and the idle called line (line 99 of FIG. 6, for example) are respectively terminated and in differently-numbered primary and tertiary frames (FIGS. 3 through 8), and where, during the first searching cycle, an idle link is found to interconnect the preferred terminations of the calling and called lines.

*Situation C.*—Where the calling and idle called lines are as in Situation B; but where, during the first searching cycle, no idle link is available to interconnect the preferred terminations of the calling and called lines; where, incident to said nonavailability of a link, the line identity indicia is altered, changed, or modified to designate the less preferred line terminations of said calling and called lines; where a second searching cycle is initiated; and where, during said second searching cycle, an idle link is found to interconnect the said less-preferred pair of line terminations.

SITUATION A
(Line 00 calling line 09)

*Line 00 Requires Service*

Let it now be assumed, for example, that line 00 (FIG. 3) requires service. Such a demand for service will occur as the result of the communication facility (such, for example, as a line, trunk, or a local station) connected to the line (e.g., line 00) changing its status from idle (or "on-hook") to busy (or "off-hook"). Such change in status of a communication facility will be manifested by a suitable and corresponding potential change on the sleeve conductor (e.g., S–00) of the line (e.g., line 00). For example, it will be assumed that for the "on-hook" condition, the sleeve conductor (e.g., S–00) will be open; and it will be further assumed that when the line (e.g., line 00) goes to the "off-hook" condition, the sleeve conductor will assume substantially ground potential.

*Determining Line Identities*

Assuming that the calling line 00 is in an "off-hook" condition and that it is desired to effect a connection to an idle called line 09, the identities of the calling and called lines are determined by equipments represented by rectangles CI1 and CI2 (FIG. 10). As earlier stated, the devices such as indicated by the rectangles CI1 and CI2 do not constitute an essential part of the present disclosure but are ancillary thereto, and are shown merely to indicate suitable sources of indicia, respectively representative of the preferred terminations of the calling and called lines.

*Designation of Preferred Terminations*

As a result of the determination of the calling and called line identities, their respective preferred switching stage terminations are designated for interconnection. Since it is assumed, in this instance, that line 00 is calling line 09, it will be necessary to designate the preferred terminations of said calling and called lines in order that an idle interstage link may be sought whereby to establish an interconnection therebetween. As earlier stated, each line is, respectively, dually terminated in like-numbered verticals of like-numbered primary and tertiary frames. For example, the conductors T–00, R–00, and S–00 of line 00 (FIG. 3) are connected, via inter-termination-multiple cable ITM 00, to the number 0 vertical of primary frame 0 and to the number 0 vertical of tertiary frame 0 (FIG. 5). In a similar manner, the conductors of the other lines (e.g., line 03 of FIG. 3, etc.) are dually connected, via their respective inter-termination-multiple cables (e.g., ITM 01–09, etc.) to their respective like-numbered verticals in like-numbered primary and tertiary frames.

*Setting of Vertical and Frame Flip-Flops*

The designation of the respective preferred terminations of the calling and called lines results in the "setting" of "vertical" and "frame" flip-flops definitive of the terminations. Since the *preferred* line termination of *calling* line 00 is in the number 0 vertical of primary frame 0 (FIG. 3), the calling line identity indicia which is determined by CI1 (FIG. 10) causes electrical stimuli to be transmitted, via cable CLV and conductor PVS0, to effect the setting of the primary vertical flip-flop PV0 (FIG. 10); and, similarly, electrical stimuli from CI1 are transmitted, via cable CLF and conductor PS0, to effect the setting of the primary frame flip-flop P0 (FIG. 10). Also, since the *preferred* line termination of *called* line 09 is in the No. 9 vertical of tertiary frame 0 (FIG. 5), the called line identity indicia which is determined by CI2 (FIG. 10) causes electrical stimuli to be transmitted, via cable CDV and conductor TVS9, to effect the setting of the tertiary vertical flip-flop TV9 (FIG. 10); and, similarly, electrical stimuli from CI2 are transmitted, via cable CDF and conductor TS0, to effect the setting of the tertiary frame flip-flop T0 (FIG. 10).

*Inhibit Interaction Between "Settings" of Primary and Tertiary Frame Flip-Flops*

The "setting" of the primary and tertiary frame flip-flops definitive of or designating the respective frame locations of the preferred calling and called lines, respectively terminating in like-numbered primary and tertiary frames, is accompanied by the control of circuitry which inhibits undesirable reaction between such flip-flops. At this time, due to the fact that the calling and the called lines are respectively terminated in like-numbered primary and tertiary frames i.e., primary frame 0 (FIG. 3) and tertiary frame 0 (FIG. 5), the PS0 and the TS0 inputs to the match-frame "AND" gate F0 (FIG. 10) will be concurrently enabled. Therefore, at this time, an electrical potential change, indicative that the calling and the called lines are respectively terminated in like-numbered primary and tertiary frames, is applied, via conductor MF00, one of the inputs of the match-frame "OR" gate MF0 (FIG. 10), and the output conductor FMS, to the "set" (S) input lead of frame-match flip-flop FM (FIG. 10). The setting of flip-flop FM causes an electrical potential change to be transmitted, via lead FM0, to the parallel-connected control leads of the slow-acting transmission inhibiting gates: TI0 to TI9, inclusive; PI0 to PI9, inclusive; TVI0 to TVI9, inclusive; and PVI0 to PVI9, inclusive (FIG. 10). The said slow-acting transmission inhibiting gates are normally receptive to input pulses applied thereto and will produce corresponding, but slightly delayed, output pulses; but when their parallel-connected control leads are energized, as above described, these gates become non-receptive (or inhibitive) with respect to potentials applied to the input leads thereof. Thus, these gates in their inhibitive condition prevent the change in electrical potential on the output leads (such, for example, as P00, FIG. 10), of any of the operated or "set" flip-flops (such, for example, as P0, FIG. 10) among the flip-flops P0 to P9, inclusive, T0 to T9, inclusive, PV0 to PV9, inclusive, and TV0 to TV9, inclusive, from producing an output potential on any of the output leads (such, for example, at TR0, FIG. 10) from any of the said gates (such, for example, as gate TI0, FIG. 10). This, in turn, inhibits the application of potential conditions, via the conductors in cables TFR, PFR, TVR, and PVR to the "reset" conductors (such, for example, as TR0, FIG. 10) of the primary and tertiary frame flip-flops. Therefore, when the calling and called lines are respectively terminated in like-numbered primary and tertiary frames, the setting of any primary frame flip-flop (e.g., P0, FIG. 10) is inhibited from "resetting" any tertiary frame flip-flop (e.g., T0, FIG. 10). This inhibiting circuitry, as will appear hereinafter, is not effective whenever the lines to be interconnected are on different-numbered primary and tertiary frames.

*Operation of Vertical and Frame Relays*

The "setting" of the primary and tertiary vertical and frame flip-flops also causes the operation of corresponding primary and tertiary vertical and frame relays. The setting of the flip-flops PV0, P0, TV9, and T0 (FIG. 10), causes electrical potentials to be transmitted via their respective BU (buffer output) leads to, respectively, effect the operation of primary vertical relay PV0 (FIG. 10), primary frame relay P0 (FIG. 10), tertiary vertical relay TV9 (FIG. 10), and tertiary frame relay T0 (FIG. 10). The concurrent operation of relays PV0 and P0 completes a circuit through contact PV0–1 (FIG. 6), the series-connected primary vertical coils (such, for example, as PVC–0, FIG. 3), and contact P0–11 (FIG. 3), to +24 volts, thereby energizing the said series-connected primary vertical coils and *preparing* an operating path for one of the primary "crosspoints" (such, for example, as P0–00, FIG. 3). At the same time, the operation of relay P0 (FIG. 10) closes a plurality of other contacts (e.g., P0–1, etc. of FIG. 3), thereby *preparing* an energizing path for the series-connected primary horizontal coils (such, for example, as PHC–0 of FIG. 3) and the series-connected secondary horizontal coils (such, for example, as SHC–0 of FIG. 4) to ground. Likewise, the concurrent operation of relays TV9 and T0 (FIG. 10) completes a circuit through contact TV9–1 (FIG. 8), the series-connected tertiary vertical coils (such, for example, as TVC–9, not shown), and contact T0–20 (FIG. 5) to +24 volts, thereby energizing the said series-connected tertiary vertical coils and *preparing* an operating path for one of the tertiary crosspoints (such, for example, as T0–09 of FIG. 5). At the same time the operation of relay T0 (FIG. 10) closes a plurality of other contacts (e.g., T0–1, etc. of FIG. 5), thereby *preparing* an energizing path for the series-connected tertiary horizontal coils (such, for example, as THC–0 of FIG. 5) and the series-connected secondary vertical coils (such, for example, as SVC–0 of FIG. 4) to ground. In short, by the above-described circuit operation, the respective identities of the calling and called lines have been determined; the respective preferred calling and called line terminations have been designated in terms of primary and tertiary vertical and frame locations; and circuits have been *prepared* for the operation of crosspoints in the primary, secondary and tertiary frames.

*Enabling of Frame Gates*

The "setting" of primary and tertiary frame flip-flops P0 and T0, respectively, causes the enabling of the primary and tertiary frame gates PG 0 and TG 0, respectively of FIGS. 3 and 5.

The setting of the flip-flop P0 (FIG. 10) causes an electrical potential change to be transmitted, via conductor P00 in cable PF, to the parallel-connected control leads of primary transmission enabling gates PTG 0 to PTG 9 (FIG. 3), inclusive, of primary frame gate PG 0 (FIG. 3), thereby enabling the said primary transmission gates to accept input potentials when applied thereto. At the same time, the electrical potential change on conductor P00 of flip-flop P0 (FIG. 10) is transmitted, via cable PF, conductor P00 and through the primary "OR" gate P0G (FIG. 9), and output conductor PS, to one of the inputs of the starting "AND" gates SAG (FIG. 9). Also, at the same time, the electrical stimuli from CI1 (FIG. 10) are transmitted, via cable CLF and conductor PS0, to one of the inputs of the match-frame "AND" gate F0 (FIG. 10).

The setting of the flip-flop T0 (FIG. 10) causes an electrical potential change to be transmitted, via conductor T00 in cable TF, to the parallel-connected control leads of tertiary transmission enabling gates TTG 0 to TTG 9 (FIG. 5), inclusive, of tertiary frame gate TG 0 (FIG. 5); thereby enabling the said tertiary transmission gates to accept input potentials when applied thereto. At the same time, the electrical potential change on conductor T00 of flip-flop T0 (FIG. 10) is transmitted, via cable TF, conductor T00 and through the tertiary "OR" gate T0G (FIG. 9), and output conductor TS to the other of the inputs of the starting "AND" gate SAG (FIG. 9). Also, at the same time, the electrical stimuli from CI2 (FIG. 10) are transmitted, via cable CDF and conductor TS0, to the other of the inputs of the match-frame "AND" gate F0 (FIG. 10). At this time, in addition to the previously-described circuit operations, the primary and tertiary frame gates PG 0 (FIG. 3) and TG 0 (FIG. 5), respectively, are concurrently enabled; the two inputs of starting "AND" gate SAG (FIG. 9) are concurrently enabled; and the two inputs of match-frame "AND" gate F0 (FIG. 10) are concurrently enabled.

*Start Link-scanning*

The concurrent setting of the primary and tertiary frame flip-flops P0 and T0, respectively (FIG. 10) also effectuates control circuitry which recognizes that the preferred primary and tertiary frame locations have been determined and thereby sets the "start" flip-flop SF (FIG. 9) which, in turn, enables the gate SCG (FIG. 9) which, in turn, enables pulses from the oscillator SCO (FIG. 9) to be transmitted to the line-scanning ring counter LSRC (FIG. 9) to effect the advancement thereof.

At this time, due to the concurrent enablement of the PS and TS inputs to starting "AND" gate SAG (FIG. 9), an electrical potential change is applied, via conductor SS, to the "set" (S) input lead of the start flip-flop SF (FIG. 9). The setting of flip-flop SF causes an electrical potential change to be transmitted, via conductor SE, to the control lead of the scanner-control transmission enabling gate SCG (FIG. 9), thereby enabling the said transmission gate to accept input pulses as supplied thereto, via conductor SP, by the output of the scanning control oscillator SCO (FIG. 9) and to transmit scanning control pulses, via conductor SCP, to the "set" lead (S) of the link-scanning ring counter LSRC (FIG. 9). The start flip-flop SF (FIG. 9), it will be remembered, is a bi-stable device and, hence, will remain in its "set" or turned-on condition until "reset" or turned off by a suitable output pulse, via conductor SR, from the start-reset "AND" gate SRAG (FIG. 9). The start flip-flop SF, therefore, will not be "reset" until, during the progress of a searching cycle, an idle interstage link (idle-to-idle match) is detected, as will be described later. With the link-scanning ring counter in its normal or reset condition, stage S if the ring counter will be in the "set" condition; and the potential condition supplied by stage S to the recycle control lead RC is, at this time, of no consequence with respect to the operation of the circuitry connected thereto, comprising the input leads of transmission enabling gates PL0 to PL9, inclusive; TL0 to TL9, inclusive; PVL0 to PVL9, inclusive; and TVL0 to TVL9, inclusive (FIG. 10).

*Advance Link-scanning Ring Counter to Zero Position*

The first pulse from the oscillator SCO (FIG. 9) causes the line-scanning ring counter LSRC (FIG. 9) to advance from its "start" position to the next or zero position.

The oscillator SCO (FIG. 9) supplies pulses at a 50-kilocycle rate to control the stepping of link-scanning ring counter LSRC (FIG. 9). With the ring counter LSRC in its normal, or "reset," condition there will be no useful output potentials from any of the stages thereof. When an electrical impulse from oscillator SCO (FIG. 9) is applied, via lead SP, to the input of gate SCG (FIG. 9) an electrical potential change is applied, via lead SCP, to the "set" (S) lead of ring counter LSRC (FIG. 9), causing the ring counter to advance from its start stage (S) to its 0 stage. With the ring counter advanced to its 0 stage, an electrical potential change is transmitted from stage 0, via buffer output conductor HBU 0 (FIG. 9), to the winding of "horizontal" relay H0 (FIG. 9). The H0 relay may or may not operate during the time that the ring counter is in stage 0, depending upon other circumstances to be hereinafter explained. At the same time, an electrical potential change is transmitted from the 0 stage of ring counter LSRC (FIG. 9), via output lead H0 in cable HL, to the parallel-connected input leads of the No. 0 primary transmission gates such, for example, as PTG 0 (FIG. 3) and the parallel-connected input leads of the No. 0 tertiary transmission gates such, for example, as TTG 0 (FIG. 5) in tertiary gate TG 0 (FIG. 5).

*Testing for Idle Horizontal Link Terminations—No. 0 Interstage Link Unavailable*

With the link-scanning ring counter in its zero position, the function of the link-scanning circuitry is to test the availability (idle-to-idle match) of the No. 0 primary and tertiary horizontal link terminations.

At this time, let it be remembered that the respective frame and vertical locations of the calling and the called lines have been ascertained; and a suitable and corresponding combination of frame and vertical relays (i.e., P0, T0, PV0, and TV9, FIG. 10) has been operated to designate the calling and called line frame and vertical locations.

Let it be assumed, for example, that at this time the No. 0 primary horizontal link termination of primary frame P0 (FIG. 3) is in use in connection with a call involving some line (line 03, for example) on primary frame P0. Under such circumstances, since the line (03, for example) in the primary frame P0 is busy (in an "off-hook" condition) its grounded sleeve conductor will extend over its "crosspoint" contact, to the sleeve conductor PS 00 (FIG. 3) of the No. 0 primary horizontal link termination PHT 00 (FIG. 3), thereby causing sleeve conductor PS 00 to assume ground potential.

Digressing briefly, it must be borne in mind that from the instant that the start flip-flop SF (FIG.9) was set, and until it is subsequently reset, the electrical conditions encountered, on the sleeve conductors of the primary and/or tertiary horizontal link terminations may be as follows:

(*a*) *—12 volts.*—The sleeve conductor of any *idle* horizontal link termination will remain biased at a steady potential of —12 volts with respect to ground.

(*b*) *Ground.*—The sleeve conductor of any *busy* horizontal link termination will remain at a steady ground potential.

(*c*) *Change from ground to —12 volts.*—If any *busy* horizontal link termination becomes *idle*, the potential on the sleeve conductor will revert from ground to —12 volts.

It will be remembered that the primary frame flip-flop PO (FIG. 10) is in its turned-on or "set" condition, and that the change in electrical potential (i.e., a positive-going pulse) on conductor P00 (FIG. 10) has been applied, via cable PF, to the control lead of transmission enabling gate PTG 0 (FIG. 3). At this time, it will also be remembered that with the link-scanning ring counter LSRC (FIG. 9) advanced to its 0 stage, an electrical potential change (i.e., a positive-going pulse of approximately 16 volts with respect to ground) is applied via conductor H0 in cable HL to the input lead of gate PTG 0 (FIG. 3) which gate, being in an enabled condition, causes a positive-going output pulse of approximately 16 volts to be applied through capacitor PC 00 to sleeve conductor PS 00 (FIG. 3), but which positive-going output pulse is nullified by the ("off-hook") ground potential existing on sleeve conductor PS 00. Therefore, with the No. 0 primary horizontal link termination in a busy condition, the "off-hook" ground potential on conductor PS 00 (FIG. 3) is extended, via conductor PSC 00 in cables PSC 00–09 and PSCC to the correspondingly designated input conductor of primary coincidence "OR" gate PCOG (FIG. 9). Similarly, if at the same time the No. 0 tertiary horizontal link termination THT 00 (FIG. 5) of tertiary frame 0 (FIG.5) is in use in connection with a call involving some line (line 06, for example), on tertiary frame 0, the "off-hook" ground on sleeve conductor TS 00 (FIG. 5) will be extended, via conductor TSC 00 in cables TSC 00–09 and TSCC to the correspondingly designated input conductor of tertiary coincidence "OR" gate TCOG (FIG. 9). Each "OR" gate such as PCOG or TCOG (FIG. 9) is provided with a plurality of such input leads (a maximum of 100 primary and 100 tertiary leads being envisaged in the exemplary disclosure). Each such "OR" gate will have its input leads concurrently energized in one manner or another, the potential on each such input lead respectively indicating the instant condition of the sleeve conductor of the horizontal link termination connected thereto. The output potential of such an "OR" gate will vary in accordance with the input potential, or combination of input potentials, applied thereto and, in any case, will be substantially equal to the most positive input potential. Thus, the output potential which such an "OR" gate can produce due to horizontal link conductor potentials alone is controlled only by the potentials of —12 volts, ground, or transition from ground to —12 volts supplied thereto from the sleeve conductors of the horizontal link terminations. In none of these instances will the output conductor from such an "OR" gate carry any positive-going pulse or positive-going voltage change. In the instant example, the grounds applied to the input leads PSC 00 and TSC 00 (assuming, for example, that the remaining input leads are at this time at a potential of —12 volts) will cause the potentials on their respective output conductors PSRA and TSRA to assume the most positive input potential, which, in this instance, is ground. The presence of ground on more than one of the input leads will produce the same effect.

As will be apparent from the drawing, the outputs of the "OR" gates PCOG and TCOG (FIG. 9) are respectively connected to the inputs of the regenerative amplifiers PRA and TRA (FIG. 9). Each of the amplifiers PRA and TRA comprises an input isolating capacitor (as earlier described with reference to FIG. 17B). Such an amplifier may be triggered only by a positive-going exciting pulse having a minimum amplitude of 2 volts; and, when so excited, the output potential of such an amplifier will change from —24 volts to —8 volts, with respect to ground; and such an output pulse will be of short duration. The outputs of amplifiers PRA and TRA (FIG. 9) are respectively connected to the two inputs of the start-reset "AND" gate SRAG. Since in the instant example, the input potentials to the leads PSC 00 and TSC 00 of "OR" gates PCOG and TCOG, respectively (FIG. 9), have been assumed to be ground, the respective output potentials therefrom will be ground; and, hence, no positive-going potential will be applied to the input leads of amplifiers PRA and TRA (FIG. 9). Therefore, the amplifiers PRA and TRA will remain in their stable or nonexcited state, the respective output conductors thereof will remain at a steady potential of —24 volts with respect to ground, and due to the absence of positive-going input pulses to the "AND" gate SRAG the output potential thereof will remain at a steady potential of —24 volts with respect to ground. Therefore, at this time, due to the absence of a positive-going input pulse to the "reset" lead SR, the start flip-flop SF will remain in its "set" condition, and the searching cycle will be permitted to continue uninterruptedly until (in a manner to be hereinafter described) an idle interstage link is detected.

If, on the other hand, the sleeve conductor of *either* the primary horizontal link termination *or* the tertiary horizontal link termination should be found to test idle, and, conversely, the sleeve conductor of the *other* end of the horizontal link termination should test busy, the search for an idle interstage link would still not be satisfied, and, therefore, an idle interstage link must, perforce, be sought among the other primary and tertiary horizontal link terminations.

*Testing for Idle Horizontal Link Termination—No. 1 and No. 2 Interstage Links Unavailable*

When the No. 0 primary and tertiary horizontal link terminations fail to concurrently test "idle," the presence of the "off-hook" ground on the sleeve conductor of *either* or *both* of the No. 0 horizontal link terminations will permit the continued transmission of control pulses from 50 kilocycle oscillator SCO (FIG. 9) to the link-scanning ring counter LSRC (FIG. 9), thereby causing the ring counter LSRC to advance from the zero position to the No. 1 position. In a preceding portion of this description, reference was made to a circuit comprising the buffer output conductor HBU 0 (FIG. 9) and the winding of the "horizontal" relay H0. It will be remembered that after the enablement of gate SCG (FIG. 9), the first output pulse from oscillator SCO subsequent thereto advanced the ring counter LSRC from the start (S) to the No. 0 stage. Therefore, due to the continued enablement of gate SCG, it is the next succeeding output pulse from oscillator SCO that causes ring counter LSRC to advance from the No. 0 to the No. 1 stage. When the ring counter LSRC advances to the No. 1 stage, the potential change or positive-going potential on the buffer output conductor HBU 0 is caused to desist. Since the output pulses from oscillator SCO occur at a rate of 50 kilocycles per second, the application of the positive-going potential, via buffer output lead HBU 0, to the winding of relay H0 is of insufficient duration to have caused relay H0 to operate.

With the link-scanning ring counter LSRC (FIG. 9) in its No. 1 stage, the function of the link-scanning circuitry is to test the availability of the No. 1 primary and tertiary horizontal link terminations. Since there has been no change in the calling and called line identities, the primary and tertiary frame and vertical locations are the same as previously described with reference to "Testing for Idle Horizontal Link Terminations—No. 0 Interstage Link Unavailable." However, with the ring counter LSRC advanced to the No. 1 stage, the primary and tertiary frame gate circuitry for the No. 1 primary and tertiary horizontal link terminations (not shown) will operate in a manner similar to that earlier described with reference to the No. 0 primary and tertiary horizontal link terminations.

Let it be assumed that the No. 1 primary and tertiary horizontal link terminations fail to concurrently test idle. Again, in the manner previously described, the presence of the "off-hook" ground on *either* or *both* of the No. 1 horizontal link terminations will permit the further advance of the ring counter LSRC (FIG. 9), this time, from the No. 1 to the No. 2 stage. At this time, with the ring counter LSRC advanced to the No. 2 stage, the primary and tertiary frame gate circuitry for the No. 2 primary and tertiary horizontal link terminations (not shown) will operate in a manner similar to that earlier described with reference to the No. 0 primary and tertiary horizontal link terminations.

Let it now be assumed that the No. 2 primary and tertiary horizontal link terminations fail to concurrently test idle. Again, in the manner previously described, the presence of the "off-hook" ground on *either* or *both* of the No. 2 horizontal link terminations will permit the further advance of the ring counter LSRC (FIG. 9), this time from the No. 2 to the No. 3 stage.

*Testing for Idle Horizontal Link Terminations—No. 3 Interstage Link Available*

With the link-scanning ring counter in the No. 3 stage, the function of the link-scanning circuitry is to test the availability (idle-to-idle match) of the No. 3 primary and tertiary horizontal link terminations. The line identities remain unchanged. With the link-scanning ring counter LSRC (FIG. 9) advanced to its No. 3 stage, an electrical potential change is transmitted from stage 3, via buffer output conductor HBU 3 (FIG. 9), to the winding of "horizontal" relay H3 (FIG. 9). The H3 relay can operate during the time that the ring counter is in stage 3 only if the No. 3 primary and tertiary horizontal link terminations concurrently test "idle," as will be hereinafter explained. Now let it be assumed that, at this time, the No. 3 primary horizontal link termination PHT 03 (FIG. 3) and the No. 3 tertiary horizontal link termination THT 03 (FIG. 5) are concurrently idle; and, consequently, the sleeve conductors thereof PS 03 (FIG. 3) and TS 03 (FIG. 5), respectively, are at a potential of approximately —12 volts with respect to ground. It will be remembered that the primary and tertiary frame flip-flops P0 and T9 (FIG. 10), respectively, are in their "set" conditions, and that as a result thereof, the primary and tertiary frame gates PG 0 (FIG. 3) and TG 0 (FIG. 5), respectively, are in an enabled condition. At this time, with the link-scanning ring counter LSRC (FIG. 9) advanced to its No. 3 stage, a positive-going pulse is applied, via conductor H3 in cable HL, to the parallel-connected input leads of frame gates PG 0 to PG 9, inclusive (FIGS. 3 and 6) and to the parallel-connected input leads of frame gates TG 0 to TG 9, inclusive (FIGS. 5 and 8).

Since the primary frame gate PG 0 is in an enabled condition, a positive-going output pulse from gate PTG 3 of approximately 16 volts with respect to ground is applied through capacitor PC 03 (FIG. 3) to sleeve conductor PS 03 (FIG. 3), which positive-going pulse is algebraically added to the steady —12 volt potential on the sleeve conductor PS 03 to produce an effective positive-going pulse of approximately 4 volts with respect to ground. Therefore, with the No. 3 primary horizontal link termination PHT 03 (FIG. 3) in an idle condition, the effective 4 volt positive-going pulse on sleeve conductor PS 03 is extended, via conductor PSC 03 in cables PSC 00–09 and PSCC to the correspondingly designated input conductor of the primary coincidence "OR" gate PCOG (FIG. 9). Similarly, since the tertiary frame gate TG 0 (FIG. 5) is in an enabled condition, at the same time, a positive-going input pulse of approximately 16 volts is applied through capacitor TC 03 (FIG. 5) to sleeve conductor TS 03 (FIG. 5), which positive-going pulse is algebraically added to the steady —12 volt potential on sleeve conductor TS 03 to produce an effective positive-going pulse of approximately 4 volts with respect to ground. Therefore, with the No. 3 tertiary horizontal link termination THT 03 (FIG. 5) in an idle condition, the effective 4 volt positive-going pulse on sleeve conductor TS 03 is extended, via conductor TSC 03 in cables TSC 00–09 and TSCC, to the correspondingly designated input conductor of the tertiary coincidence "OR" gate TCOG (FIG. 9). At this time, with the concurrent application of 4 volt positive-going pulses to conductors PSC 03 and TSC 03, the input potentials on the remaining input conductors of "OR" gates PCOG and TCOG, as previously explained, will be either ground, —12 volts with respect to ground, or a transition from ground to —12 volts; and the said potentials, as previously explained, are respectively indicative of the instant busy or idle status of the primary or tertiary horizontal link terminations connected thereto. Since such an "OR" gate will produce an output potential which is substantially equal to the most positive input potential applied thereto, when the No. 3 primary and tertiary horizontal link terminations are concurrently idle, the "OR" gates PCOG and TCOG will each concurrently produce a minimum positive-going output potential of approximately 4 volts (could be as much as 16 volts) at conductors PSRA and TSRA, respectively. The concurrent 4 volt positive-going potentials on conductors PSRA and TSRA are applied to the inputs of regenerative amplifiers PRA and TRA, respectively, thereby causing concurrent positive-going output potentials of approximately 16 volts, and of a few milliseconds duration, to appear on the output conductors PSR and TSR (FIG. 9), respectively. The concurrent 16 volt positive-going potentials on conductors PSR and TSR are applied to the two inputs of the start-reset "AND" gate SRAG (FIG. 9), thereby causing a positive-going output pulse of approximately 12 volts to appear on the output conductor SR (FIG. 9). The positive-going pulse on conductor SR is applied to the "reset" input of the "start" flip-flop SF (FIG. 9), causing the flip-flop SF to revert to its normal or turned-off state, and thereby causing the output potential thereof, on conductor SE (FIG. 9), to change the control potential applied to the start-control gate SCG (FIG. 9) from −8 volts to −24 volts with respect to ground. The flip-flop SF will remain in its turned-off state until again "set" or turned on. The application of −24 volts from the output of flip-flop SF to the control conductor SE of gate SCG causes the gate to revert to its nonconductive state, thereby inhibiting the transmission of the 50 kilocycle pulses from the scanning control oscillator SCO (FIG. 9), via conductor SCP (FIG. 9), to the "start" conductor of the link-scanning ring counter LSRC (FIG. 9), and thereby to stop the ring counter.

*Searching Cycle Arrested*

With the cessation of transmission of 50 kilocycle pulses, the searching cycle is arrested, and the ring counter LSRC (FIG. 9) remains in the No. 3 stage until the searching cycle shall again be resumed in a manner to be hereinafter described.

*Operation of "Horizontal" Relay H3*

With the searching cycle arrested, and with the link-scanning ring counter LSRC (FIG. 9) in stage No. 3, the current flow through the previously established circuit through the winding of relay H3 (FIG. 9) will be of sufficient duration to permit the "horizontal" relay H3 to operate. The operation of relay H3 closes contacts H3–1 (FIG. 3) and HR3–2 (FIG. 5). A +24 volt potential is extended through contact H3–1 and, via conductor PHL 3, to the parallel-connected No. 4 primary contacts (such, for example, as P0–4, FIG. 3) of the primary frame relays; and likewise, a +24 volt potential is extended through contact H3–2 (FIG. 5) and, via conductor THL 3, to the parallel-connected No. 4 tertiary contacts (such, for example, as T0–4, FIG. 5) of the tertiary frame relays.

*Operation of Crosspoints*

The crosspoints of the primary, secondary, and tertiary frames may be operated only after a like-numbered pair of idle primary and tertiary link terminations has been found (idle-to-idle match); when, in response to said idle-to-idle match condition, the searching cycle has been arrested; and when, in response to the arrest of the searching cycle, a "horizontal" relay numbered correspondingly to the idle horizontal link has been operated. It will be remembered that the primary vertical relay PV0 (FIG. 10), the primary frame relay P0 (FIG. 10), the tertiary vertical relay TV9 (FIG. 10), and the tertiary frame relay T0 (FIG. 10) are in an operated condition, under control of the correspondingly designated primary and tertiary flip-flops, as previously described. It will also be remembered that the corresponding "vertical" coils of the primary and tertiary frames are energized, as previously described. Therefore, at the time that the horizontal relay H3 operates, a potential of +24 volts is extended, through contacts H3–1 and P0–4, conductor PH4 (FIG. 3), the series-connected "horizontal" coils (not shown) of primary crosspoints P0–30 to P0–39, inclusive, via cable PH 03, the series-connected "horizontal" coils (not shown) of secondary crosspoints S3–00 to S3–09, inclusive, to ground, causing the said primary horizontal coils and secondary horizontal coils to become energized in a "forward" sense of current flow. Similarly, at the same time, a potential of +24 volts is extended, through contacts H3–2 and T0–4 (FIG. 5), conductor TH4, the series-connected "horizontal" coils (not shown) of tertiary crosspoints T0–30 to T0–39, inclusive, via cable TH 03, the series-connected "vertical" coils (not shown) of secondary crosspoints S3–00 to S3–90, inclusive to ground, causing the said tertiary horizontal coils and secondary vertical coils to become energized in a "forward" sense of current flow.

At this time, due to the above-described concurrent forward energization of No. 0 vertical coils and the No. 3 horizontal coils of primary frame 0, the No. 9 vertical coils and the No. 3 horizontal coils of tertiary frame 0, and the No. 3 horizontal coils and the No. 0 vertical coils of secondary frame 3, the crosspoints operated are as follows: primary P0–30 (FIG. 3), tertiary T0–39 (FIG. 5), and secondary S3–00 (FIG. 7).

When the primary crosspoints P0–30 (FIG. 3) operates, the "off-hook" ground on the vertical sleeve conductor S–00 of line 00 (FIG. 3) is extended, through the sleeve contact of primary crosspoint P0–30 of FIG. 3 (not shown, but similar to contact PS1 of crosspoint P0–00 of FIG. 3) to the sleeve conductor PS 03 of the primary horizontal link termination PHT 03 (FIG. 3), and to the junction of resistors R 003 and R 004, thereby causing the primary horizontal link termination PHT 03 to assume a "busy" test condition. The "off-hook" ground on sleeve conductor PS 03 is extended, via the sleeve conductor in cable PH 03, through the sleeve contact of secondary crosspoint S3–00 of FIG. 7 (not shown, but similar to contact SS1 of crosspoint S0–00 of FIG. 4), the vertical sleeve conductor in cable TH 03, to the sleeve conductor TS 03 of the tertiary horizontal link termination THT 03 (FIG. 5), and to the junction of resistors R 005 and R 006, thereby causing the tertiary horizontal link termination THT 03 to assume a "busy" test condition.

*Preferred Terminations of Lines 00 and 09 Interconnected*

The function of primary, secondary, and tertiary crosspoints when operated is to electrically interconnect the calling and called lines, via like-numbered primary and tertiary horizontal link terminations, and to establish a communication path between said calling and called lines.

At this time, the vertical T and R conductors of line 00 (FIG. 3) are interconnected, through the corresponding contacts of primary crosspoint P0–30 (FIG. 3), the horizontal T and R conductors in cable PH 03, the T and R contacts of secondary crosspoint S3–00 (FIG. 7), the vertical T and R conductors in cable TH 03, the horizontal T and R conductors of tertiary frame 0, over the T and R contacts of the tertiary crosspoint T0–39 (FIG. 5), and to the vertical T and R conductors of line 09 (FIG. 5), thereby establishing an electrical communication path between the preferred terminations of lines 00 and 09.

With the tertiary crosspoint T0–39 operated, the "off-hook" ground on the horizontal link sleeve conductor TS 03 is extended through the sleeve contact (not shown) of crosspoint T0–39 to the sleeve conductor S–09 (not shown) of the line circuit 09, thereby providing a source of "busy test" ground for the sleeve conductor of line circuit 09.

*Reset of Primary and Tertiary Frame and Vertical Flip-flops*

The function performed by the primary and tertiary frame and vertical flip-flops is that of identifying the calling and called lines, specifying the locations of said lines in terms of frame and vertical numbers, and effecting the operation of frame and vertical relays corresponding to said specified locations. Since the primary and tertiary frame and vertical flip-flops (such, for example, as P0, T0, PV0, and TV9) (FIG. 10) have performed their required functions, they may now be "reset" or dismissed. Accordingly, after a communication path has been established between the calling and the called lines, the reset circuit RSC (FIG. 10) is brought into operation. The operation of the reset circuit RSC causes ground, or a positive potential, or a positive-going pulse of suitable amplitude to be applied, via conductor CR, to the "reset" input of the S stage of the link-scanning ring counter LSRC (FIG. 9), causing the ring counter to return to its normal or "start" condition. At the same time, the potential on conductor CR is extended, via parallel-connected isolating diodes (such, for example, as TD0, TD3, TD6, TD9, PD0, PD3, PD6, PD9, TDV0, TDV3, TDV6, TDV9, PDV0, PDV3, PDV6 and PDV9 of FIG. 10), and the conductors in cables TFR, PFR, TVR and PVR to the "reset" leads of all of the primary and tertiary frame and vertical flip-flops (such, for example, as P0, P3, P6, P9, T0, T3, T6, T9, PV0, PV3, PV6, PV9, TV0, TV3, TV6 and TV9 of FIG. 10), thereby causing the "set" or operated ones of said flip-flops to be "reset" or restored to their turned-off condition.

*Release of Primary and Tertiary Frame and Vertical Relays*

With the primary and tertiary frame flip-flops P0 and T0, respectively, and the primary and tertiary vertical flip-flops PV0 and TV0, respectively, in their "reset" condition, (FIG. 10) the relays P0, T0, PV0, and TV0, respectively controlled thereby, (FIG. 10) will release. At the same time, with the primary and tertiary frame flip-flops P0 and T0 in their reset condition, the potentials applied via output conductor P00 in cable PF, and the output conductor T00 in cable TF, to the enabling leads of primary gate PG 0 (FIG. 3) and tertiary gate TG 0 (FIG. 5) will desist, thereby disabling gates PG 0 and TG 0.

*Release of Horizontal Relay*

With the link-scanning ring counter LSRC (FIG. 9) reset to its S stage, the stages 0 to 9, inclusive, of the ring counter will no longer produce relay operating outputs. Therefore, at this time, the winding of horizontal relay H3 (FIG. 9) will become de-energized, causing relay H3 to release. With the release of primary vertical relay PV0 and tertiary vertical relay TV9 (FIG. 10), their respective contacts PV0–1 (FIG. 6) and TV9–1 (FIG. 8) will open, thereby opening the respective "forward" energizing circuits for the series-connected primary vertical coils, and the series connected tertiary vertical coils, thereby de-energizing said coils. With the release of horizontal relay H3 (FIG. 9), the contact H3–1 (FIG. 3) and the contact H3–2 (FIG. 5) will open, thereby opening the respective "forward" energizing circuits for the series-connected primary horizontal and secondary horizontal coils, and the series-connected tertiary horizontal and secondary vertical coils, thereby de-energizing said coils. At this time, the sleeve conductors PS 03 (FIG. 3) and TS 03 (FIG. 5) will be at ground potential, due to the "off-hook" ground from line 00. The flip-flops and associated circuitry may now be used to service another connection.

*Crosspoints Magnetically Latched*

The crosspoints P0–30 (FIG. 3), S3–00 (FIG. 7), and T0–39 (FIG. 5) are magnetically self-locking, and will remain in their operated condition after the operating ("forward" currents) circuits of their respective horizontal and/or vertical coils shall have been opened; and the crosspoints will release only when either or both of their respective horizontal and vertical coils is or are supplied with current in a reverse direction to that of the forward operating current.

*Release of Connection*

When the communication path through the switching network is no longer needed, as evidenced by the removal from the sleeve conductor of the existing connection of the "off-hook" ground, the crosspoint contacts P0–30, S3–00 and T0–39 are automatically released and are again in readiness to service another connection.

Let it be assumed that the "off-hook" ground is disconnected from the sleeve conductor of the connection. With the removal of ground from the junction of resistors R 003 and R 004 (FIG. 3), and R 005 and R 006 (FIG. 5), the horizontal link sleeve conductors PS 03 (FIG. 3) and TS 03 (FIG. 5) revert to a steady potential of −12 volts with respect to ground, which −12 volt potential will persist until these horizontal link terminations shall again be seized to serve a conneciton. At this time, a −24 volt potential is extended, through the series-connected resistors R 003 (where the −12 volts is derived for the sleeve PS 03) and R 004, (FIG. 3) conductor PH4, the series-connected primary horizontal coils, cable PH 03 and the series-connected secondary horizontal coils, to ground. At this time, the current flow through the series-connected primary and secondary horizontal coils is in a reverse direction with respect to that of the forward operating current. Similarly, at the same time, a −24 volt potential is extended, through the series-connected resistors R 005 (where the −12 volts is derived for the sleeve TS 03) and R 006, (FIG. 5) conductor TH4, the series-connected tertiary horizontal coils, cable TH 03, and the series-connected secondary vertical coils, to ground. At this time, the current flow through the series-connected tertiary horizontal coils, and the series-connected secondary vertical coils is in a reverse direction with respect to that of the forward operating current. At this time, due to the reversal of the current flow in the primary and tertiary horizontal coils of crosspoints P0–30 (FIG. 3) and T0–39 (FIG. 5), respectively, these crosspoints will release. Likewise, at the same time, due to the reversal of the current flow in either or both the secondary horizontal and the secondary vertical coils of crosspoint S3–00 (FIG. 7), this crosspoint will also release. The crosspoints of the primary, secondary, and tertiary switches are now released; the circuits of the horizontal and vertical coils of the primary, secondary, and tertiary switches are restored to their normal condition; and the switching system is in a condition to respond to and service other connections.

SITUATION B (Line 00 calling line 99—Preferred line terminations in differently-numbered frames—Idle interstage link found during first searching cycle)

*Servicing of Connection*

In Situation B, as in Situation A, supra, the objective is to find an idle interstage link whereby the calling line and the idle called line may be electrically interconnected. In Situation B, however, the calling line (line 00, FIG. 3) and the called line (line 99, FIG. 6) have their respective preferred terminations in differently-numbered primary and tertiary switching stage frames (i.e., primary frame 0 of FIG. 3 and tertiary frame T9, of FIG. 8, respectively). Therefore, since in Situation B the same calling (line 00) is involved as in Situation A, the same calling line identity obtains as before, and the primary frame flip-flop P0 (FIG. 10), and the primary vertical flip-flop PV0 (FIG. 10) will be set, and the circuitry controlled thereby will operate in the same manner as described with reference to Situation A. However, in Situation B, since a different called line (line 99) is involved than in Situation A, a different called line identity is prescribed, and, hence, the tertiary frame flip-flop T9 (FIG. 10) and the tertiary vertical flip-flop TV9 (FIG 10) will be set, and the circuitry controlled thereby will operate in a manner similar to that described with reference to Situation A. It will be noted that the only difference in circuit operation between Situations A and B, up to this point, is that the tertiary frame flip-flop T9 (and associated circuitry) has been prescribed in lieu of tertiary frame flip-flop T0 (and associated circuitry). It will be remembered that, as previously described, when the respective preferred terminations of the calling and called lines are located in differently-numbered primary and tertiary frames, the finding of an idle inter-stage link to effect an interconnection therebetween during the first searching cycle is *possible* but is not *assured.* In the present instance (i.e., Situation B) it will be assumed, for example, that during the first searching cycle an idle-to-idle match is encountered between the No. 3 horizontal link termination PHT 03 (FIG. 3) of primary frame 0 (FIG. 3) and the No. 3 horizontal link termination THT 93 (FIG. 8) of tertiary frame 9 (FIG. 8), and that an interconnection is established from calling line 00 (FIG. 3), via crosspoint P0–30, cable PH 03, crosspoint S3–09 (FIG. 7), cable TH 93, crosspoint T9–39 (FIG. 8), and inter-termination-multiple conductors in cable ITM 90–99 to called line 99 (FIG. 6). The circuit operations involved, up to this point, are similar to those previously described with reference to Situation A, with the following exception: Since, in the instant Situation B, the preferred terminations of the calling and called lines are respectively located in differently-numbered primary and tertiary frames, there is no necessity for, nor is there any concurrent energization of any of the match-frame "AND" gates (such, for example, as F0 of FIG. 10); therefore, it follows that there is no energization of the match-frame "OR" gate MF0 (FIG. 10); and, therefore, it is apparent that the match-flip-flop FM (FIG. 10) remains in its normal or reset condition. With the FM flip-flop in its normal condition, there is no inhibition of the interaction of the settings of the primary and tertiary frame flip-flops; and, the interaction circuitry is now free to perform its normal function, which function is not required at this time, but will be hereinafter described in detail in connection with Situation C where its sgnificance will become apparent.

When the communication path, via the switching network, is no longer required, the connection will be released as previously described with reference to Situation A.

SITUATION C (Line 00 calling line 99—Less-preferred line terminations in differently-numbered frames—Idle interstage link not found during first searching cycle)

*Servicing of Connection*

In Situation C, as in Situations A and B, supra, the objective is to find an idle interstage link whereby the calling line and the idle called line may be electrically interconnected. In Situation C, as in Situation B, the calling line and the called line have their respective preferred terminations in differently-numbered primary and tertiary switching stage frames (i.e., primary frame 0, of FIG. 3 and tertiary frame 9, of FIG. 8, respectively.) The less-preferred terminations of line 00 and line 99 are, respectively, in tertiary frame 0 (FIG. 5) and primary frame 9 (FIG. 6). Therefore, since in Situation C the same calling line (line 00) and the same called line (line 99) are involved as in Situation B, the same calling and called line identities obtain as before, and the primary frame flip-flop P0 (FIG. 10), the primary vertical flip-flop PV0 (FIG. 10), the tertiary frame flip-flop T9 (FIG. 10), and the tertiary vertical flip-flop TV9 (FIG. 10), will be set as before described, and the circuitry controlled thereby will operate, in the same manner as described with reference to Situations A and B, thereby designating the said primary and tertiary frame and vertical flip-flops as definitive of the *preferred* terminations of the calling line (line 00) and the called line (line 99), respectively. It will be noted that, up to this point, the circuit operations are identical with those described in Situation B. Again, it must be borne in mind that when the respective preferred terminations of the calling and called lines are located in differently-numbered primary and tertiary frames, the finding of an idle interstage link to effect an interconneciton therebetween during the first searching cycle is *possible* but is not *assured.* In the present instance (i.e., Situation C) it will be assumed, for example, that during the first searching cycle an idle-to-idie match is *not* encountered, and hence, no idle interstage link is available to interconnect the preferred terminations of the calling and called lines. Again, it must be remembered that since the preferred terminations of the calling and called lines are respectively located in differently-numbered primary and tertiary frames, there is no necessity for, nor is there any concurrent energization of any of the match-frame "AND" gates (such, for example, as F0 of FIG. 10); and, therefore, it is apparent that the match-frame flip-flop FM (FIG. 10) remains in its normal or reset condition. With the FM flip-flop in its normal condition, there is no inhibition of the interaction of the settings of the primary and tertiary frame flip-flops; and the interaction circuitry is now free to perform its normal function. Therefore, at this time, all of the slow-acting transmission inhibiting gates: TI0 to TI9, inclusive; PO0 to PI9, inclusive, TVI0 to TVI9, inclusive; and PVI0 to PVI9, inclusive (FIG. 10) are in a receptive condition for input potentials applied thereto. Under this condition, the primary frame flip-flop P0 (FIG. 10) in assuming its "set" condition causes an electrical potential change to be transmitted, via conductor P00 in cable PF, to the control conductor P00 of transmission enabling gate TL0 (FIG. 10), thereby enabling gate TL0. At the same time, the flip-flop P0 causes the same electrical potential change to be transmitted, via conductor P00 in cable PF, to the input conductor P00 of the (now enabled) slow-acting transmission inhibiting gate TI0 (FIG. 10), and, after a brief delay, to the output conductor TR0 of gate TI0, and, via cable TFR to the "reset" conductor TR0 of tertiary frame flip-flop T0 (FIG. 10). Similarly, the primary vertical flip-flop PV0 (FIG. 10) in assuming its "set" condition causes an electrical potential change to be transmitted, via conductor PV00 in cable PV, to the control conductor PV00 of transmission enabling gate TVL0 (FIG. 10), thereby enabling gate TVL0. At the same time, the flip-flop PV0 causes the same electrical potential change to be transmitted, via conductor PV00 in cable PV, to the input conductor PV00 of the (now enabled) slow-acting transmission inhibiting gate TVI0 (FIG. 10), and, after a brief delay, to the output conductor TV00 of gate TVI0, and, via cable TVR, to the "reset" conductor TV00 of tertiary vertical flip-flop TV0 (FIG. 10). In a similar manner, the tertiary frame flip-flop T9 (FIG. 10) in assuming its "set" condition causes an electrical potential change to be transmitted, via conductor T09 in cable TF, to the control conductor T09 of transmission enabling gate PL9 (FIG. 10), thereby enabling gate PL9. At the same time, the flip-flop T9 causes the same electrical potential change to be transmitted, via conductor T09 in cable TF, to the input conductor T09 of the (now enabled) slow-acting transmission-inhibiting gate PI9 (FIG. 10), and, after a brief delay, to the output conductor PR9 of gate PI9, and, via cable PFR, to the "reset" conductor PR9 of primary frame flip-flop P9 (FIG. 10). In a like manner, the tertiary vertical flip-flop TV9 (FIG. 10) in assuming its "set" condition causes an electrical potential change to be transmitted, via conductor TV09 in cable TV, to the control conductor TV09 of transmission enabling gate PVL9 (FIG. 10), thereby enabling gate PVL9. At the same time, the flip-flop TV9 causes the same electrical potential change to be transmitted, via conductor TV09 in cable TV, to the input conductor TV09 of the (now enabled) slow-acting transmission-inhibiting gate PVI9 (FIG. 10), and, after a brief delay, to the output conductor PV9 of gate PVI9, and via cable PVR, to the "reset" conductor PV9 of primary vertical flip-flop PV9 (FIG. 10). The circuit operation just described relates to two important functions: it has been ensured that the flip-flops T0, TV0, P9, and PV9 (FIG. 10) are in a reset condition, and it has enabled the transmission enabling gates TL0, TVL0, PL9, and PVL9 (FIG. 10).

*Initiation of Second Searching Cycle*

Now continuing with the assumption that during the first searching cycle no idle interstage link was available whereby to interconnect the *preferred* terminations of the calling and called lines, it will be remembered that under such a condition, a *second* searching cycle will be initiated; and it will be further remembered that during the *second* searching cycle, the finding of an idle interstage link is *assured,* by which link the *less*-preferred terminations of the calling and idle called lines will be interconnected. In order that the *less*-preferred terminations of the calling and called lines may be interconnected, it is necessary that the determined calling and called line indicia be suitably altered, changed or modified into a *different* set of indicia definitive of the *less*-preferred termination of the calling and called lines, expressed in terms of primary and tertiary frame and vertical locations. Accordingly, when the link-scanning ring counter LSRC (FIG. 9) has completed its *first* searching cycle without finding an idle-to-idle match, as a concomitant thereof, the ring counter is restored to its normal or start stage S. As previously explained, the ring counter LSRC consists of a plurality of bi-stable flip-flops, one flip-flop per stage. The S stage of the ring counter is a bi-stable flip-flop which will produce a useful (i.e., positive-going) recycling pulse on its output conductor RC only when the ring counter is reset to its S stage either from a reset signal or upon internal recycle from its stage 9. Therefore, at this time, (i.e., the start of the *second* searching cycle) the S stage flip-flop of ring counter LSRC (FIG. 9) will produce a positive-going pulse of very short duration and having a very steep wave front of suitable amplitude. This positive-going pulse is applied, via conductor RC, to all of the parallel-connected input conductors of the transmission gates: PL0 to PL9, inclusive; TL0 to TL9, inclusive; PVL0 to PVL9, inclusive; and RVL0 to TVL9, inclusive (FIG. 10), thereby initiating the recycling operation. This recycling operation controls the altering, changing, or modifying of the indicia definitive of the *preferred* calling and called line terminations into a *different* set of calling and called line indicia definitive of the *less*-preferred calling and called line terminations.

*Setting of Less-Preferred, and Resetting of Preferred Flip-flops*

The sharply-peaked short-duration positive-going ring counter output potential on recycle conductor RC (FIG. 9) causes sharply-peaked positive-going pulses of extremely short duration to appear on the respective output conductors of the enabled transmission enabling gates TL0, TVL0, PL9, and PVL9 (FIG. 10). The positive-going output pulse on the output conductor TS0 of gate TL0 is transmitted, via cable CDF, to the "set" conductor TS0 of tertiary frame flip-flop T0 (FIG. 10), causing it to be "set." Similarly, the positive-going output pulse on the output conductor TVS0 of gate TVL0 is transmitted, via cable CDV, to the "set" conductor TVS0 of tertiary vertical flip-flop TV0 (FIG. 10), causing it to be "set." In a similar manner, the positive-going output pulse on the output conductor PS9 of gate PL9 is transmitted, via cable CLF, to the "set" conductor PS9 of primary frame flip-flop P9 (FIG. 10), causing it to be "set." In a like manner, the positive-going output pulse on the output conductor PVS9 of gate PVL9 is transmitted, via cable CLV, to the "set" conductor PVS9 of primary vertical flip-flop PV9 (FIG. 10), causing it to be "set."

The tertiary frame flip-flop T0 (FIG. 10) in assuming its "set" condition causes an electrical potential change to be transmitted, via conductor T00 in cable TF, to the control conductor T00 of transmission enabling gate PL0 (FIG. 10), thereby enabling gate PL0. At the same time, the flip-flop T0 causes the same electrical potential change to be transmitted, via conductor T00 in cable TF, to the input conductor T00 of the (now enabled) slow-acting transmission-inhibiting gate PI0 (FIG. 10), and, after a brief delay, to the output conductor PR0 of gate PI0, and, via cable PFR, to the "reset" conductor PR0 of primary frame flip-flop P0 (FIG. 10). Due to the steep wave front and extremely short duration of the positive-going recycle pulse on conductor RC, and due to the fact that the duration of the delay inherent in slow-acting gate PI0 exceeds the duration of the positive-going recycle pulse on conductor RC, the positive-going recycle pulse on the input to gate PL0 (FIG. 10) will have desisted before the flip-flop P0 receives its reset pulse via conductor PR0; therefore the flip-flop P0 cannot at this time be set by the recycle pulse on conductor RC. Similarly, the tertiary vertical flip-flop TV0 (FIG. 10) in assuming its "set" condition causes an electrical potential change to be transmitted, via conductor TV00 in cable TV, to the control conductor TV00 of transmission enable gate PLV0 (FIG. 10), thereby enabling gate PLV0. At the same time, the flip-flop TV0 causes the same electrical potential change to be transmitted, via conductor TV00 in cable TV, to the input conductor TV00 of the (now enabled) slow-acting transmission-inhibiting gate PVI0 (FIG. 10), and, after a brief delay, to the output conductor PV0 of gate PVI0, and, via cable PVR, to the reset conductor PV0 of primary vertical flip-flop PV0 (FIG. 10). The enablement of gate PVL0 is ineffective to transmit a pulse to the "set" conductor PVS0 of flip-flop PV0 because of the steep wave front and extremely short duration of the recycling pulse on conductor RC, and because of the inherent delay in slow-acting transmission-inhibiting gate PVI0 compared to the duration of the recycling pulse. In a similar manner, the primary frame flip-flop P9 (FIG. 10) in assuming its "set" condition causes an electrical potential change to be transmitted, via conductor P09 in cable PF, to the control conductor P09 of transmission enabling gate TL9 (FIG. 10), thereby enabling gate TL9. At the same time, the flip-flop P9 causes the same electrical potential change to be transmitted, via conductor P09 in cable PF, to the input conductor P09 of the (now enabled) slow-acting transmission-inhibiting gate TI9 (FIG. 10), and, after a brief delay, to the output conductor TR9 of gate TI9, and, via cable TFR, to the "reset" conductor TR9 of tertiary frame flip-flop T9 (FIG. 10). The enablement of gate TL9 is ineffective to transmit a pulse to the "set" conductor TS9 of flip-flop T9 because of the short duration of the recycle pulse on conductor RC relative to the duration of the delay inherent in slow-acting transmission-inhibiting gate TI9. In a like manner, the primary vertical flip-flop PV9 (FIG. 10) in assuming its "set" condition causes an electrical potential change to be transmitted, via conductor PV09 in cable PV, to the control conductor PV09 of transmission enabling gate TVL9 (FIG. 10), thereby enabling gate TVL9. At the same time, the flip-flop PV9 causes the same electrical potential change to be transmitted, via conductor PV09 in cable PV, to the input conductor PV09 of the (now enabled) slow-acting transmission-inhibiting gate TVI9 (FIG. 10), and, after a brief delay, to the output conductor TV9 of gate TVI9, and, via cable TVR, to the "reset" conductor TV9 of tertiary vertical flip-flop TV9 (FIG. 10). The enablement of gate TVL9 is ineffective to transmit a pulse to the "set" conductor TVS9 of flip-flop TV9 because of the short duration of the recycle pulse on conductor RC relative to the duration of the delay inherent in slow-acting transmission gate TVI9. The circuit operation just described relates to the function of "setting" a new combination of primary and tertiary frame and vertical flip-flops uniquely definitive of the *less*-preferred terminations of the calling and called lines; and, at the same time, causing the resetting of the previously set combination of flip-flops which uniquely defined the *preferred* terminations of the calling and called lines. The *less*-preferred terminations of calling line 00 is located in vertical 0 of tertiary frame 0 (FIG. 5), and is identified by the setting, as above described, of tertiary vertical flip-flop TV0 (FIG. 10) and tertiary frame flip-flop T0 (FIG. 10); and the *less*-preferred termination of called line 99 is located in vertical 9 of primary frame 9 (FIG. 6), and is identified by the setting, as above described, of primary vertical flip-flop PV9 (FIG. 10) and primary frame flip-flop P9 (FIG. 10). Since the *less*-preferred terminations of calling and called lines also are located in differently-numbered primary and tertiary frames, there still is no necessity for, nor is there any concurrent energization of any of the match-frame "AND" gates (such, for example, as F0 of FIG. 10); therefore it follows that there still is no energization of the match-frame "OR" gate MF0 (FIG. 10); and, therefore, it is apparent that the match-frame flip-flop FM (FIG. 10) still remains in its normal or reset condition and is still free to function as before described in reference to Situation C.

*Operation of Vertical and Frame Relays*

The setting of the flip-flops TV0, T0, PV9 and P9 (FIG. 10) causes the operation of tertiary vertical relay TV0, tertiary frame relay T0, primary vertical relay PV9, and primary frame relay P9 (FIG. 10), respectively, in a manner described in reference to Situation A. The concurrent operation of relays TV0 and T0 (FIG. 10) completes a circuit through contact TV0–1 (FIG. 8), the series-connected tertiary vertical coils (such, for example, as TVC–0 of FIG. 5), and contact T0–11 (FIG. 5), to +24 volts, thereby energizing the said series-connected primary vertical coils and *preparing* an operating path for one of the tertiary "crosspoints" (such, for example, as T0–00 of FIG. 5). At the same time, the operation of relay T0 (FIG. 10) closes a plurality of other contacts (e.g., T0–1, etc. to FIG. 5), thereby *preparing* an energizing path for the series-connected secondary horizontal coils (such, for example, as THC–0 of FIG. 5) and the series-connected secondary vertical coils (such, for example, as SVC–0 of FIG. 4) to ground. Likewise, the concurrent operation of relays PV9 and P9 (FIG. 10) completes a circuit through contact PV9–1 (FIG. 6), the series-connected primary vertical coils of (coils not shown, but similar to coil PVC–0 of FIG. 3, for example) primary frame 9, and a contact of relay P9 (contact not shown, but similar to contact P0–20 of FIG. 3), to +24 volts, thereby energizing the said series-connected primary vertical coils and preparing an operating path for one of the primary crosspoints (such, for example, as P9–99, not shown, but similar to crosspoint P0–00 of FIG. 3, for example). At the same time, the operation of relay P9 (FIG. 10) closes a plurality of other contacts (e.g., P9–1 of FIG. 6), thereby *preparing* an operating path for the series-connected primary horizontal coils (not shown) of primary frame 9 and the series-connected secondary horizontal coils (not shown, but similar to, for example, SHC–0 of FIG. 4), of secondary frame 0, to ground. In short, by the above-described circuit operation, the respective *less*-preferred calling and called line terminations have been designated in terms of tertiary and primary vertical and frame locations; and circuits have been *prepared* for the operation of crosspoints in the primary, secondary and tertiary frames.

*Enabling of Frame Gates*

The "setting" of primary and tertiary frame flip-flops P9 and T0 (FIG. 10), respectively, causes the enabling of the primary and tertiary frame gates PG 9 (FIG. 6) and TG 0 (FIG. 5), respectively, in a manner similar to that described with reference to Situation A. At the same time, the setting of flip-flop P9 (FIG. 10) causes an electrical potential change to be applied, via conductor P09 in cable PF, and through the primary "OR" gate POG (FIG. 9), and output conductor PS, to one of the inputs of the starting "AND" gate SAG (FIG. 9). Also, at this time, the setting of flip-flop T0 (FIG. 10) causes an electrical potential change to be applied, via conductor T00 in cable TF, and through the tertiary "OR" gate TOG (FIG. 9), and output conductor TS, to the other of the inputs of the starting "AND" gate SAG (FIG. 9). At this time, in addition to the previously-described circuit operations, the primary and tertiary frame gates PG 9 (FIG. 6) and TG 0 (FIG. 5) are concurrently enabled; and the two inputs of starting "AND" gate SAG (FIG. 9) are concurrently enabled.

*Start and Advance of Link Scanning*

At this time, in the manner previously described with reference to Situation A, the link-scanning ring counter LSRC (FIG. 9) will have been advanced from its S or start position, and is seeking an idle interstage link whereby to interconnect the *less*-preferred terminations of the calling line 00 and the called line 99.

*Testing for Idle Horizontal Link Terminations— No. 0, No. 1, and No. 2 Interstage Links Unavailable*

Let it be assumed, for example, that at this time the No. 0, No. 1, and No. 2 horizontal link terminations of primary frame 9 and tertiary frame 0 are successively tested, in the manner described with reference to Situation A, and are found to test "busy." Under this condition, in the manner described with reference to Situation A, the ring counter LSRC (FIG. 9) is advanced from the No. 2 to the No. 3 stage.

*Testing for Idle Horizontal Link Termination—No. 3 Interstage Link Available*

With the link-scanning ring counter in the No. 3 stage, the function of the link-scanning circuitry, again, is to test the availability (idle-to-idle match) of the No. 3 primary and tertiary horizontal link terminations. However, it is to be borne in mind that in the instant condition the link-scanning ring counter is in its second searching cycle, and, therefore, although the calling and called line identities remain unchanged, an idle link is being sought by which to interconnect the previously-described less-preferred terminations of the calling and called lines. With the link-scanning ring counter LSRC (FIG. 9) advanced to its No. 3 stage, a circuit is closed through the winding of the horizontal relay H3 (FIG. 9), as previously described. Now let it be assumed that, at this time, the primary horizontal link termination PHT 93 (FIG. 6, details not shown) and the No. 3 tertiary horizontal link termination THT 03 (FIG. 5) are concurrently idle; and, consequently, the sleeve conductors thereof PS 93 (FIG. 6) and TS 03 (FIG. 5), respectively, are at a potential of approximately −12 volts with respect to ground. It will be remembered that, since the ring counter LSRC (FIG. 9) is in its second searching cycle, the *less*-preferred primary and tertiary frame flip-flops P9 and T0 (FIG. 10), respectively, are in their "set" conditions, and that as a result thereof, the primary and tertiary frame gates PG 9 (FIG. 6) and TG 0 (FIG. 5), respectively, are in an enabled condition. At this time, with the link-scanning ring counter LSRC (FIG. 9) advanced to its No. 3 stage, a positive-going pulse is applied, via conductor H3 in cable IL, to the parallel-connected input leads of frame gates PG 0 to PG 9, inclusive (FIGS. 3 and 6), and to the parallel-connected input leads of frame gates TG 0 to TG 9, inclusive (FIGS. 5 and 8).

Since the primary frame gate PG 9 (FIG. 6) is in an enabled condition, a positive-going output pulse from gate PTG 3 (not shown) of frame gate PG 9 of approximately 16 volts with respect to ground is applied through capacitor PC 93 (FIG. 6) to sleeve conductor PS 93 (FIG. 6), which positive-going pulse, as previously described, is algebraically added to the steady −12 volt potential on the sleeve conductor PS 93 to produce an effective positive-going pulse of approximately 4 volts with respect to ground. Therefore, with the No. 3 primary horizontal link termination PHT 93 (FIG. 6) in an idle condition, the effective 4 volt positive-going pulse on sleeve conductor PS 93 is extended, via conductor PSC 93 in cables PSC 90–99 and PSCC to the correspondingly designated input conductor of the primary coincidence "OR" gate PCOG (FIG. 9). Similarly, since the tertiary frame gate TG 0 (FIG. 5) is in an enabled condition, at the same time, a positive-going input pulse of approximately 16 volts is applied through capacitor TC 03 (FIG. 5) to sleeve conductor TSC 03 (FIG. 5); thereby, as previously described, causing said 4 volt positive-going pulse to be applied to input conductor TSC 03 of tertiary coincidence "OR" gate TCOG (FIG. 9). At this time, with the concurrent application of 4 volt positive-going pulses to input conductors PSC 93 and TSC 03 of "OR" gates PCOG and TCOG (FIG. 9), respectively, the input potentials on the remaining input conductors of "OR" gates PCOG and TCOG, as previously explained, will be either ground, −12 volts with respect to ground, or a transition from ground to −12 volts; and the said potentials, as previously explained, are respectively indicative of the instant busy or idle status of the primary or tertiary horizontal link terminations connected thereto. Under the instant condition, as previously described, the "OR" gates PCOG and TCOG will each concurrently produce a minimum positive-going output potential of approximately 4 volts (could be as much as 16 volts) at output conductors PSRA and TSRA (FIG. 9), respectively, which concurrent positive-going otuput pulses are applied to the inputs of regenerative amplifiers PRA and TRA (FIG. 9), respectively, thereby, in turn, causing concurrent positive-going output potentials of approximately 16 volts, and of a few seconds duration, to appear on the output conductors PSR and TSR (FIG. 9), respectively. The concurrent 16 volt positive-going potentials on conductors PSR and TSR are applied to the two inputs of the start-reset "AND" gate SRAG (FIG. 9), thereby causing a positive-going output pulse of approximately 12 volts to appear on conductor SR (FIG. 9). The 12 volt positive-going pulse on conductor SR is applied to the "reset" input of the "start" flip-flop SF (FIG. 9), causing the flip-flop SF to revert to its normal or turned-off state, and thereby causing the output potential thereof, on conductor SE (FIG. 9), to change the control potential applied to the start-control gate SCG (FIG. 9) from −8 volts to −24 volts with respect to ground, and to remain in its turned-off state until again "set" or turned on. The application of −24 volts from the output of flip-flop SF to the control conductor SE of gate SCG causes the gate to revert to its non-conductive state, thereby inhibiting the transmission of 50 kilocycle pulses from the scanning control oscillator SCO (FIG. 9), via conductor SCP (FIG. 9), to the "start" conductor of the link-scanning ring counter LSRC (FIG. 9), and thereby to stop the ring counter.

*Second Searching Cycle Arrested*

With the cessation of transmission of 50 kilocycle pulses, the second searching cycle is arrested, and the ring counter LSRC (FIG. 9) remains in the No. 3 stage until the searching cycle shall again be resumed in a manner to be hereinafter described.

*Operation of "Horizontal" Relay H3*

With the second searching cycle arrested, and with the link-scanning ring counter LSRC (FIG. 9) in stage No. 3, the current flow through the previously established circuit through the winding of relay H3 (FIG. 9) will be of sufficient duration to permit the "horizontal" relay H3 to operate. The operation of relay H3 closes contacts H3–1 (FIG. 3) and H3–2 (FIG. 5). A +24 volt potential is extended through contact H3–1 and, via conductor PHL 3, to the parallel-connected No. 4 primary contacts (such, for example, as P9–4 of FIG. 6) of the primary frame relays; and, likewise, a +24 volt potential is extended through contact H3–2 (FIG. 5) and, via conductor THL 3, to the parallel-connected No. 4 tertiary contacts (such, for example, as T0–4 of FIG. 5) of the tertiary frame relays.

*Operation of Crosspoints*

In Situation C, as in Situations A and B, the crosspoints of the primary, secondary, and tertiary frames may be operated only after a like-numbered pair of idle primary and tertiary link terminations has been found (idle-to-idle match); when, in response to said idle-to-idle match condition, the searching cycle has been arrested; and when, in response to the arrest of the searching cycle, a "horizontal" relay numbered correspondingly to the idle horizontal link has been operated. It will be remembered that in the instant case (Situation C), the primary vertical relay PV9 (FIG. 10), the primary frame relay P9 (FIG. 10), the tertiary vertical relay TV0 (FIG. 10), and the tertiary frame relay T0 (FIG. 10) are in an operated condition, under control of the correspondingly designated primary and tertiary flip-flops, as previously described. It will also be remembered that the corresponding "vertical" coils of the primary and tertiary frames are energized, as previously described. Therefore, at the time that the horizontal relay H3 operates, a potential of +24 volts is extended, through contact H3–1 (FIG. 3), conductor PHL 3, contact P9–4 (FIG. 6), the series-connected horizontal coils (not shown) of primary crosspoints P9–30 to P9–39, inclusive, via cable PH 93, the series-connected "horizontal" coils (not shown) of secondary crosspoints S3–90 to S3–99, inclusive, to ground, causing the said primary horizontal coils and secondary horizontal coils to become energized in a "forward" sense of current flow. Similarly, at the same time, a potential of +24 volts is extended, through contacts H3–2 and T0–4 (FIG. 5), conductor TH4, the series-connected "horizontal" coils (not shown) of tertiary crosspoints T0–30 to T0–39, inclusive, via cable TH 03, the series-connected "vertical" coils (not shown) of secondary crosspoints S3–00 to S3–90, inclusive, to ground, causing the said tertiary horizontal coils and secondary vertical coils to become energized in a "forward" sense of current flow.

At this time, due to the above-described concurrent forward energization of the No. 9 vertical coils and the No. 3 horizontal coils of primary frame 9 (FIG. 6), the No. 0 vertical coils and the No. 3 horizontal coils of tertiary frame 0, (FIG. 5) and the No. 9 horizontal coils and the No. 0 vertical coils of secondary frame 3 (FIG. 7), the crosspoints operated are as follows: primary P9–39 (FIG. 6, details not shown), tertiary T0–30 (FIG. 5), and secondary S3–90 (FIG. 7).

When the primary crosspoint P9–39 (FIG. 6) operates, the "off-hook" ground on the vertical sleeve conductor of line 99 (FIG. 6, not shown, but similar to sleeve conductor S–00 of line 00, FIG. 3) is extended, via a circuit similar to that previously described in reference to Situation A, thereby causing the sleeve conductor PS 93 of the primary horizontal link termination PHT 93 to assume a "busy" test condition. The "off-hook" ground on the sleeve conductor PS 93 is extended, via the sleeve conductor in cable PH 93, through the sleeve contact of secondary crosspoint S3–90 of FIG. 7 (not shown, but similar to contact SS1 of crosspoint S0–00 of FIG. 4), the vertical sleeve conductor in cable TH 03, to the sleeve conductor TS03 of the tertiary horizontal link termination THT 03 (FIG. 5), and to the junction of resistors R 005 and R 006, thereby causing the tertiary horizontal link termination THT 03 to assume a "busy" test condition.

*Less-Preferred Terminations of Lines 00 and 99 Interconnected*

In the instant situation (i.e., idle-to-idle match encountered during second searching cycle), the function of the primary, secondary, and tertiary crosspoints when operated is to electrically interconnect the *less*-preferred terminations of the calling and called lines, via like-numbered primary and tertiary horizontal link terminations, and to establish a communication path between said calling and called lines.

At this time, the vertical T and R conductors of line 99 (FIG. 6, not shown, but similar to T–00 and R–00 of FIG. 3) are interconnected, through the corresponding contacts of primary crosspoint P9–39 (FIG. 6), the horizontal T and R conductors in cable PH 93, the T and R contacts of secondary crosspoints S3–90 (FIG. 7), the vertical T and R conductors in cable TH 03, the horizontal T and R conductors of tertiary frame 0 (FIG. 5), over the T and R contacts of the tertiary crosspoint T0–30 (FIG. 5) to the vertical T and R conductors, and the inter-termination conductors T–00 and R–00 in cable ITM 00 to the T–00 and R–00 conductors of line 00 (FIG. 3), thereby establishing an electrical communication path between the *less*-preferred terminations of lines 00 and 99.

With the tertiary crosspoint T0–30 (FIG. 5) operated, the "off-hook" ground on the horizontal link sleeve conductor TS 03 is extended through the sleeve contact (not shown) of crosspoint T0–30 to the sleeve conductor S–00, in inter-termination cable ITM 00, of the line circuit 00 (FIG. 3), thereby providing a source of "busy test" ground for the sleeve conductor of line circuit 00.

*Reset of Less-Preferred Primary and Tertiary Frame and Vertical Flip-flops*

The function performed by the *less*-preferred primary and tertiary frame and vertical flip-flops is that of designating the *less*-preferred terminations of the calling and called lines, specifying the locations of said *less*-preferred terminations in terms of frame and vertical numbers, and effecting the operations of frame and vertical relays corresponding to said specified locations. Since the primary and tertiary frame and vertical flip-flops (such, for example, as P9, T0, PV9, and TV0 of FIG. 10) have performed their required functions, they may now be "reset" or dismissed. Accordingly, after a communication path has been established between the calling and the called lines, the reset circuit RSC (FIG. 10) is brought into operation. The operation of the reset circuit RSC causes ground or a positive potential or a positive-going pulse of suitable amplitude to be applied, via conductor CR, and a circuit previously described with reference to Situation A, thereby causing the ring counter LSRC (FIG. 9) to return to its normal or "start" condition, and also causing the flip-flops P9, T0, PV9, and TV0 to be "reset" or restored to their turned-off condition.

*Release of Primary and Tertiary Frame and Vertical Relays*

With the primary and tertiary frame and vertical flip-flops P9, T0, PV9, and TV0 (FIG. 10) in their "reset" condition, the correspondingly numbered relays controlled thereby will release. At the same time, with the primary and tertiary frame flip-flops P9 and T0 in their "reset" condition, the primary and tertiary gates PG9 (FIG. 6) and TG 0 (FIG. 5), respectively, will be disabled, in a manner similar to that described with reference to Situation A.

*Release of Horizontal Relay*

With the link-scanning ring counter LSRC (FIG. 9) reset to its S stage, the stages 0 to 9, inclusive, of the ring counter will cease to product relay operating outputs and, as a consequence thereof, the winding of horizontal relay H3 (FIG. 9) will become de-energized, causing H3 to release. With the release of primary vertical relay PV9 and tertiary vertical relay TV0 (FIG. 10), their respective contacts PV9–1 (FIG. 6) and TV0–1 (FIG. 8) will open, thereby opening the respective "forward" energizing circuits for the series-connected primary vertical coils, and the series-connected tertiary vertical coils, thereby de-energizing said coils. With the release of horizontal relay H3 (FIG. 9), the contact H3–1 (FIG. 3) and the contact H3–2 (FIG. 5) will open, thereby opening the respective "forward" energizing circuits for the series-connected primary horizontal and secondary horizontal coils, and the series-connected tertiary horizontal and secondary vertical coils, thereby de-energizing said coils. At this time, the sleeve conductors PS 93 (FIG. 6) and TS 03 (FIG. 5) will be at ground potential, due to the "off-hook" ground from line 00. The flip-flops and associated circuitry may be used to service another connection.

*Crosspoints Magnetically Latched*

The crosspoints P9–39 (FIG. 6), S3–90 (FIG. 7), and T0–30 (FIG. 5) are magnetically locking, and will remain locked in their operated condition after the operating ("forward" currents) circuits of the respective horizontal and/or vertical coils shall have been opened; and the crosspoints will release only when either or both of their respective horizontal and vertical coils is or are supplied with current in a reverse direction to that of the forward operating current.

*Release of Connection*

When the communication path through the switching network is no longer needed, as evidenced by the removal from the sleeve conductor of the existing connection of the "off-hook" ground, ground will be removed from primary horizontal link termination PHT 93 (FIG. 6) and from tertiary horizontal link termination THT 03 (FIG. 5), thereby causing the said primary and tertiary horizontal link terminations to revert to and remain in their normal or idle state until seized to service a connection, as earlier described with reference to Situation A. At the same time, in the manner described with reference to Situation A, the crosspoints P9–39 (FIG. 6), S3–90 (FIG. 7), and T0–30 (FIG.5) will release. At this time the switching system is in a condition to respond to and service other connections.

It is to be understood that the calls traced hereinabove are entirely by way of illustration and are in no wise to be construed as limiting the operation of the system to the calls so traced.

It is also to be understood that the above-described arrangements are merely illustrative of the application of the principles of the invention and that numerous other arrangements may be devised by those skilled in the art without departing from the spirit and scope of the invention.

What is claimed is:

1. A switching system comprising a plurality of switching stages, a plurality of lines, each line having at least one line termination in each of at least two stages, each pair of line terminations taking in combination any stage termination of one line with any different stage termination of another line constituting one of the total number of permutative pairs of line terminations of said two lines, means operable for designating a permutative pair for interconnection, a plurality of inter-stage links, link seeking means operable to seek an available appropriate link capable of inter-connecting a designated permutative pair and to discriminate between availability and unavailability of an appropriate link, means controlled by said designating means for operating said link seeking means each time a different permutative pair is designated, and means controlled by said link seeking means incident to availability of an appropriate link for causing inter-connection over said available appropriate link of the then designated permutative pair.

2. A switching system comprising a plurality of switching stages, a plurality of lines, each line having at least one line termination in each of at least two stages, each pair of line terminations taking in combination any stage termination of one line with any different stage termination of another line constituting one of the total numger of permutative pairs of line terminations of said two lines, means operable for designating a premutative pair for inter-connection, a plurality of inter-stage links, link seeking means operable to seek an available appropriate link capable of inter-connecting a designated permutative pair and to discriminate between availability and unavailability of an appropriate link, means controlled by said designating means for operating said link seeking means each time a different permutative pair is designated, and means controlled by said link seeking means incident to availability of an appropriate link for causing inter-connection over said available appropriate link of the then designated permutative pair and incident to unavailability of an appropriate link for causing said designating means to designate a different permutative pair.

3. A switching system comprising a plurality of switching stages, a plurality of lines, each line having at least one line termination in each of at least two stages, each pair of line terminations taking in combination any stage termination of one line with any different stage termination of another line constituting one of the total num-of permutative pairs of line terminations of said two lines, means operable for designating a permutative pair for inter-connection, a plurality of inter-stage links, link seeking means operable to seek an available appropriate link capable of inter-connecting a designated permutative pair and to discriminate between availability and unavailability of an appropriate link, means controlled by said designating means for operating said link seeking means each time a different permutative pair is designated, means controlled by said link seeking means incident to availability of an appropriate link for causing inter-connection over said available appropriate link of the then designated permutative pair, and means controlled by said link seeking means incident to unavailability of an appropriate link for causing said designating means to designate a different permutative pair.

4. A switching system comprising a plurality of switching stages, a plurality of lines, each line having at least one line termination in each of at least two stages, each pair of line terminations taking in combination any stage termination of one line with any different stage termination of another line constituting one of the total number of permutative pairs of line terminations of said two lines, means operable for designating a permutative pair for inter-connection, a plurality of inter-stage links, link seeking means selectively operable to seek an available appropriate link capable of inter-connecting a designated permutative pair and to discriminate between availability and unavailability of an appropriate link, means controlled by said designating means for operating said link seeking means each time a different permutative pair is designated and for so operating said link seeking means selectively in accordance with the then designated permutative pair, and means controlled by said link seeking means incident to availability of an appropriate link for causing inter-connection over said available appropriate link of the then designated permutative pair.

5. A switching system comprising a plurality of switching stages, a plurality of lines, each line having at least one line termination in each of at least two stages, each pair of line terminations taking in combination any stage termination of one line with any different stage termination of another line constituting one of the total number of permutative pairs of line terminations of said two lines, means operable for designating a permutative pair for inter-connection, a plurality of inter-stage links, link seeking means selectively operable to seek an available appropriate link capable of inter-connecting a designated permutative pair and to discriminate between availability and unavailability of an appropriate link, means controlled by said designating means for operating said link seeking means each time a different permutative pair is designated and for so operating said link seeking means selectively in accordance with the then designated permutative pair, and means controlled by said link seeking means incident to availability of an appropriate link for causing inter-connection over said available appropriate link of the then designated permutative pair and incident to unavailability of an appropriate link for causing said designating means to designate a different permutative pair.

6. A switching system comprising a plurality of switching stages, a plurality of lines, each line having at least one line termination in each of at least two stages, each pair of line terminations taking in combination any stage termination of one line with any different stage termination of another line constituting one of the total number of permutative pairs of line terminations of said two lines, means operable for designating a permutative pair for inter-connection, a plurality of inter-stage links, link seeking means selectively operable to seek an available appropriate link capable of inter-connecting a designated permutative pair and to discriminate between availability and unavailability of an appropriate link, means controlled by said designating means for operating said link seeking means each time a different permutative pair is designated and for so operating said link seeking means selectively in accordance with the then designated permutative pair, means controlled by said link seeking means incident to availability of an appropriate link for causing inter-connection over said available appropriate link of the then designated permutative pair, and means controlled by said link seeking means incident to unavailability of an appropriate link for causing said designating means to designate a different permutative pair.

7. A switching system comprising a plurality of switching stages, a plurality of lines, each line having at least one line termination in each of at least two stages, each pair of line terminations taking in combination any stage termination of one line with any different stage termination of another line constituting one of the total number of permutative pairs of line terminations of said two lines, means operable for designating a preferred permutative pair for inter-connection, a plurality of inter-stage links, link seeking means operable to seek an available appropriate link capable of inter-connecting a designated permutative pair and to discriminate between availability and unavailability of an appropriate link, means controlled by said designating means for operating said link seeking means each time a different permutative pair is designated, and means controlled by said link seeking means incident to availability of an appropriate link for causing inter-connection over said available appropriate link of the then designated permutative pair and incident to unavailability of an appropriate link for causing said designating means to designate a less-preferred premutative pair.

8. A switching system comprising a plurality of switching stages, a plurality of lines, each line having at least one line termination in each of at least two stages, each pair of line terminations taking in combination any stage termination of one line with any different stage termination of another line constituting one of the total number of permutative pairs of line terminations of said two lines, means operable for designating a preferred permutative pair for inter-connection, a plurality of inter-stage links, link seeking means operable to seek an available appropriate link capable of inter-connecting a designated permutative pair and to discriminate between availability and unavailability of an appropriate link, means controlled by said designating means for operating said link seeking means each time a different permutative pair is designated, means controlled by said link seeking means incident to availability of an appropriate link for causing inter-connection over said available appropriate link of the then designated permutative pair, and means controlled by said link seeking means incident to unavailability of an appropriate link for causing said designating means to designate a less-preferred permutative pair.

9. A switching system comprising a plurality of switching stages, a plurality of lines, each line having at least one line termination in each of at least two stages, each pair of line terminations taking in combination any stage termination of one line with any different stage termination of another line constituting one of the total number of permutative pairs of line terminations of said two lines, means operable for designating a preferred permutative pair for inter-connection, a plurality of inter-stage links, link seeking means operable to seek an available link capable of inter-connecting a designated permutative pair and to discriminate between availability and unavailability of an appropriate link, means controlled by said designating means for operating said link seeking means each time a different permutative pair is designated, and means controlled by said link seeking means incident to availability of an appropriate link for causing inter-connection over said available appropriate link of the then designated permutative pair and incident to unavailability of an appropriate link for causing said designating means to designate a less-preferred permutative pair according to a predetermined order of usage preference among the said total number of pairs.

10. A switching system comprising a plurality of switching stages, a plurality of lines, each line having at least one line termination in each of at least two stages, each pair of line terminations taking in combination any stage termination of one line with any different stage termination of another line constituting one of the total number of permutative pairs of line terminations of said two lines, means operable for designating a preferred permutative pair for inter-connection, a plurality of inter-stage links, link seeking means operable to seek an available appropriate link capable of inter-connecting a designated permutative pair and to discriminate between availability and unavailability of an appropriate link, means controlled by said designating means for operating said link seeking means each time a different permutative pair is designated, means controlled by said link seeking means incident to availability of an appropriate link for causing inter-connection over said available appropriate link of the then designated permutative pair, and means controlled by said link seeking means incident to unavailability of an appropriate link for causing said designating means to designate a less-preferred permutative pair according to a predetermined order of usage preference among the said total number of pairs.

11. A switching system comprising a plurality of switching stages, a plurality of lines, each line having at least one line termination in each of at least two stages, each pair of line terminations taking in combination any stage termination of one line with any different stage termination of another line constituting one of the total number of permutative pairs of line terminations of said two lines, means operable for providing a preferred electrical condition representing the designation of a preferred permutative pair for inter-connection, a plurality of inter-stage links, link seeking means operable to seek an available appropriate link capable of inter-connecting a designated permutative pair and to discriminate between availability and unavailability of an appropriate link, means controlled by said designating means for operating said link seeking means each time a different permutative pair is designated, and means controlled by said link seeking means incident to availability of an appropriate link for causing inter-connection over said available appropriate link of the then designated permutative pair and incident to unavailability of an appropriate link for deriving from said preferred electrical condition control signals representing a less-preferred permutative pair designation according to a predetermined order of usage preference among the said total number of pairs and for utilizing said control signals to cause said designating means to provide a less-preferred electrical condition representing the designation of said less-preferred permutative pair in lieu of the said preferred permutative pair.

12. A switching system comprising a plurality of switching stages, a plurality of lines, each line having at least one line termination in each of at least two stages, each pair of line terminations taking in combination any stage termination of one line with any different stage termination of another line constituting one of the total number of permutative pairs of line terminations of said two lines, means operable for providing a preferred electrical condition representing the designation of a preferred permutative pair for inter-connection, a plurality of inter-stage links, link seeking means operable to seek an available appropriate link capable of inter-connecting a designated permutative pair and to discriminate between availability and unavailability of an appropriate link, means controlled by said designating means for operating said link seeking means each time a different permutative pair is designated, means controlled by said link seeking means incident to availability of an appropriate link for causing inter-connection over said available appropriate link of the then designated permutative pair, and means controlled by said link seeking means incident to unavailability of an appropriate link for deriving from said preferred electrical condition control signals representing a less-preferred permutative pair designation according to a predetermined order of usage preference among the said total number of pairs and for utilizing said control signals to cause said designating means to provide a less-preferred electrical condition representing the designation of said less-preferred permutative pair in lieu of the said preferred permutative pair.

13. A switching system comprising a plurality of switching stages, a plurality of lines, each line having at least one line termination in each of at least two stages, each pair of line terminations taking in combination any stage termination of one line with any different stage termination of another line constituting one of the total number of permutative pairs of line terminations of said two lines, means operable for providing a preferred electrical condition representing the designation of a preferred permutative pair for inter-connection, a plurality of inter-stage links, link seeking means operable to seek an available appropriate link capable of inter-connecting a designated permutative pair and to discriminate between availability and unavailability of an appropriate link, means controlled by said designating means for operating said link seeking means each time a different permutative pair is designated, and means controlled by said link seeking means incident to availability of an appropriate link for causing inter-connection over said available appropriate link of the then designated permutative pair and incident to unavailability of an appropriate link for translating said preferred electrical condition into control signals representing a less-preferred permutative pair designation according to a predetermined order of usage preference among the said total number of pairs and for utilizing said control signals to cause said designating means to provide a less-preferred electrical condition representing the designation of said less-preferred permutative pair in lieu of the said preferred permutative pair.

14. A switching system comprising a plurality of switching stages, a plurality of lines, each line having at least one line termination in each of at least two stages, each pair of line terminations taking in combination any stage termination of one line with any different stage termination of another line constituting one of the total number of permutative pairs of line terminations of said two lines, means operable for providing a preferred electrical condition representing the designation of a preferred permutative pair for inter-connection, a plurality of inter-stage links, link seeking means operable to seek an available appropriate link capable of inter-connecting a designated permutative pair and to discriminate between availability and unavailability of an appropriate link, means controlled by said designating means for operating said link seeking means each time a different permutative pair is designated, means controlled by said link seeking means incident to availability of an appropriate link for causing inter-connection over said available appropriate link of the then designated permutative pair, and means controlled by said link seeking means incident to unavailability of an appropriate link for translating said preferred electrical condition into control signals representing a less-preferred permutative pair designation according to a predetermined order of usage preference among the said total number of pairs and for utilizing said control signals to cause said designating means to provide a less-preferred electrical condition representing the designation of said less-preferred permutative pair in lieu of the said preferred permutative pair.

15. A switching system comprising a plurality of switching stages, a plurality of lines, each line having at least one line termination in each of at least two stages, each pair of line terminations taking in combination any stage termination of one line with any different stage termination of another line constituting one of the total number of permutative pairs of line terminations of said two lines, means operable for providing a preferred electrical condition representing the designation of a preferred permutative pair for inter-connection, a plurality of inter-stage links, link seeking means operable to seek available appropriate link capable of inter-connecting a designated permutative pair and to discriminate between availability and unavailability of an appropriate link, means controlled by said designating means for operating said link seeking means each time a different permutative pair is designated, and means controlled by said link seeking means incident to availability of an appropriate link for causing inter-connection over said available appropriate link of the then designated permutative pair, said causing means including logic circuitry controlled by said link seeking means incident to unavailability of an appropriate link for translating said preferred electrical condition into control signals representing a less-preferred permutative pair designation according to a predetermined order of usage preference among the said total number of pairs and for utilizing said control signals to cause said designating means to provide a less-preferred electrical condition representing the designation of said less-preferred permutative pair in lieu of the said preferred permutative pair.

16. A switching system comprising a plurality of switching stages, a plurality of lines, each line having at least one line termination in each of at least two stages, each pair of line terminations taking in combination any stage termination of one line with any different stage termination of another line constituting one of the total number of permutative pairs of line terminations of said two lines, means operable for providing a preferred electrical condition representing the designation of a preferred permutative pair for inter-connection, a plurality of inter-stage links, link seeking means operable to seek an available appropriate link capable of inter-connecting a designated permutative pair and to discriminate between availability and unavailability of an appropriate link, means controlled by said designating means for operating said link seeking means each time a different permutative pair is designated, means controlled by said link seeking means incident to availability of an appropriate link for causing inter-connection over said available appropriate link of the then designated permutative pair, and means including logic circuitry controlled by said link seeking means incident to unavailability of an appropriate link for translating said preferred electrical condition into control signals representing a less-preferred permutative pair designation according to a predetermined order of usage preference among the said total number of pairs and for utilizing said control signals to cause said designating means to provide a less-preferred electrical condition representing the designation of said less-preferred permutative pair in lieu of the said preferred permutative pair.

17. A switching system comprising a plurality of switching stages, a plurality of lines, each line having at least one line termination in each of at least two stages, each pair of line terminations taking in combination any stage termination of one line with any different stage termination of another line constituting one of the total number of permutative pairs of line terminations of said two lines, means operable for providing a preferred electrical condition representing the designation of a preferred permutative pair for inter-connection, a plurality of inter-stage links, link seeking means operable to seek an available appropriate link capable of inter-connecting a designated permutative pair and to discriminate between availability and unavailability of an appropriate link, means controlled by said designating means for operating said link seeking means each time a different permutative pair is designated, means controlled by said link seeking means incident to availability of an appropriate link for causing inter-connection over said available appropriate link of the then designated permutative pair, and means including logic circuitry controlled by said link seeking means incident to unavailability of an appropriate link for translating said preferred electrical condition into control signals representing a less-preferred permutative pair designation according to a predetermined order of usage preference among the said total number of pairs and for utilizing said control signals to cause said designating means to provide an additional less-preferred electrical condition representing the designation of said less-preferred permutative pair and for causing said designating means to cease to provide said preferred electrical condition.

18. The invention defined in claim 17 wherein said designating means is initially selectively operable to represent the designation of an initially selected preferred permutative pair and, wherein said logic circuitry comprises translating means controlled jointly by said link seeking means and by said designating means in accordance with the said initially selective operation thereof for providing said control signals, operating means controlled by said translating means according to said control signals for additionally selectively operating said designating means in accordance with said control signals, and releasing means controlled by said designating means incident to the said additional selective operation thereof for releasing the said initially selective operation thereof.

19. The invention defined in claim 18 wherein said translating means comprises translate gates inter-connected with said link seeking means and with said designating means, wherein said operating means comprises inter-connections between said translate gates and said designating means, and wherein said releasing means comprises release gates inter-connected with said designating means.

20. The invention defined in claim 19 wherein said designating means comprises a plurality of devices selectively operable to represent designations of corresponding selected permutative pairs, wherein said translate gates are connected to said devices, wherein said operating means includes connections to said devices, and wherein said release gates are connected to said devices.

21. The invention defined in claim 20 wherein each said selective operation of said devices comprises the operation of a different and unique combination of said devices for each different permutative pair.

22. The invention defined in claim 21 wherein said link seeking means includes means for generating a special signal indicative of unavailability of an appropriate link, wherein said translate gates are selectively connected to said devices and are connected to said special signal generating means whereby to provide said control signals responsive to said special signal, whereby said translate gates are additionally selectively connected to said devices whereby said control signals are effective to additionally selectively operate a different combination of said devices in accordance with said control signals, and wherein said release gates are selectively interconnected between said initially operated combination of devices and said additionally operated combination of devices whereby the operation of said additional combination releases the said operated initial combination.

23. The invention defined in claim 22 wherein each said device is a bistable component having an input conductor energizable to operate said component into a first state and having a reset conductor energizable to release said component into its second state and having an output conductor energizable according to the operation or release of said component, wherein said translate gates are transmission enabling gates and have control conductors connected to selected component output conductors and have input conductors connected to said signal generating means and have output conductors, wherein said operating means includes connections between said enabling gate output conductors and selected component input conductors, and wherein said release gates are transmission inhibiting gates and have input conductors and have output conductors connected to selected component reset conductors, whereby said special signal is transmitted through those enabling gates whose control conductors are connected to said initially operated components and applied to the output conductors of those said enabling gates and applied over said connections therefrom to the input conductors of an additional unique combination of said components thereby to operate same, and whereby the energization of the output conductors of said additional combination is transmitted through inhibiting gates to reset conductors of said initial combination of said components thereby to release said initial combination.

24. The invention defined in claim 23 wherein each said component is an electronic flip-flop having a set state and a reset state and an input set conductor energizable by a change of electrical potential to set said flip-flop and having a reset conductor energizable by a change of electrical potential to reset said flip-flop and having an output conductor energizable to provide a change of electrical potential whenever said flip-flop is set, and wherein said signal generating means comprises means for generating a change of electrical potential as said special signal, whereby said special signal sets said additional unique combination of flip-flops and whereby said additional combination in being set in turn resets said initial combination of flip-flops.

25. The invention defined in claim 24 wherein said line terminations and interstage links are arranged so as to always render available an appropriate link for certain initially designated permutative pairs, wherein is provided detecting means operable incident to the initial operation of said designating means for providing an inhibit signal upon detecting a said certain permutative pair designation, wherein said inhibiting gates have control conductors energizable to inhibit transmission therethrough, and wherein circuitry is provided for applying said inhibit signal to said inhibiting gate control conductors.

26. A switching system comprising a plurality of switching stages, a plurality of lines, each line having at least one line termination in each of at least two stages, each pair of line terminations taking in combination any stage termination of one line with any different stage termination of another line constituting one of the total number of permutative pairs of line terminations of said two lines, means for designating a permutative pair for interconnection, a plurality of inter-stage links divided into groups of links including a different group capable of interconnecting each different permutative pair, link seeking means selectively operable to seek an available appropriate link capable of inter-connecting a designated permutative pair and to discriminate between availability and unavailability of an appropriate link, means controlled by said designating means for operating said link seeking means each time a different permutative pair is designated and for so operating said link seeking means selectively to seek an available link only within the appropriate group in accordance with the then designated permutative pair, and means controlled by said link seeking means incident to availability of an appropriate link for causing interconnection over said available appropriate link of the then designated permutative pair.

27. A switching system comprising a plurality of switching stages, a plurality of lines, each line having at least one line termination in each of at least two stages, each pair of line terminations taking in combination any stage termination of one line with any different stage termination of another line constituting one of the total number of permutative pairs of line terminations of said two lines, means for designating a permutative pair for inter-connection, a plurality of inter-stage links divided into groups of links including a different group capable of inter-connecting each different permutative pair, link seeking means selectively operable to seek an available appropriate link capable of inter-connecting a designated permutative pair and to discriminate between availability and unavailability of an appropriate link, means controlled by said designating means for operating said link seeking means each time a different permutative pair is designated and for so operating said link seeking means selectively to seek an available link only within the appropriate group in accordance with the then designated permutative pair, and means controlled by said link seeking means incident to availability of an appropriate link for causing inter-connection over said available appropriate link of the then designated permutative pair and incident to unavailability of an appropriate link for causing said designating means to designate a different permutative pair.

28. A switching system comprising a plurality of switching stages each having a plurality of substages, a plurality of lines, each line having at least one line termination in at least one substage of each of at least two stages, each pair of line terminations taking in combination any substage termination of one line in one stage with any substage termination of another line in a different stage constituting one of the total number of permutative pairs of line terminations of said two lines, means for designating a permutative pair for inter-connection, a plurality of inter-stage links divided into groups of links including a different group serving each different pair of substages taking one substage from each of two different stages, link seeking means selectively operable to seek an available appropriate link capable of inter-connecting a designated permutative pair and to discriminate between availability and unavailability of an appropriate link, means controlled by said designating means for operating said link seeking means each time a different permutative pair is designated and for so operating said link seeking means selectively to seek an available link only within the appropriate group in accordance with the then designated permutative pair, and means controlled by said link seeking means incident to availability of an appropriate link for causing inter-connection over said available appropriate link of the then designated permutative pair.

29. The invention defined in claim 28 wherein said link seeking means comprises a link scanner and a plurality of test terminals common to all link groups, and wherein said scanner operating means includes scanner start means controlled by said designating means incident to the designation thereby of any permutative pair for causing said scanner to start scanning said test terminals and includes access circuitry selectively controlled by said designating means incident to the designation thereby of a particular permutative pair for permitting access by said test terminals only to that link group serving the pair of substages terminating said particular permutative pair.

30. The invention defined in claim 29 wherein said designating means includes means for registering the identity of the stage and substage wherein is terminated each line of a particular permutative pair of lines designated for inter-connection, and wherein said registering means controls said scanner start means according to the registered stage identities and controls said access circuitry according to the registered substage identities.

31. The invention defined in claim 30 wherein said identity registering means comprises memory devices selectively operable according to the identity of the stage and substage wherein each line of a designated permutative pair is terminated, wherein said scanner start means includes start gates inter-connected between said devices and said link scanner and controlled by said devices for causing said scanner to start scanning whenever said devices identify a different pair of stages, and wherein said access circuitry includes access gates inter-connected between said scanner test terminals and said link groups and selectively controlled by said devices for permitting access by said test terminals only to the link group serving the said designated permutative pair of terminations.

32. The invention defined in claim 31 wherein each said memory device is unique to a particular substage of a particular stage, wherein said start gates include a stage gate for each stage and energizable by any operated memory device identifiable with said stage and include a pair gate per pair of different stages and energizable by any corresponding pair of energized stage gates, and wherein said access gates include substage gates unique to each link group and energizable selectively by operated memory devices according to the link group serving the designated permutative pair of line terminations.

33. The invention defined in claim 32 wherein each memory device is an electronic flip-flop settable to designate a particular substage of a particular stage, wherein two flip-flops are set to designate a permutative pair of line terminations, wherein each stage gate is an OR gate controlled from any flip-flop designating the corresponding stage, wherein each pair gate is an AND gate controlled from a pair of OR gates, and wherein each substage gate is a transmission enabling gate inter-connecting a scanner test terminal with a link and is controlled from any flip-flop designating a subgroup served by said latter link.

34. The invention defined in claim 33 wherein said scanner comprises a multi-stage electronic ring counter and each said test terminal is an output terminal of a different counter stage, wherein said scanner start means includes an electronic flip-flop settable by any energized AND gate to start said counter scanning said test terminals and resettable to stop said counter, wherein said inter-connection causing means includes a detector for detecting availability of an appropriate link and for resetting said start-stop flip-flop whereby said counter is stopped, and wherein said inter-connection causing means includes connective means controlled by the stopping of said counter to effect interconnection of the then designated permutative pair over that link inter-connected with the counter output terminal corresponding to the stopped position of said counter.

35. A switching system comprising a plurality of switching stages each having a plurality of substages, a plurality of lines, each line having at least one line termination in at least one substage of each of at least two stages, each pair of line terminations taking in combination any substage termination of one line in one stage with any substage termination of another line in a different stage constituting one of the total number of permutative pairs of line terminations of said two lines, means for designating a permutative pair for inter-connection, a plurality of inter-stage links divided into groups of links including a different group serving each different pair of substages taking one substage from each of two different stages, link seeking means selectively operable to seek an available appropriate link capable of interconnecting a designated permutative pair and to discriminate between availability and unavailability of an appropriate link, means controlled by said designating means for operating said link seeking means each time a different permutative pair is designated and for so operating said link seeking means selectively to seek an available link only within the appropriate group in accordance with the then designated permutative pair, and means controlled by said link seeking means incident to availability of an appropriate link for causing inter-connection over said available appropriate link of the then designated permutative pair and incident to unavailability of an appropriate link for causing said designating means to designate a different permutative pair.

36. The invention defined in claim 35 wherein said link seeking means comprises a link scanner and a plurality of test terminals common to all link groups, and wherein said scanner operating means includes scanner start means controlled by said designating means incident to the designation thereby of any permutative pair for causing said scanner to start scanning said test terminals and includes access circuitry selectively controlled by said designating means incident to the designation thereby of a particular permutative pair for permitting access by said test terminals only to that link group serving the pair of substages terminating said particular permutative pair.

37. The invention defined in claim 36 wherein said designating means includes means for registering the identity of the stage and substage wherein is terminated each line of a particular permutative pair of lines designated for inter-connection, and wherein said registering means controls said scanner start means according to the registered stage identities and controls said access circuitry according to the registered substage identities.

38. The invention defined in claim 37 wherein said identity registering means comprises memory devices selectively operable according to the identity of the stage and substage wherein each line of a designated permutative pair is terminated, wherein said scanner start means includes start gates inter-connected between said devices and said link scanner and controlled by said devices for causing said scanner to start scanning whenever said devices identify a different pair of stages, and wherein said access circuitry includes access gates inter-connected between said scanner test terminals and said link groups and selectively controlled by said devices for permitting access by said test terminals only to the link group serving the said designated permutative pair of terminations.

39. The invention defined in claim 38 wherein each said memory device is unique to a particular substage of a particular stage, wherein said start gates include a stage gate for each stage and energizable by any operated memory device identifiable with said stage and include a pair gate per pair of different stages and energizable by any corresponding pair of energized stage gates, and wherein said access gates include substage gates unique to each link group and energizable selectively by operated memory devices according to the link group serving the designated permutative pair of line terminations.

40. The invention defined in claim 39 wherein each memory device is an electronic flip-flop settable to designate a particular substage of a particular stage, wherein two flip-flops are set to designate a permutative pair of line terminations, wherein each stage gate is an OR gate controlled from any flip-flop designating the corresponding stage, wherein each pair gate is an AND gate controlled from a pair of OR gates, and wherein each substage gate is a transmission enabling gate inter-connecting a scanner test terminal with a link and is controlled from any flip-flop designating a subgroup served by said latter link.

41. The invention defined in claim 40 wherein said scanner comprises a multi-stage electronic ring counter and each said test terminal is an output terminal of a different counter stage, wherein said scanner start means includes an electronic flip-flop settable by an energized AND gate to start said counter scanning said test terminals and resettable to stop said counter, wherein said inter-connection causing means includes a detector for detecting availability of an appropriate link and for resetting said start-stop flip-flop whereby said counter is stopped, and wherein said inter-connection causing means includes connective means controlled by the stopping of said counter to effect inter-connection of the then designated permutative pair over that link inter-connected with the counter output terminal corresponding to the stopped position of said counter.

42. A switching system comprising two switching stages each having an equal plurality of similarly numbered substages, a plurality of calling and called lines, each substage having an equal plurality of similarly numbered line terminals and each line having a line termination in one line terminal of one substage of a first stage and another line termination in the similarly numbered line terminal of the similarly numbered substage of the second stage, the two pairs of line terminations taking the first stage termination of a calling line with the second stage termination of a called line and taking the second stage termination of said calling line with the first stage termination of said called line constituting the respective preferred and less-preferred permutative pairs of line terminations of said calling and called lines, means operable for designating a preferred permutative pair for inter-connection by registering the numbers of the substages and of the line terminals therein corresponding to the preferred permutative pair, a plurality of inter-stage links divided into equal groups of links including a different group serving each different pair of substages taking one substage from each stage, link seeking means selectively operable to seek an available appropriate link capable of inter-connecting a designated permutative pair and to discriminate between availability and unavailability of an appropriate link, means controlled by said designating means for operating said link seeking means each time a different permutative pair is designated and for so operating said link seeking means selectively to seek an available link only within the appropriate group in accordance with the then designated permutative pair, and means controlled by said link seeking means incident to availability of an appropriate link for causing inter-connection over said available appropriate link of the then designated pair.

43. A switching system comprising two switching stages each having an equal plurality of similarly numbered substages, a plurality of calling and called lines, each substage having an equal plurality of similarly numbered line terminals and each line having a line termination in one line terminal of one substage of a first stage and another line termination in the similarly numbered line terminal of the similarly numbered substage of the second stage, the two pairs of line terminations taking the first stage termination of a calling line with the second stage termination of a called line and taking the second stage termination of said calling line with the first stage termination of said called line constituting the respective preferred and less-preferred permutative pairs of line terminations of said calling and called lines, means operable for designating a preferred permutative pair for inter-connection by registering the numbers of the substages and of the line terminals therein corresponding to the preferred permutative pair, a plurality of inter-stage links divided into equal groups of links including a different group serving each different pair of substages taking one substage from each stage, link seeking means selectively operable to seek an available appropriate link capable of inter-connecting a designated permutative pair and to discriminate between availability and unavailability of an appropriate link, means controlled by said designating means for operating said link seeking means each time a different permutative pair is designated and for so operating said link seeking means selectively to seek an available link only within the appropriate group in accordance with the then designated permutative pair, means controlled by said link seeking means incident to availability of an appropriate link for causing inter-connection over said available appropriate link of the then designated pair, and means controlled by said link seeking means incident to unavailability of a link appropriate to inter-connect a designated preferred permutative pair for causing said designating means to designate the corresponding less-preferred permutative pair by registering the numbers of the substages and of the line terminals therein corresponding to the said less-preferred permutative pair in lieu of the registration therein of the numbers corresponding to the said preferred pair.

44. A switching system comprising two switching stages each having an equal plurality of similarly numbered substages, a plurality of calling and called lines, each substage having an equal plurality of similarly numbered line terminals and each line having a line termination in one line terminal of one substage of a first stage and another line termination in the similarly numbered line terminal of the similarly numbered substage of the second stage, the two pairs of line terminations taking the first stage termination of a calling line with the second stage termination of a called line and taking the second stage termination of said calling line with the first stage termination of said called line constituting the respective preferred and less-preferred permutative pairs of line terminations of said calling and called lines, means operable for designating a preferred permutative pair for interconnection by registering the numbers of the substages and of the line terminals therein corresponding to the preferred permutative pair, a plurality of inter-stage links divided into equal groups of links including a different group serving each different pair of substages taking one substage from each stage, link seeking means selectively operable to seek an available appropriate link capable of inter-connecting a designated permutative pair and to discriminate between availability and unavailability of an appropriate link, means controlled by said designating means for operating said link seeking means each time a different permutative pair is designated and for so operating said link seeking means selectively to seek an available link only within the appropriate group in accordance with the then designated permutative pair, means controlled by said link seeking means incident to availability of an appropriate link for causing inter-connection over said available appropriate link of the then designated pair, and means controlled by said link seeking means incident to unavailability of a link appropriate to inter-connect a designated preferred permutative pair for deriving from the preferred-pair-numbers-registration control signals representing the corresponding less-preferred-pair-numbers and for utilizing said control signals to cause the registering in said designating means of said less-preferred-pair-numbers in lieu of the said preferred-pair-numbers.

45. A switching system comprising two switching stages each having an equal plurality of similarly numbered substages, a plurality of calling and called lines, each substage having an equal plurality of similarly numbered line terminals and each line having a line termination in one line terminal of one substage of a first stage and another line termination in the similarly numbered line terminal of the similarly numbered substage of the second stage, the two pairs of line terminations taking the first stage termination of a calling line with the second stage termination of a called line and taking the second stage termination of said calling line with the first stage termination of said called line constituting the respective preferred and less-preferred permutative pairs of line terminations of said calling and called lines, means operable for designating a preferred permutative pair for interconnection by registering the numbers of the substages and of the line terminals therein corresponding to the preferred permutative pair, a plurality of inter-stage links divided into equal groups of links including a different group serving each different pair of substages taking one substage from each stage, link seeking means selectively operable to seek an available appropriate link capable of inter-connecting a designated permutative pair and to discriminate between availability and unavailability of an appropriate link, means controlled by said designating means for operating said link seeking means each time a different permutative pair is designated and for so operating said link seeking means selectively to seek an available link only within the appropriate group in accordance with the then designated permutative pair, means controlled by said link seeking means incident to availability of an appropriate link for causing inter-connection over said available appropriate link of the then designated pair, and means controlled by said link seeking means incident to unavailability of a link appropriate to inter-connect a designated preferred permutative pair for translating said preferred-pair-numbers-registration into control signals representing the corresponding less-preferred-pair-numbers and for utilizing said control signals to cause the registering in said designating means of said less-preferred-pair-numbers in lieu of the said preferred-pair-numbers.

46. A switching system comprising two switching stages each having an equal plurality of similarly numbered substages, a plurality of calling and called lines, each substage having an equal plurality of similarly numbered line terminals and each line having a line termination in one line terminal of one substage of a first stage and another line termination in the similarly numbered line terminal of the similarly numbered substage of the second stage, the two pairs of line terminations taking the first stage termination of a calling line with the second stage termination of a called line and taking the second stage termination of said calling line with the first stage termination of said called line constituting the respective preferred and less-preferred permutative pairs of line terminations of said calling and called lines, means operable for designating a preferred permutative pair for inter-connection by registering the numbers of the substages and of the line terminals therein corresponding to the preferred permutative pair, a plurality of inter-stage links divided into equal groups of links including a different group serving each different pair of substages taking one substage from each stage, link seeking means selectively operable to seek an available appropriate link capable of inter-connecting a designated permutative pair and to discriminate between availability and unavailability of an appropriate link, means controlled by said designating means for operating said link seeking means each time a different permutative pair is designated and for so operating said link seeking means selectively to seek an available link only within the appropriate group in accordance with the then designated permutative pair, means controlled by said link seeking means incident to availability of an appropriate link for causing inter-connection over said available appropriate link of the then designated pair, and means including logic circuitry controlled by said link seeking means incident to unavailability of a link appropriate to inter-connect a designated preferred permutative pair for translating said preferred-pair-numbers-registration into control signals representing the corresponding less-preferred-pair-numbers and for utilizing said control signals to cause the registering in said designating means of said less-preferred-pair-numbers and for causing said designating means to cease the registering therein of said preferred-pair-numbers.

47. The invention defined in claim 46 wherein said designating means is initially selectively operable to represent said preferred-pair-numbers of an initially selected preferred permutative pair, and wherein said logic circuitry comprises translating means controlled jointly by said link seeking means and by said designating means in accordance with the said initially selective operation thereof for providing said control signals, operating means controlled by said translating means according to said control signals for additionally selectively operating said designating means to represent said less-preferred-pair-numbers, and releasing means controlled by said designating means incident to the said additional selective operation thereof for releasing the said initially selective operation thereof.

48. The invention defined in claim 47 wherein said translating means comprises translate gates inter-connected with said link seeking means and with said designating means, wherein said operating means comprises inter-connections between said translate gates and said designating means, and wherein said releasing means comprises release gates inter-connected with said designating means.

49. The invention defined in claim 48 wherein said designating means comprises a plurality of registering devices divided into four sets where a first set includes a device for each differently numbered terminal of a first-stage-substage and where a second set includes a device for each differently numbered terminal of a second-stage substage and where a third set includes a device for each differently numbered substage of the first stage and where a fourth set includes a device for each differently numbered substage of the second stage, said devices selectively operable to register pair-numbers-representing designations of corresponding selected permutative pairs, wherein said translate gates are connected to said devices, wherein said operating means includes connections to said devices, and wherein said release gates are connected to said devices.

50. The invention defined in claim 49 wherein each said selective operation of said devices comprises the operation of a different and unique combination of four of said devices taking one device for each set.

51. The invention defined in claim 50 wherein said link seeking means includes means for generating a special signal indicative of unavailability of an appropriate link, wherein said translate gates are selectively connected to devices in each set thereof and are connected to said special signal generating means whereby to provide said control signals responsive to said special signal, whereby said translate gates are additionally selectively connected to devices in each set thereof whereby said control signals are effective to additionally selectively operate a different combination of said devices in accordance with said control signals, and wherein said release gates are selectively inter-connected between said initially operated combination of devices and said additionally operated combination of devices whereby the operation of said additional combination releases the said operated initial combination.

52. The invention defined in claim 51 wherein each said device is a bistable component having an input conductor energizable to operate said component into a first state and having a reset conductor energizable to release said component into its second state and having an output conductor energizable according to the operation or release of said component, wherein said translate gates are transmission enabling gates, wherein is provided one enabling gate per component so as to provide four sets of enabling gates corresponding to the said sets of components, wherein each enabling gate has a control conductor connected to the output conductor of its corresponding component and has an input conductor connected to said signal generating means and has an output conductor, wherein said operating means includes a connection from each first-set-enabling-gate output conductor to the input conductor of the correspondingly numbered opposite second-set-component and similar connections between the output conductors and input conductors of correspondingly numbered respective opposite enabling gates and components of the other three pairs of (second-set-enabling-gates and first-set-components) (third-set-enabling-gates and fourth-set-components) and (fourth-set-enabling-gates and third-set-components), wherein said release gates are transmission inhibiting gates, wherein is provided one inhibiting gate per component so as to provide four sets of inhibiting gates corresponding to the said sets of components, wherein each inhibiting gate has an input conductor connected to the output conductor of its corresponding component and has an output conductor connected to the reset conductor of its opposite set-component as in the above manner of connection of the enabling gate output conductor, whereby said special signal is transmitted through those enabling gates whose control conductors are connected to said initially operated components and applied to the output conductors of those said enabling gates and applied over said connections therefrom to the input conductors of an additional unique combination of said components thereby to operate same, and whereby the energization of the output conductors of said additional combination is transmitted through the corresponding inhibiting gates to reset conductors of said initial combination of said components thereby to release said initial combination.

53. The invention defined in claim 52 wherein each said component is an electronic flip-flop having a set state and a reset state and an input set conductor energizable by a change of electrical potential to set said flip-flop and having a reset conductor energizable by a change of electrical potential to reset said flip-flop and having an output conductor energizable to provide a change of electrical potential whenever said flip-flop is set, and wherein said signal generating means comprises means for generating a change of electrical potential as said special signal, whereby said special signal sets said additional unique combination of flip-flops and whereby said additional combination in being set in turn resets said initial combination of flip-flops.

54. The invention defined in claim 53 wherein the said line terminations and interstage links are arranged so as to always render available an appropriate link for initially designated permutative pairs terminated in similarly numbered substages of said first and second stages, wherein is provided detecting means operable incident to the initial operation of said designating means for providing an inhibit signal upon detecting a permutative pair designation involving such similarly numbered substages, wherein said inhibiting gates have control conductors energizable to inhibit transmission therethrough, and wherein circuitry is provided for applying said inhibit signal to said inhibiting gate control conductors.

55. A switching system comprising a pair of switching stages having line terminations thereon, a plurality of lines each connected to a line termination on both of said stages, a plurality of interstage links, means operable to establish a first connection over an idle link between a calling line termination on one of said stages and a called line termination on the other of said stages, and means operable incident to unavailability of an idle link over which to establish said first connection to establish a second connection over an idle link between said calling line termination at said other of said stages and said called line termination at said one of said stages.

56. A switching system comprising a plurality of switching stages, a plurality of lines each terminated in at least two of said stages, a plurality of interstage links for interconnecting line terminations in different stages, means for registering first indicia comprising the identity of a calling line termination in one of said stages and the identity of a called line termination in a second of said stages, means operable under the control of said registering means in accordance with the registration therein of said first indicia to establish a first connection over an idle appropriate link between said calling line termination in said one of said stages and said called line termination in said second of said stages, and means operable incident to unavailability of an idle appropriate link over which to establish said first connection for causing said registering means to register second indicia comprising the identity of said calling line termination in said second of said stages and the identity of said called line termination in said one of said stages, said establishing means operable under the control of said registering means in accordance with the registration therein of said second indicia to establish a second connection over an idle appropriate link between said calling line termination in said second of said stages and said called line termination in said one of said stages.

57. The invention defined in claim 56 wherein said means for causing said registering means to register said second indicia includes means for translating said first indicia into said second indicia.

58. The invention defined in claim 57 wherein said plurality of links is divided into groups of links where a particular group is appropriate over which to inter-connect terminations identified by particular indicia and further comprising means for inhibiting said translating means whenever said calling and called lines are so terminated in said one and said second stages that said first and second connections therebetween can be established only over the same group of interstage links.

No references cited.